(12) United States Patent
Jiang et al.

(10) Patent No.: US 11,282,234 B2
(45) Date of Patent: *Mar. 22, 2022

(54) NON-RIGID STEREO VISION CAMERA SYSTEM

(71) Applicant: NODAR Inc., Somerville, MA (US)

(72) Inventors: Leaf Alden Jiang, Concord, MA (US); Philip Bradley Rosen, Lincoln, MA (US); Piotr Swierczynski, Providence, RI (US)

(73) Assignee: NODAR Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,623

(22) Filed: Jul. 1, 2021

(65) Prior Publication Data

US 2021/0327092 A1    Oct. 21, 2021

Related U.S. Application Data

(63) Continuation of application No. PCT/US2021/012294, filed on Jan. 6, 2021.
(Continued)

(51) Int. Cl.
*G06T 7/80* (2017.01)
*G06T 7/00* (2017.01)
(Continued)

(52) U.S. Cl.
CPC ............... *G06T 7/85* (2017.01); *B60W 40/02* (2013.01); *G06K 9/00818* (2013.01);
(Continued)

(58) Field of Classification Search
CPC .............. H04N 13/00; G06T 7/85; G06T 7/80
See application file for complete search history.

(56) References Cited

U.S. PATENT DOCUMENTS

| 6,392,688 | B1 | 5/2002 | Barmann et al. |
| 8,797,387 | B2 | 8/2014 | Huggett et al. |

(Continued)

FOREIGN PATENT DOCUMENTS

| EP | 1 457 384 A1 | 9/2004 |
| JP | 2008-509619 A | 3/2008 |

OTHER PUBLICATIONS

International Search Report and Written Opinion for International Application No. PCT/US2021/012294, dated May 3, 2021.
(Continued)

*Primary Examiner* — Kyle M Lotfi
(74) *Attorney, Agent, or Firm* — Wolf, Greenfield & Sacks, P.C.

(57) ABSTRACT

A long-baseline and long depth-range stereo vision system is provided that is suitable for use in non-rigid assemblies where relative motion between two or more cameras of the system does not degrade estimates of a depth map. The stereo vision system may include a processor that tracks camera parameters as a function of time to rectify images from the cameras even during fast and slow perturbations to camera positions. Factory calibration of the system is not needed, and manual calibration during regular operation is not needed, thus simplifying manufacturing of the system.

20 Claims, 32 Drawing Sheets

Related U.S. Application Data

(60) Provisional application No. 62/964,148, filed on Jan. 22, 2020.

(51) Int. Cl.

| | | |
|---|---|---|
| *G06T 7/90* | (2017.01) | |
| *H04N 13/271* | (2018.01) | |
| *H04N 13/243* | (2018.01) | |
| *H04N 13/246* | (2018.01) | |
| *H04N 13/00* | (2018.01) | |
| *G06T 7/593* | (2017.01) | |
| *H04N 13/254* | (2018.01) | |
| *B60W 40/02* | (2006.01) | |
| *G06K 9/00* | (2022.01) | |
| *H04N 17/00* | (2006.01) | |
| *G06T 7/579* | (2017.01) | |
| *H04N 13/239* | (2018.01) | |
| *H04N 13/282* | (2018.01) | |

(52) U.S. Cl.
CPC .............. *G06T 7/579* (2017.01); *G06T 7/593* (2017.01); *G06T 7/90* (2017.01); *G06T 7/97* (2017.01); *H04N 13/239* (2018.05); *H04N 13/243* (2018.05); *H04N 13/246* (2018.05); *H04N 13/254* (2018.05); *H04N 13/271* (2018.05); *H04N 13/282* (2018.05); *H04N 17/002* (2013.01); *B60W 2420/42* (2013.01); *G06T 2207/10012* (2013.01); *G06T 2207/10024* (2013.01); *G06T 2207/10028* (2013.01); *G06T 2207/30252* (2013.01); *H04N 2013/0081* (2013.01)

(56) References Cited

U.S. PATENT DOCUMENTS

| | | | |
|---|---|---|---|
| 8,981,966 | B2 | 3/2015 | Stein et al. |
| 9,286,680 | B1 | 3/2016 | Jiang et al. |
| 9,509,979 | B2 | 11/2016 | Livyatan et al. |
| 10,097,812 | B2 | 10/2018 | Livyatan et al. |
| 10,244,228 | B2 | 3/2019 | Millett |
| 10,257,489 | B2 * | 4/2019 | Nam ................ H04N 13/128 |
| 10,430,959 | B2 | 10/2019 | Chang et al. |
| 10,567,748 | B2 | 2/2020 | Okouneva |
| 11,157,751 | B2 | 10/2021 | Kumano et al. |
| 2010/0208034 | A1 | 8/2010 | Chen |
| 2013/0188018 | A1 | 7/2013 | Stevens et al. |
| 2013/0329015 | A1 | 12/2013 | Pulli et al. |
| 2015/0103147 | A1 | 4/2015 | Ho et al. |
| 2016/0323560 | A1 | 11/2016 | Jin et al. |
| 2017/0287169 | A1 * | 10/2017 | Garcia ..................... G06T 7/85 |
| 2019/0158813 | A1 | 5/2019 | Rowell et al. |
| 2019/0289282 | A1 | 9/2019 | Briggs et al. |
| 2020/0064483 | A1 * | 2/2020 | Li ......................... G01S 13/862 |
| 2020/0346581 | A1 | 11/2020 | Lawson et al. |

OTHER PUBLICATIONS

Hinzmann et al., "Flexible stereo: Constrained, non-rigid, wide-baseline stereo vision for fixed-wing aerial platforms," 2018 IEEE International Conference on Robotics and Automation (ICRA) May 21, 2018:2550-7.
U.S. Appl. No. 17/380,391, filed Jul. 20, 2021, Jiang et al.
U.S. Appl. No. 17/380,462, filed Jul. 20, 2021, Jiang et al.
PCT/US2021/012294, May 3, 2021, International Search Report and Written Opinion.

\* cited by examiner

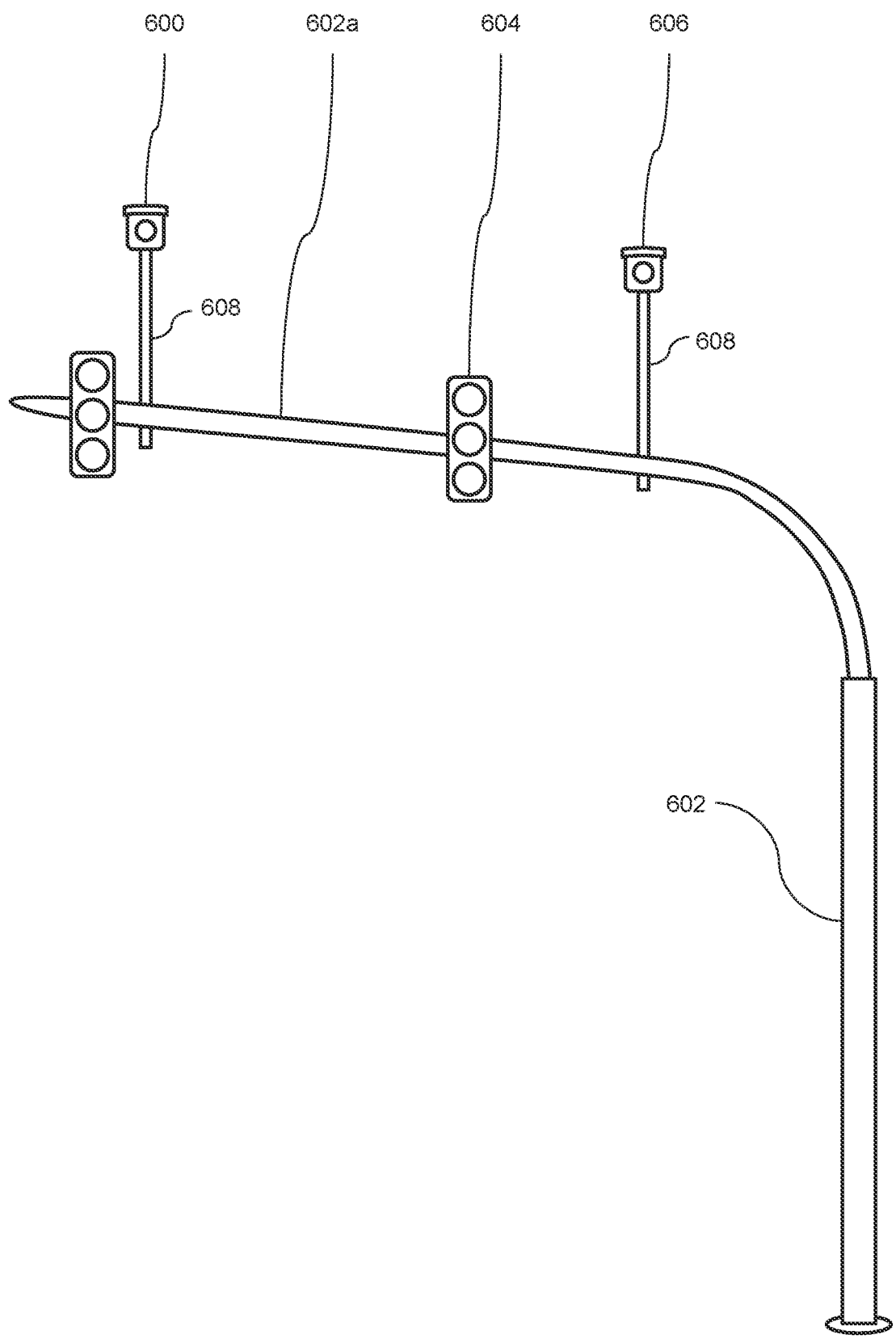

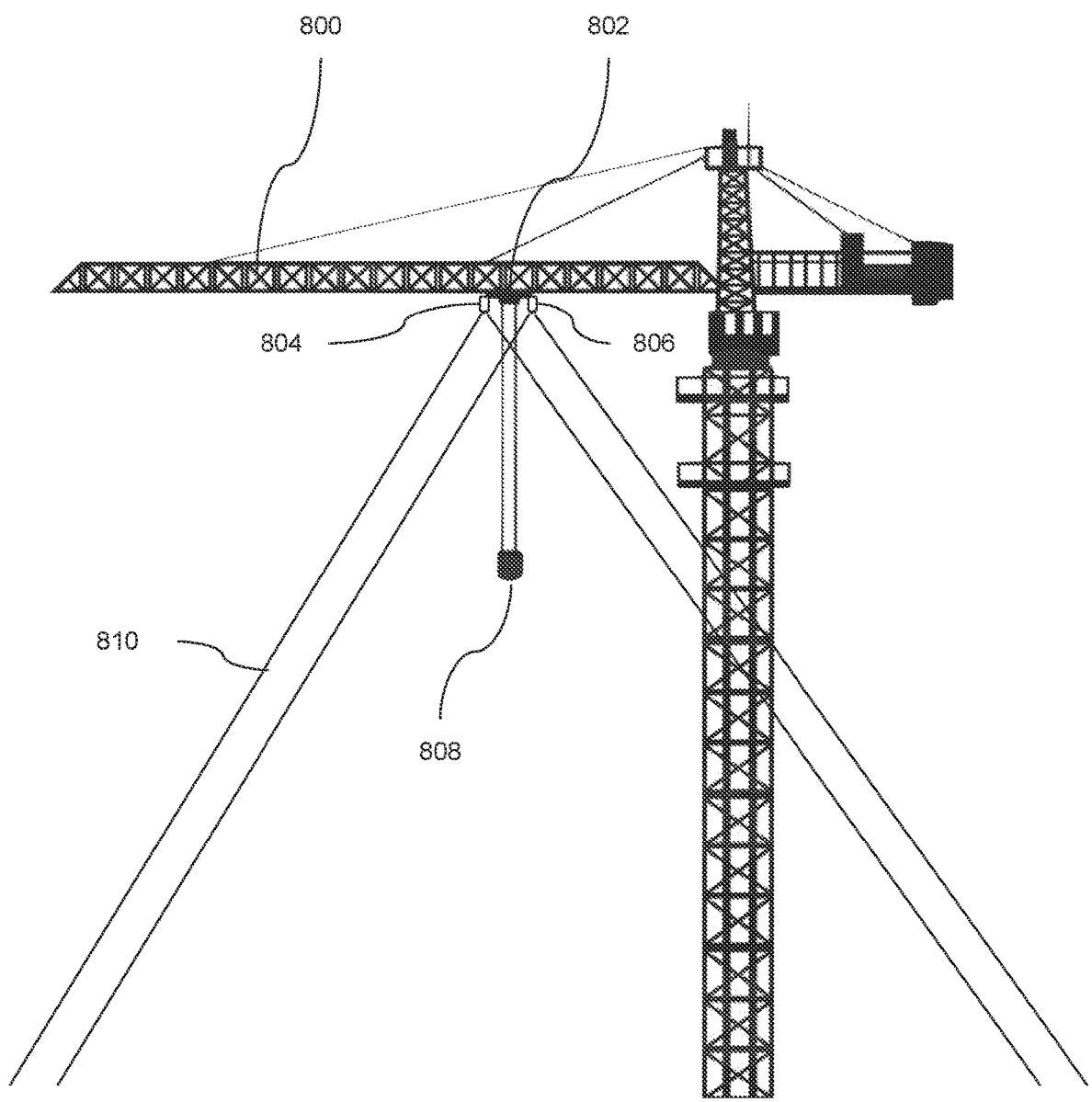

FIG. 12A
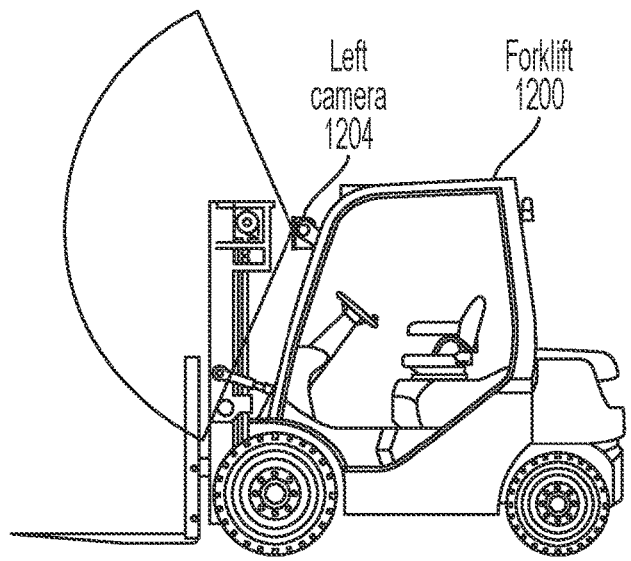
FIG. 12B
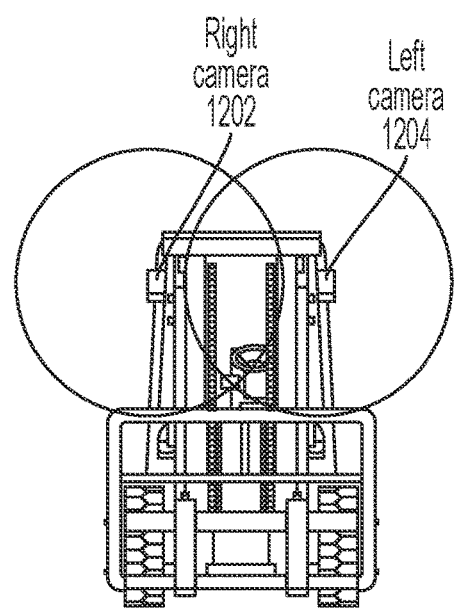
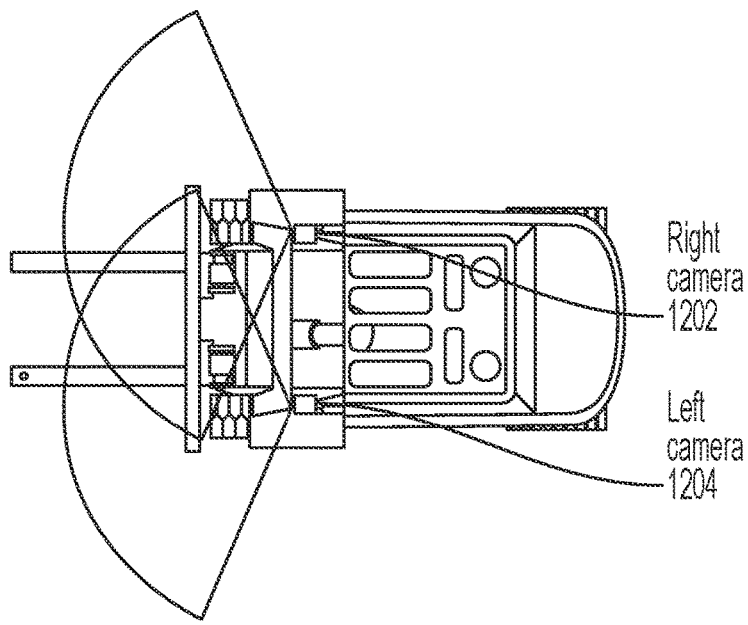
FIG. 12C

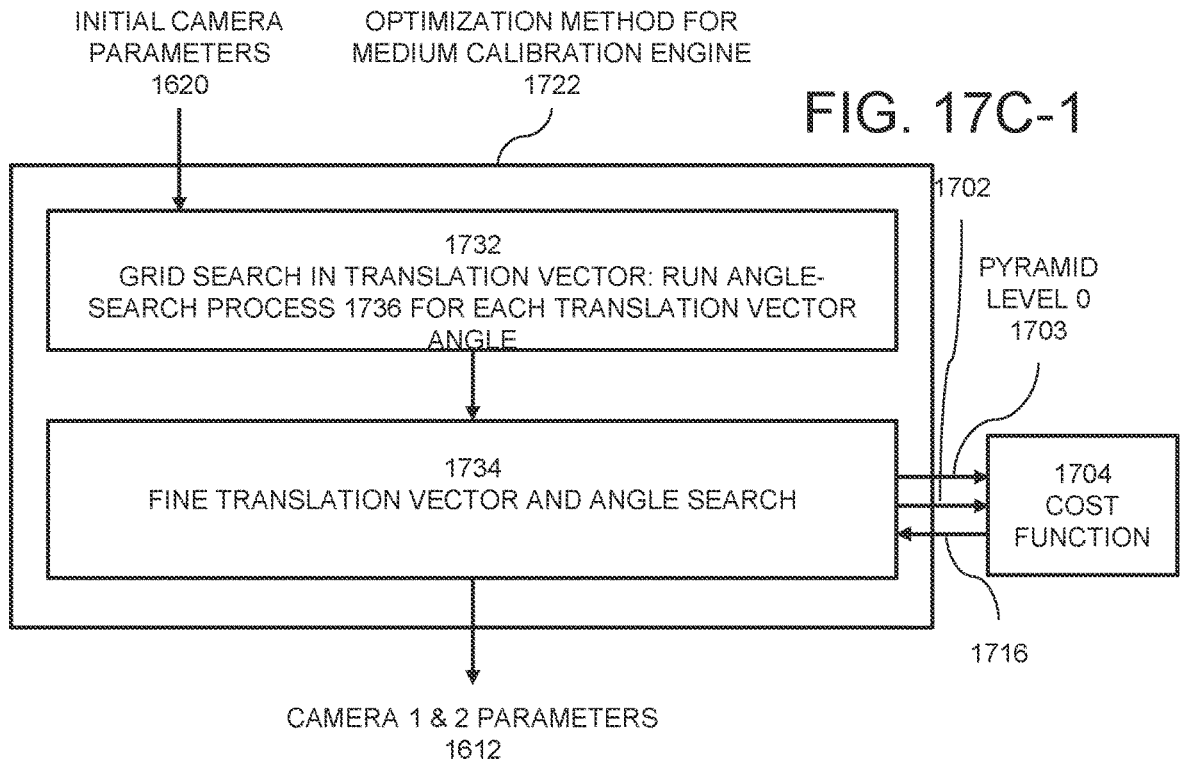
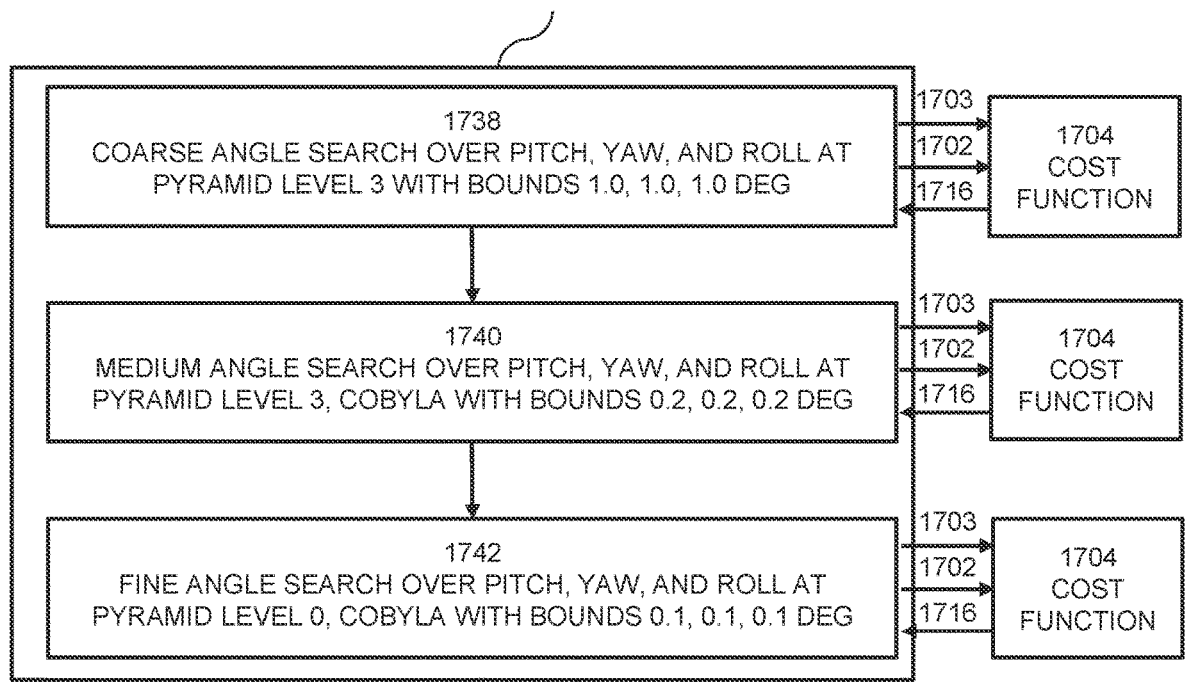

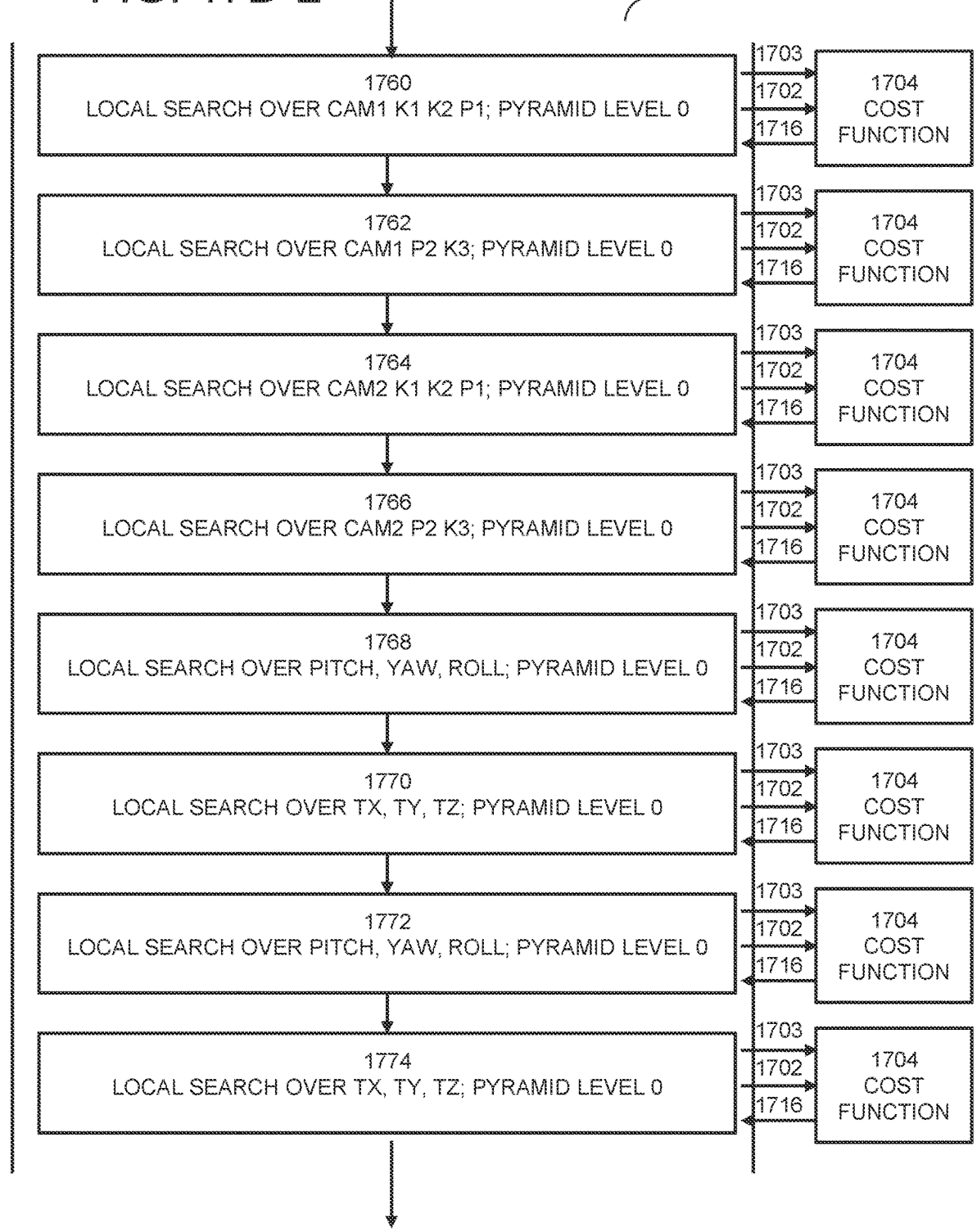

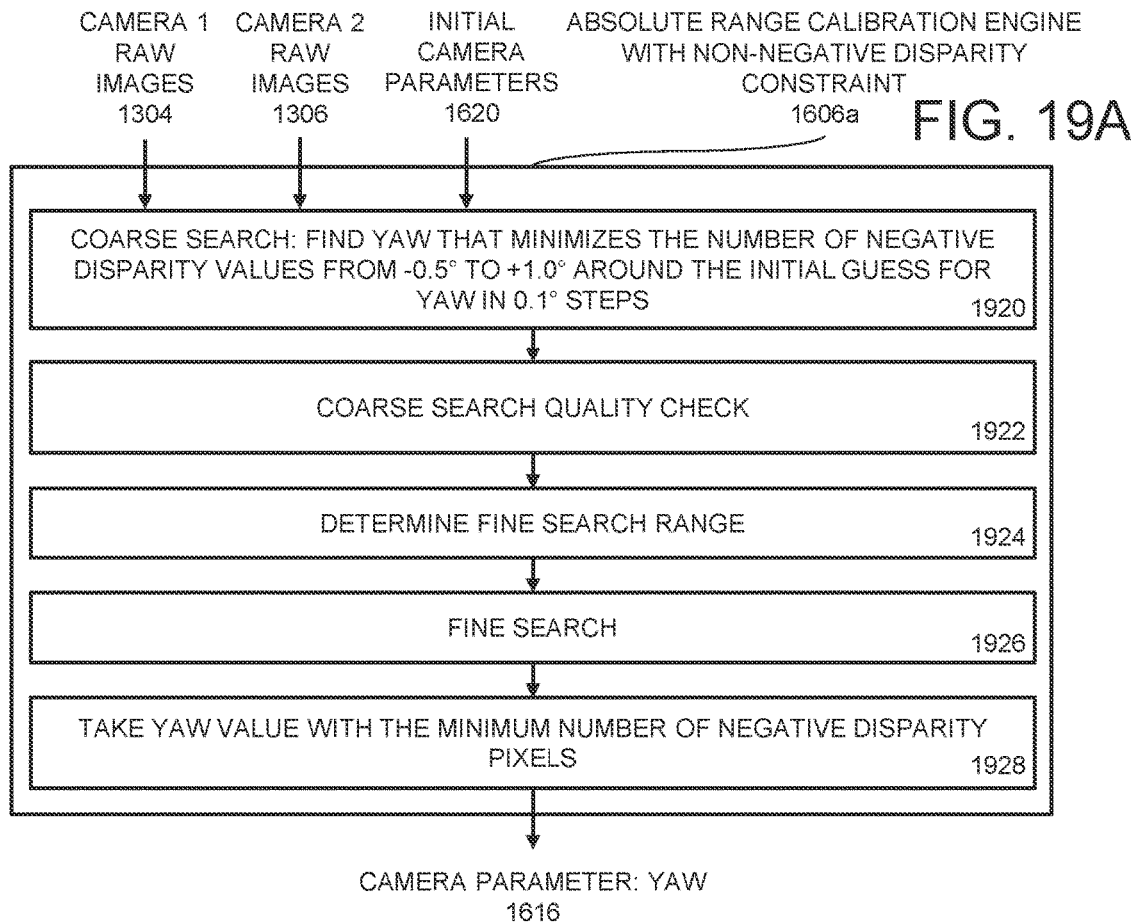
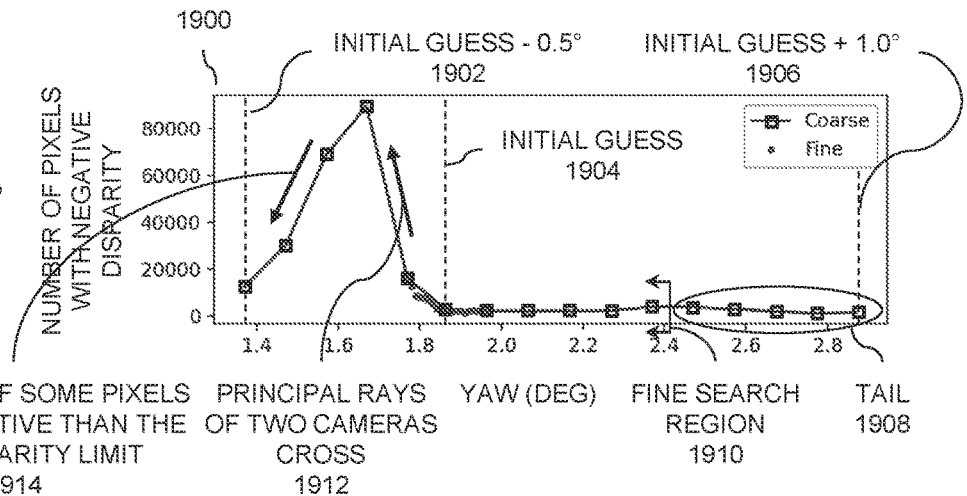

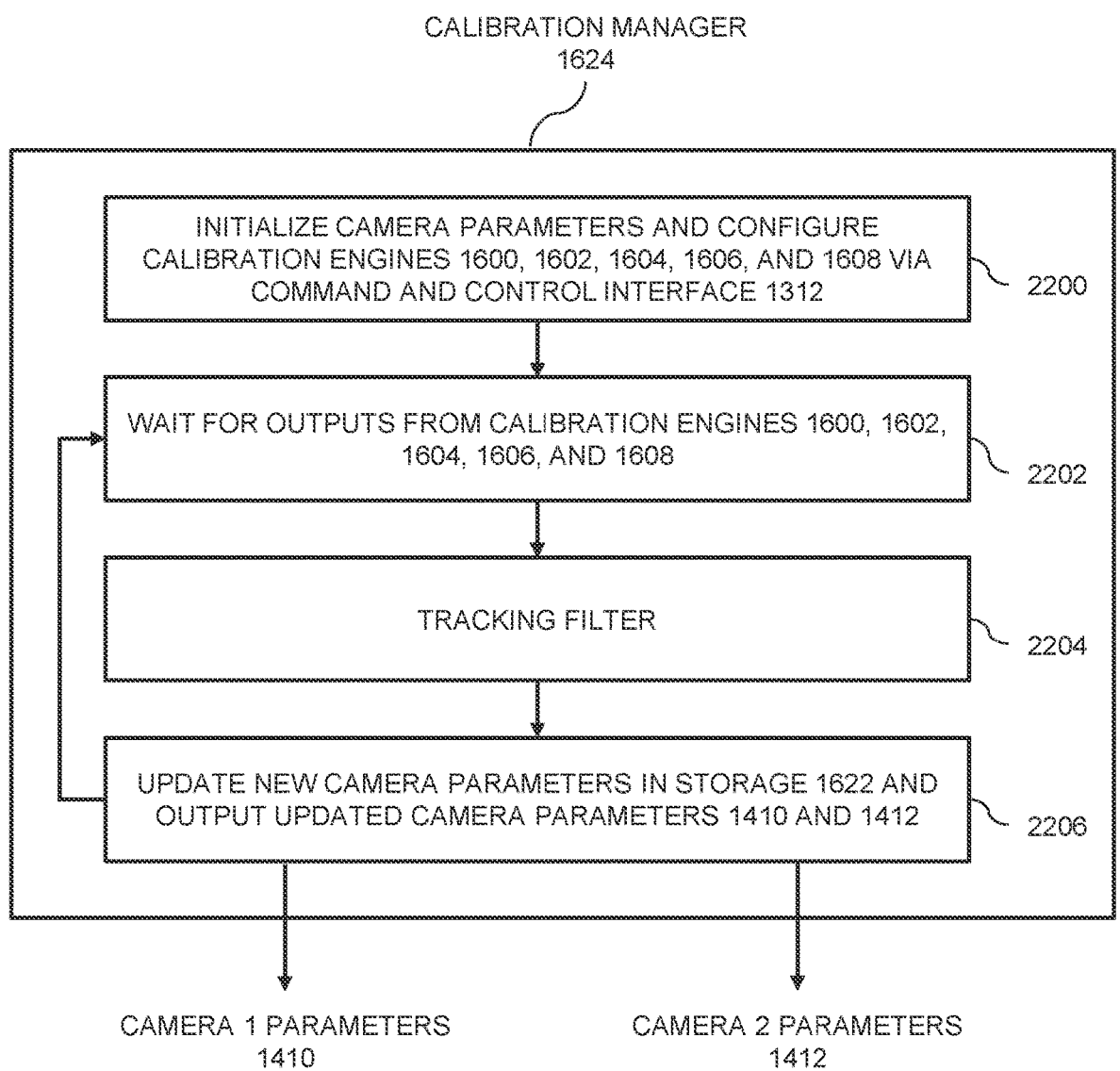

NON-RIGID STEREO VISION CAMERA SYSTEM

CROSS REFERENCE TO RELATED APPLICATIONS

The present application is a continuation of International Application No. PCT/US2021/12294 filed Jan. 6, 2021, entitled "Non-Rigid Stereo Vision Camera System," which claims the benefit of priority of U.S. Provisional Application No. 62/964,148 filed Jan. 22, 2020, entitled "Untethered Stereo Vision Camera System." The entire contents of these applications is incorporated by reference herein.

TECHNICAL FIELD

The technology of the present invention relates to stereo vision systems. In particular, the present technology relates to a stereo vision system (e.g., a stereo camera system) having characteristics for improved operation in the presence of fast and slow mechanical perturbations, and to methods for autocalibration of the system.

RELATED ART

Stereo camera systems may be used to acquire three-dimensional information about objects in the field of view by triangulation techniques.

Conventional stereo camera systems may use rigid mounting members to fix the position of cameras with respect to each other. For example, U.S. Pat. No. 6,392,688B1 discloses the use of a thick metal plate as a rigid mounting member for direct attachment of cameras and their associated CMOS sensors and lenses to mechanically stabilize the relative position of the cameras. The thickness of the plate shown in FIG. 5 of this document is approximately one-fifth of the distance between the cameras, which makes such a structure very heavy, which may not be suitable for use in a system with wide-baseline stereo cameras. For example, a stereo camera system with a 1-m baseline between cameras would need a 20-cm-thick metal plate, which would weigh 108 kg if made of aluminum (1 m×0.2 m×0.2 m). The terms "wide baseline" and "long baseline" may be used interchangeably herein.

A problem with such existing stereo camera systems is that individual camera modules (sometimes referred herein to as "camera sensors" or simply "cameras") may shift and/or rotate with respect to each other over time, which may make initial calibration parameters become inaccurate over time. It is desirable for the fields of view of the camera modules of a stereo camera system not to move relative to each other in order for the stereo camera system to remain properly calibrated. For some stereo camera systems, a relative camera orientation rotation of only 0.05 degrees can ruin the calibration of the system. Moreover, in a conventional stereo camera system, there is potential for movement of, e.g., lens holders relative to circuit boards and/or other camera components, for relative pointing between camera modules to change, and also for positions of the circuit boards and the frame itself to change over time. The multiple interfaces between components in a conventional stereo camera system make it likely that vibration, shock, and even thermal expansion between components will cause the field of view of the cameras in a stereo camera system to shift over time. The relative movement of the camera components may invalidate the initial factory calibration of the system, which may make stereo vision data obtained by the system unreliable.

Such calibration problems have not been addressed or even recognized in the prior art because prior-art stereo vision systems typically have either been laboratory systems, which generally are not subjected to shocks or vibrations, or have been used in situations such as short-range indoor robotics, which generally are not situations where highly accurate calibration is regarded as being critical. The inherent susceptibility of conventional stereo vision systems to losing calibration has therefore not been recognized as a particular problem to be solved, because conventional systems have been limited to short baseline lengths and utilize large mechanical stiffeners.

Conventional automatic calibration methods typically fall into two categories: sparse keypoint approaches and vanishing point approaches. Keypoints are points of interest that may be easily recognized in images, such as corners or edges, and often may have associated image descriptors. For example, a scale invariant feature transform (SIFT) method developed by David Lowe is an example of an algorithm for finding keypoints and providing a descriptor that is invariant to translations, rotations, and scaling transformations. Vanishing points are used to represent a point at infinite distance. Vanishing points are sensitive to camera-module orientation but not to relative translation between the camera modules, and can be used to align the orientation of a pair of stereo camera modules.

U.S. Pat. No. 8,797,387B2 and U.S. Pat. No. 10,097,812B2 disclose methods for automatically calibrating stereo vision systems using sparse keypoint approaches. The method in patent U.S. Pat. No. 8,797,387B2 extracts keypoints, matches keypoints in images from first and second cameras, and determines a camera calibration based on a single-value decomposition analysis of a vertical error. The method in patent U.S. Pat. No. 10,097,812B2 is similar to that of patent U.S. Pat. No. 8,797,387B2 but tracks keypoints over multiple image frames and uses a structure-from-motion technique to apply a three-dimensional constraint. Sparse keypoint approaches can fail when keypoints are incorrectly matched between images from the first and second cameras, which can happen in image scenes with repeating structures (e.g., picket fences, building windows, etc.). Furthermore, sub-pixel accuracy of feature points may be required to obtain camera parameters with sufficient accuracy for long-baseline and long-range operation, which is often not possible with smooth or rounded features, or with slightly defocused or blurred images. Conventional structure-from-motion calculations generally are not fast enough to compensate for calibration errors from frame to frame, and thus typically are appropriate for slow perturbations of short-baseline stereo vision systems. Another problem with sparse keypoint approaches is the sparse sampling of an image, which does not provide enough information to determine the intrinsic or extrinsic camera parameters accurately. For example, images of typical road scenes may have most features clustered in the center of the image away from the sky and away from the textureless road surface, and therefore sampling occurs generally in the center of the image. This clustered sampling does not provide enough information to determine with high accuracy the relative orientation of the stereo cameras (an extrinsic camera parameter), much less lens distortion coefficients (an intrinsic camera parameter), which are sensitive to distortions at the edges of the image. In other words, these conventional techniques do not compensate for camera parameters that may be important for proper calibration of a stereo vision system.

Japanese patent JP2008-509619A discloses a method for automatically calibrating stereo vision equipment by searching for a vanishing point and correcting for pitch and yaw errors. The method does not correct for roll errors or for a relative translation vector between the equipment's two cameras. Furthermore, the method requires straight and reliable road paint markings, which may not be available or may be obstructed by snow or faded by wear or sun exposition, thus limiting angular accuracy of the equipment's calibration.

A 2018 conference paper entitled "Flexible Stereo: Constrained, Non-rigid, Wide-baseline Stereo Vision for Fixed-Wing Aerial Platforms," by authors T. Hinzmann, T. Taubner, and R. Siegwart, discloses a method for stereo vision using components mounted on the wings of a model airplane. Because the wings are flexible and may move, the authors developed a system to compensate for relative camera motion. The system requires the use of inertial measurement units (IMUs) attached directly to stereo cameras to measure acceleration and angular rates of the cameras. The system then computes the relative orientation and position of the cameras using an extended Kalman filter. One disadvantage of this system is that it requires IMU hardware and cannot correct for camera position from a video stream alone. Another disadvantage is that the IMUs can be used to compensate for fast perturbations but not for slow perturbation (e.g., a slow drift of positions of the cameras), which means that the cameras may need to be manually calibrated on a frequent basis (e.g., daily).

SUMMARY

The calibration problems described above may be exacerbated in long-baseline stereo vision systems, where the distance between camera modules is, e.g., greater than approximately 20 cm, and in systems where it is not possible to connect two or more camera modules with heavy structural beams or mounting members. For styling and for an optimal viewing vantage point, it is sometimes desirable to mount independent cameras on structures that are non-rigid (e.g., a flexible structure). For example, mounting a pair of stereo cameras in a vehicle's headlights, at upper corners of a windshield of a vehicle, or on side-view mirrors of a vehicle, would be advantageous as such locations would be convenient for establishing a long baseline for a stereo vision system in a vehicle (e.g., a car, a truck, a bus, etc.). However, these locations are not sufficiently rigid to maintain calibration over hours or days, much less a 15-year lifetime of a typical vehicle. In some cases, it may not be realistically possible to add rigid mechanical support structures between the headlights, the upper corners of the windshield, and the side-view mirrors, because a shortest path for these support structures may be blocked by an engine block, may block a driver's view, and may be blocked by the driver himself/herself, respectively. Furthermore, even if supporting structures could be added, a thickness and weight of such structures required to provide adequate structural support may be impractical. That is, because a beam's deflection displacement scales as the cube of the beam's length, the longer the beam the greater the beam may displace for the same amount of force applied to the beam. For example, for the same end force, a 2-m baseline stereo vision system will displace 1000 times more than a 20-cm baseline stereo vision system. This scaling has resulted in commercially available stereo vision systems to be physically limited to baselines of less than 20 cm. There is a need for a stereo vision system that may operate in high vibrational and shock environments, that may be mounted on non-rigid structures, that may support long-baseline and long-range stereo vision, and that may operate with high accuracy.

Automatic calibration technology suitable for long-baseline and non-rigid structures has not been achieved prior to the technology disclosed herein for at least four reasons: (1) magnitude: by physics, beam displacements increase as the cube of beam length (see discussion above) and therefore the magnitude of relative camera displacements increases with beam length. The additional structural support to ensure rigidity and prevent camera displacements may not be realistically achievable; (2) bandwidth: a calibration speed of an autocalibration system should increase with increasing baseline length to account for both slow and fast variations. The processor hardware required to achieve the needed computational speed may be costly and may add unwanted complexity to the system; (3) accuracy: a calibration accuracy needed for long-baseline systems may be much greater than for short-baseline systems, because greater angular accuracies are required to estimate targets at longer distances; and (4) completeness: whereas conventional techniques for automatic calibration of stereo cameras may compensate for a few camera parameters (e.g., the relative orientation of the stereo cameras), a full calibration would require compensating for all extrinsic and intrinsic camera parameters. Prior to the technology presented herein, a system that addresses these four reasons has not yet been achieved.

The inventive technology described herein and claimed in the claims is directed to a stereo vision system in which no rigid mounting member is required. Vision may be achieved via a plurality of vision sensors (e.g., camera modules). In some aspects of the present technology, first and second camera modules (e.g., camera sensors) may be placed on or attached to structures that may flex, shift, bend, or/and move. As noted elsewhere herein, the terms camera sensor, camera module, and camera may be used interchangeably. A stereo camera system according to aspects of the present technology may be comprised of a processor configured to perform active tracking and compensation for movement of a first camera relative to a second camera, to provide accurate depth maps over all motion frequencies from slow material deformations due to, e.g., temperature changes, to fast vibrational motions due to, e.g., road or engine noise. Because there is no requirement for rigid mounting of cameras, aspects of the present technology may enable wide-baseline stereo configurations for long-range measurements without requiring periodic manual calibration. According to an aspect of the present technology, a stereo vision system is provided. The stereo vision system may be comprised of: a first camera sensor configured to sense first reflected energy of a first image and to generate first sensor signals based on the first reflected energy; a second camera sensor configured to sense second reflected energy of a second image and generate second sensor signals based on the second reflected energy; at least one processor configured to receive the first sensor signals from the first camera sensor and the second sensor signals from the second camera sensor, and to produce three-dimensional (3D) data from the first and second sensor signals. The at least one processor may be configured to: generate rectified stereo images from the first and second sensor signals utilizing stereo calibration parameters, perform a stereo matching on the rectified images, and perform an automatic system calibration using data from a plurality of stereo images obtained by the first and second camera sensors. The automatic system calibration may be based on minimizing a cost function. In some embodiments of this aspect, the first reflected energy and/or the second reflected energy may be comprised of light energy or photons originating from at least one electronic device (e.g., headlight(s), streetlight(s), laser(s), etc.). In some embodiments of this aspect, the first reflected energy and/or the second reflected energy may be comprised of solar light energy or photons originating from the sun. In some embodiments of this aspect, the first reflected energy and/or the second reflected energy may be comprised of a combination of solar light energy and light energy originating from an electronic device.

According to another aspect of the present technology, a computer-implemented method for detection of an object in an image is provided. The method, which may be performed by one or more processor(s), may be comprised of: identifying connected component regions on the object by color; determining an aspect ratio of each of the connected component regions; determining a distance between the connected component regions; and identifying the object to be a known object based on the aspect ratios and the distance between the connected component regions. Any one or any combination of: a presence, a location, and a size of the known object may be determined from the image.

According to another aspect of the present technology, a computer-implemented calibration method to calibrate a stereo vision system is provided. The method may be performed by one or more processor(s). The stereo vision system may include a first camera sensor configured to sense first reflected energy of a first image and to generate first sensor signals based on the first reflected energy and a second camera sensor configured to sense second reflected energy of a second image and generate second sensor signals based on the second reflected energy. The method may be comprised of: generating stereo images from the first and second sensor signals; rectifying the stereo images using stereo calibration parameters, to produce rectified stereo images; performing a stereo matching on the rectified stereo images; and performing an automatic system calibration using a result of the stereo matching. The automatic system calibration may be based on minimizing a cost function. In some embodiments of this aspect, the first reflected energy and/or the second reflected energy may be comprised of light energy or photons originating from at least one electronic device (e.g., headlight(s), streetlight(s), laser(s), etc.). In some embodiments of this aspect, the first reflected energy and/or the second reflected energy may be comprised of solar light energy or photons originating from the sun. In some embodiments of this aspect, the first reflected energy and/or the second reflected energy may be comprised of a combination of solar light energy and light energy originating from an electronic device.

According to another aspect of the present technology, a non-transitory computer readable medium is provided in which is stored computer-executable code that, when executed by one or more processor(s), may cause the one or more processor(s) to calibrate a stereo vision system that may include a first camera sensor configured to sense first reflected energy of a first image and to generate first sensor signals based on the first reflected energy and a second camera sensor configured to sense second reflected energy of a second image and generate second sensor signals based on the second reflected energy. The method may be comprised of: generating stereo images from the first and second sensor signals; rectifying the stereo images using stereo calibration parameters, to produce rectified stereo images; performing a stereo matching on the rectified stereo images; and performing an automatic system calibration using a result of the stereo matching. The automatic system calibration may be based on minimizing a cost function. In some embodiments of this aspect, the first reflected energy and/or the second reflected energy may be comprised of light energy or photons originating from at least one electronic device (e.g., headlight(s), streetlight(s), laser(s), etc.). In some embodiments of this aspect, the first reflected energy and/or the second reflected energy may be comprised of solar light energy or photons originating from the sun. In some embodiments of this aspect, the first reflected energy and/or the second reflected energy may be comprised of a combination of solar light energy and light energy originating from an electronic device.

BRIEF DESCRIPTION OF DRAWINGS

FIG. 6 shows a schematic view of cameras of a stereo vision system mounted on a traffic light, according to some embodiments of the present technology.

FIGS. 12A, 12B, and 12C show a side elevational view, a front elevational view, and a plan view of cameras of a stereo vision system mounted on an automated forklift, according to some embodiments of the present technology.

FIG. 17C-1 shows a flow diagram of a medium optimization method, according to some embodiments of the present technology.

FIG. 17C-2 shows a flow diagram of an angle-search process of the medium optimization method of FIG. 17C-1, according to some embodiments of the present technology.

FIGS. 17D-1 through 17D-4 show flow diagrams of a slow optimization method, according to some embodiments of the present technology.

FIG. 19A shows a block diagram of a procedure of an absolute range calibration engine of the autocalibration engine of FIG. 16, in which the procedure has a non-negative disparity constraint, according to some embodiments of the present technology; and FIG. 19B is a chart showing how a number of pixels with negative disparity can vary as a function of yaw, according to some embodiments of the present technology.

FIG. 22 shows a flow diagram of a procedure of a calibration manager of the autocalibration engine of FIG. 16, according to some embodiments of the present technology.

DETAILED DESCRIPTION

The inventors have developed image processing techniques that may enable a stereo vision system to produce depth maps with high quality even in the presence of vibrations and even when a mounting structure for cameras of the system is not rigid (e.g., the mounting structure may be deformed easily from external forces). The inventors have recognized that a camera autocalibration method that may compensate for both fast and slow perturbations may enable long-baseline (also referred to herein as "wide-baseline") stereo vision systems to be used on dynamic platforms, such as robots, cars, trucks, light posts, construction cranes, aircraft, etc.

For vehicles such as automobiles and trucks, there are mounting locations that may be preferred or even ideal for aesthetic design, for manufacturing, and/or for providing optimal vantage points for sensors or cameras of a stereo vision system; however, these mounting locations may not have sufficient rigidity or stability to support a strict angular tolerance of cameras used in conventional stereo vision systems. Perturbing a relative pointing direction of stereo cameras by only 0.05 degrees of some conventional stereo vision systems can result in depth maps that may be ruined because they provide unreliable range estimates.

Figure 1A:
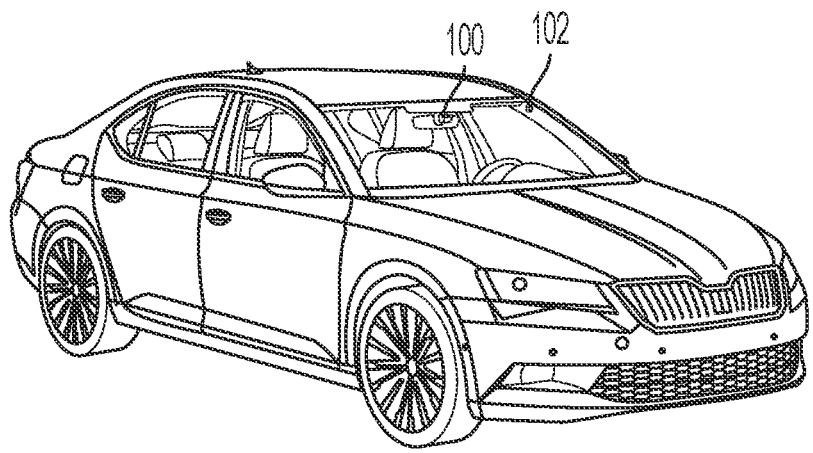
FIGS. 1A-1C show three different locations for mounting cameras in or on a car without using or requiring large and heavy structural support material between the cameras, according to some embodiments of the present technology.
Figure 1B:
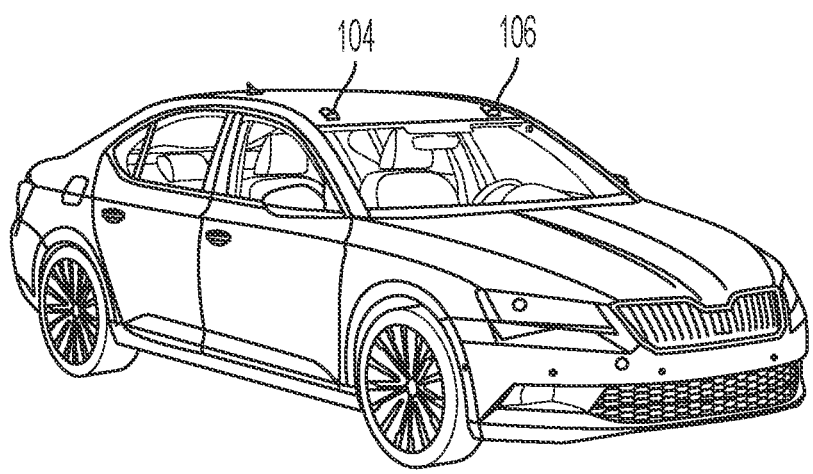
Figure 1C:
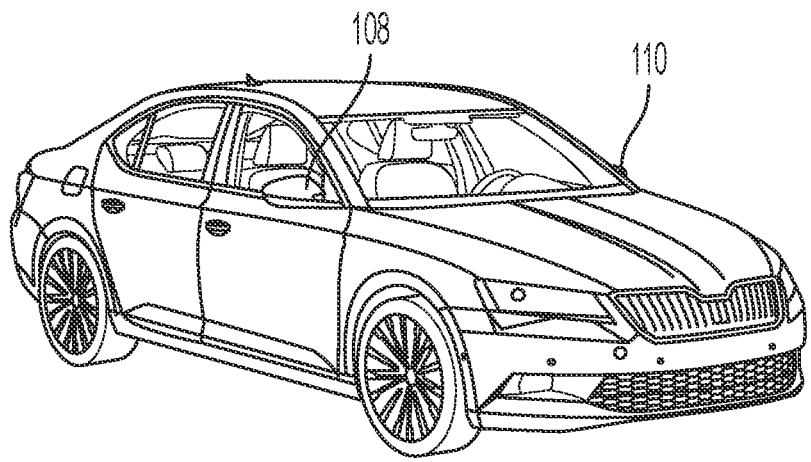

FIGS. 1A-1C show three different locations for mounting cameras in or on a vehicle without using or requiring large and heavy structural support material between the cameras, according to some embodiments of the present technology.

FIG. 1A shows a mounting configuration of a stereo vision system according to some embodiments of the present technology, in which a left camera 100 and a right camera 102 of the system may be mounted at a top portion of a front windshield of a vehicle. This location may be desirable because the cameras 100, 102 are internal to a cabin of the vehicle and therefore may be protected from dust and rain. For example, windshield wipers may be used to clear debris (e.g., rain, snow, leaves, etc.) away from a field of view of the cameras 100, 102. In some embodiments, the right camera 100 and the left camera 102 may be mounted asymmetrically and may be arranged to be within a cleaning zone of the vehicle's windshield wipers. In some embodiments, a typical baseline width between the right camera 100 and the left camera 102 may be approximately 80 cm, which is a width that, with conventional stereo vision systems, would require an impractically thick, heavy, rigid, structural member to connect the two cameras 100, 102. As will be appreciated, such a structural member could obstruct a human driver's vision. Conventional autonomous test vehicles that have stereo cameras with a baseline that is greater than 50 cm typically use bulky slotted aluminum members with 45 mm×45 mm or 90 mm×90 mm profiles to provide enough rigidity to maintain camera alignment over a day or sometimes longer.

FIG. 1B shows a mounting configuration of a stereo vision system according to some embodiments of the present technology, in which a left camera 104 and a right camera 106 of the system may be mounted on a roof portion of a vehicle. The roof portion may provide a high vantage point, which may allow the vision system to see over objects in front of the vehicle and to be far from splash and spray from wet pavement and road debris. In some embodiments, the camera 104, 106 may be mounted onto a roof headliner without using extra structural material to stabilize the cameras 104, 106. Furthermore, in some embodiments, camera enclosures used with the camera 104, 106 may contain one or more cleaning devices (e.g., heater elements configured to remove frost and/or to defog, a sprayer for liquid and/or air configured to remove solid debris, etc.). In some embodiments, a typical baseline width between the left camera 104 and right camera 106 may be 1.25 m. In some implementations, the cameras modules 104, 106 on the roof portion of the vehicle may have little or no effect on the vehicle's styling. For example, in some embodiments, the cameras 104, 106 may be placed seamlessly in line with a roof rack of the vehicle.

FIG. 1C shows a mounting configuration of a stereo vision system according to some embodiments of the present technology, in which a left camera 108 and right camera 110 of the system may be mounted on side-view mirrors of a vehicle. The side-view mirrors may offer a widest baseline, typically 2.1 m, for a forward-looking stereo vision system, but may experience more perturbations than the mounting configurations shown in FIGS. 1A and 1B. For typical vehicles, the side-view mirrors are at the extremities of the vehicle. Typical side-view mirrors are mounted to an articulated joint and are light structures that are sensitive to internal vibration sources (e.g., the vehicle's engine) as well as external perturbations (e.g., from wind, road vibration, etc.). Cameras mounted on side-view mirrors generally experience fast perturbations as well as slow perturbations.

Figure 2A:
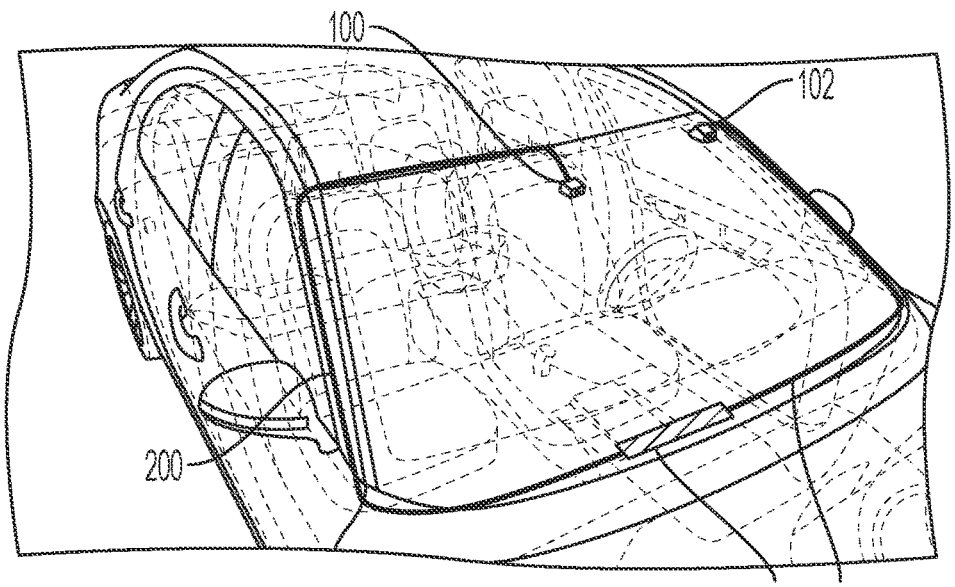
FIGS. 2A-2C show translucent or partially transparent views of the cars of FIGS. 1A-1C, respectively, according to some embodiments of the present technology.
Figure 2B:
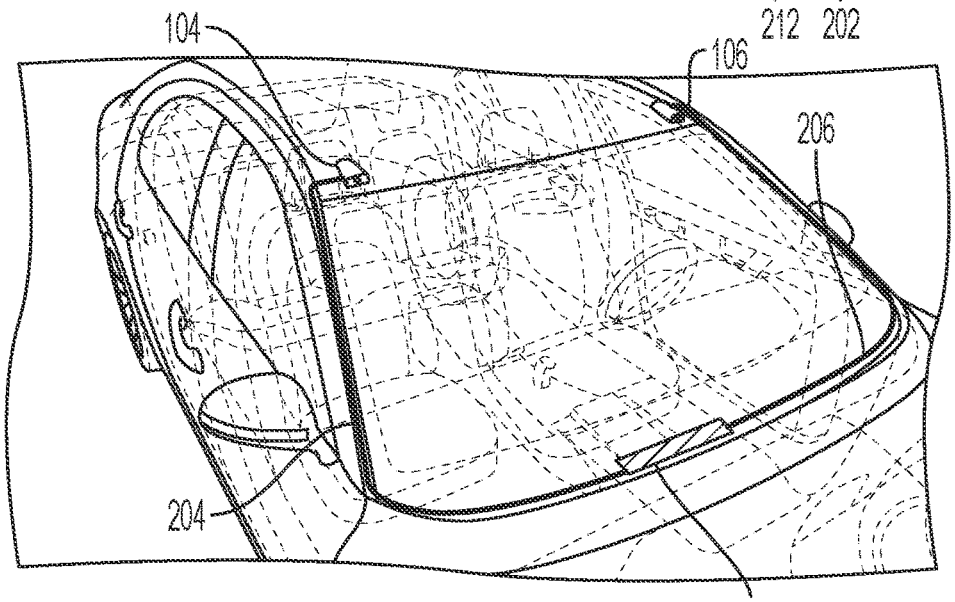
Figure 2C:
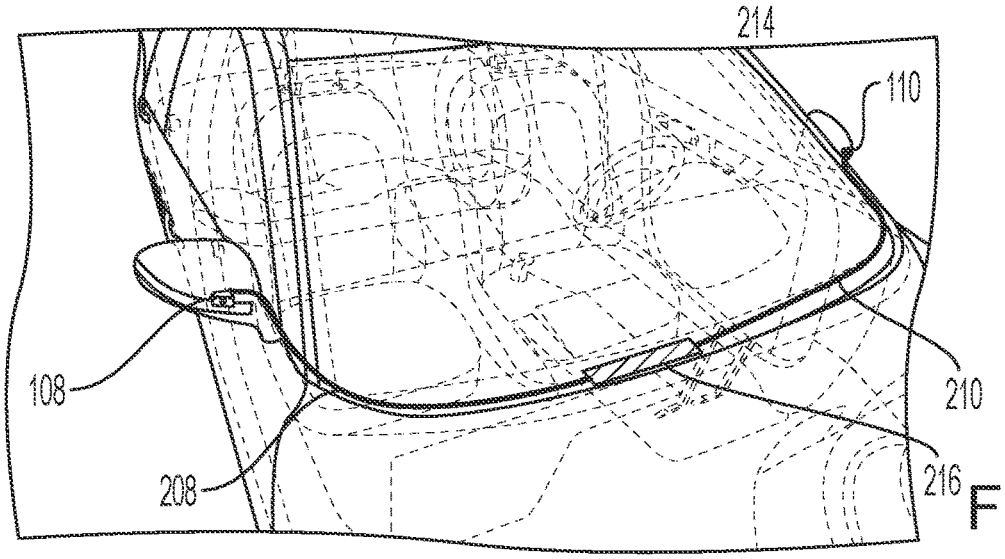

FIGS. 2A-2C show translucent or partially transparent views of the vehicles of FIGS. 1A-1C, respectively, according to some embodiments of the present technology. In some embodiments, wires 200, 202, 204, 206, 208, 210 may connect the cameras 100, 102, 104, 106, 108, 110 to electronic control units 212, 214, 216. The wires 200, 202, 204, 206, 208, 210 may be configured to transmit data to the electronic control units 212, 214, 216 and supplying power to the cameras 100, 102, 104, 106, 108, 110.

FIG. 3A through FIG. 12 show various embodiments of stereo vision systems on different platforms that may move or flex, that may be subject to vibrations and shocks, and that may be inconvenient or costly to calibrate manually, and/or that may need to operate for years without manual calibration and maintenance. In FIG. 3A through FIG. 12, cameras of the systems may be shown mounted on the platforms but electronic control units and wiring may not be shown as they may be mounted inside a chassis of the platforms or inside the platforms themselves, according to some embodiments of the present technology.

Figure 3A:
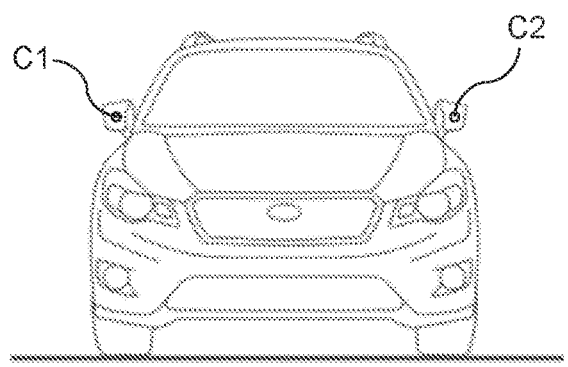
FIGS. 3A-3F show view of forward-looking stereo-vision camera modules mounted in a car at various locations, according to some embodiments of the present technology.
Figure 3D:
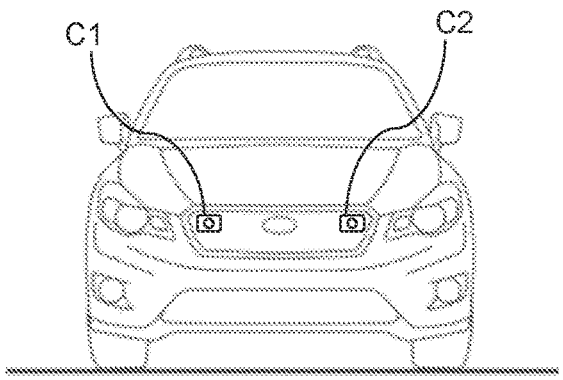
Figure 3B:
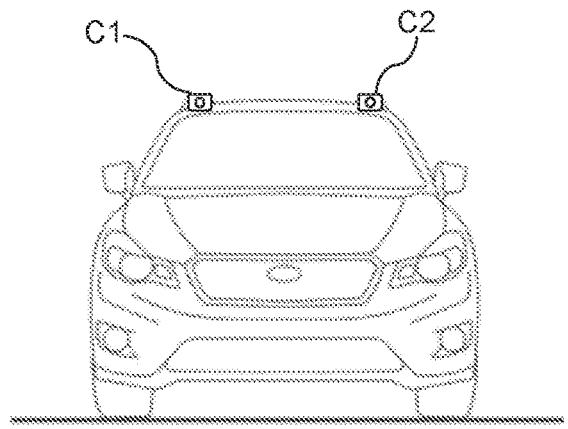
Figure 3E:
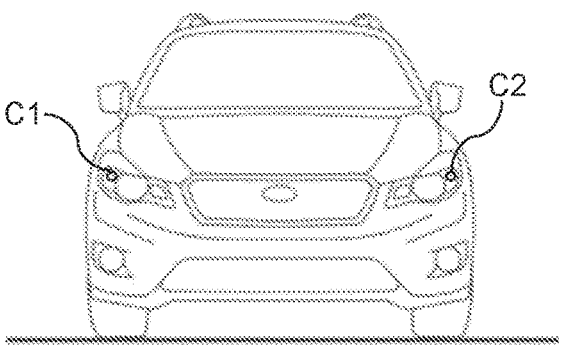
Figure 3C:
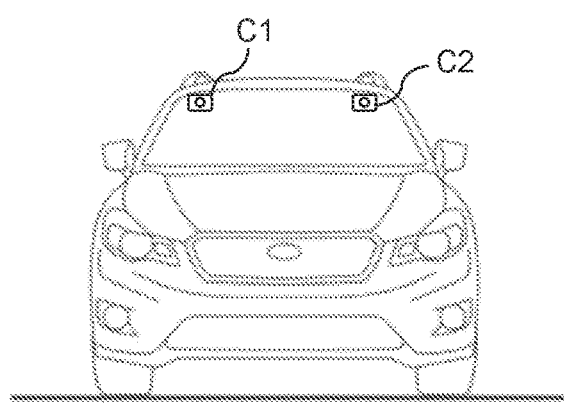
Figure 3F:
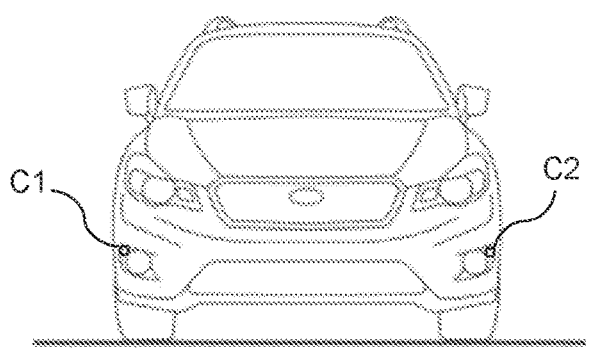

FIGS. 3A-3F show camera modules C1, C2 for a forward-looking stereo vision system mounted in or on a car at various locations, according to some embodiments of the present technology. These locations typically do not provide optical rigidity to ensure alignment of stereo vision cameras over the car's lifetime nor even over temperature ranges experienced by typical cars during, e.g., seasonal changes and/or temperature swings from nighttime to daytime. FIG. 3A shows the cameras C1, C2 mounted on side-view mirrors. FIG. 3B shows the cameras C1, C2 mounted on a roof. FIG. 3C shows the cameras C1, C2 mounted behind the car's windshield glass. FIG. 3D shows the cameras C1, C2 mounted in the car's grille. FIG. 3E shows the cameras C1, C2 mounted in the car's headlight housings. FIG. 3F shows the cameras C1, C2 mounted in the car's fog-light housings.

Figure 4:
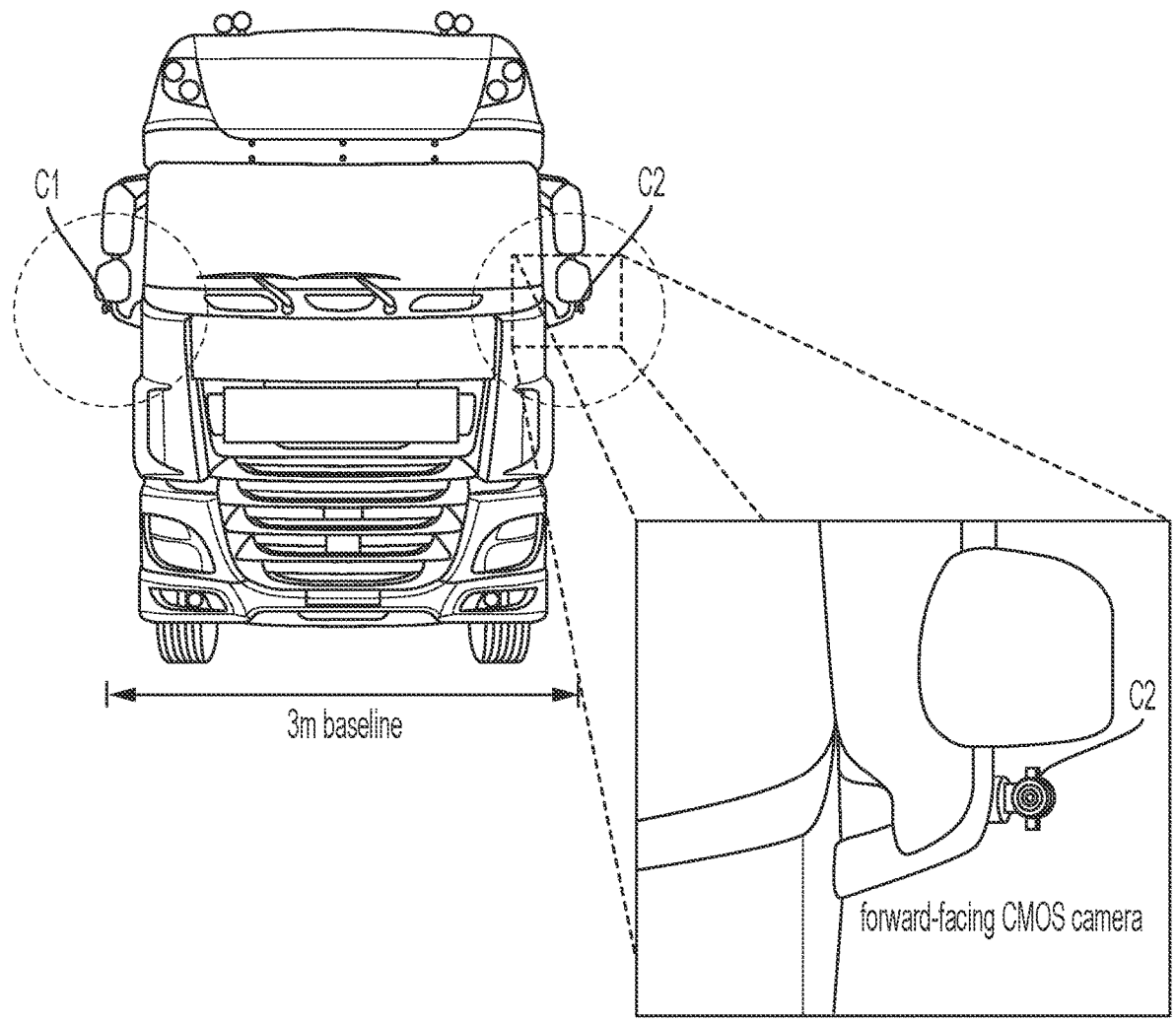
FIG. 4 shows a view of a forward-looking stereo-vision camera sensors mounted on a truck, according to some embodiments of the present technology.

FIG. 4 depicts camera modules C1, C2 of a forward-looking stereo vision system according to some embodiments of the present technology, with the camera modules C1, C2 mounted on side-view mirrors of a truck. The truck may have a wide baseline length of approximately 3 m from a left side-view to a right side-view mirror, which may enable very long-range stereopsis. In some embodiments, the camera modules C1, C2 may be comprised of CMOS sensors.

Figure 5A:
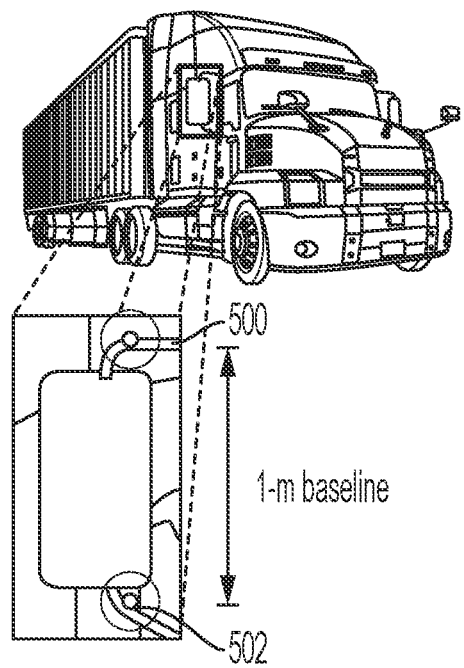
FIGS. 5A-5C show a perspective view, a plan view, and a front elevational view of a side- and back-looking camera modules of a stereo vision system, with the camera modules mounted on a side-view mirror of a truck, according to some embodiments of the present technology.
Figure 5B:
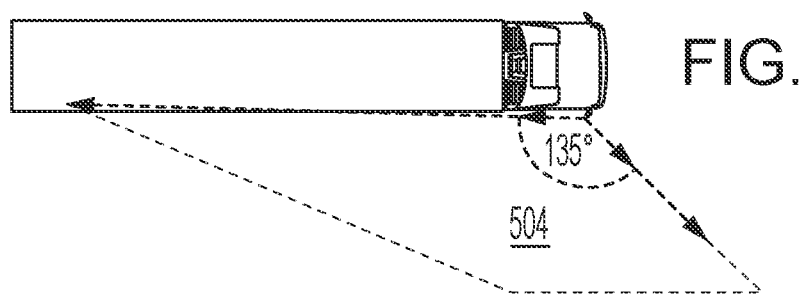
Figure 5C:
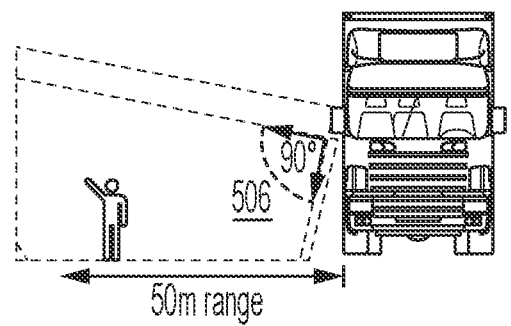

FIGS. 5A-5C show an arrangement for a side- and back-looking stereo vision system, according to some embodiments of the present technology, with camera modules 500, 502 shown to be mounted on a right side-view mirror of a truck in FIG. 5A. FIG. 5A is an isometric or perspective view, FIG. 5B is a top or plan view, and FIG. 5C is a front elevational view of the truck. In some embodiments, a duplicate stereo vision system may be also mounted on a left side-view mirror of the truck, to sense objects on the truck's left side. The duplicate stereo vision system is not shown in the drawings, to avoid unnecessary clutter. The two camera modules 500, 502 of the stereo vision system may be mounted vertically and may be spaced apart by approximately 1 m. As will be appreciated, stereo matching may be performed to match images from cameras oriented any angle relative to each other. For example, stereo matching of images from cameras arranged vertically relative to each other may correlate horizontal lines or rows of pixels of the images, stereo matching of images from cameras arranged horizontally relative to each other may correlate vertical lines or columns of pixels of the images, etc. A depth range of a stereo vision system may be proportional to a distance between cameras of the system. For the system shown in FIGS. 5A-5C, the system may have a horizontal field of view 504 of 135 degrees, as depicted in FIG. 5B, and may have a vertical field of view 506 of 90 degrees, as depicted in FIG. 5C. As will be appreciated, in other embodiments of the present technology other fields of view are possible via, e.g., different camera lenses (e.g., standard lenses, different types of wide-angle lenses, etc.). A side- and back-looking stereo vision configuration, such as that of FIGS. 5A-5C, may be particularly useful for sensing and thus avoiding pedestrians, sensing and thus avoiding cyclists, and sensing vehicle cut throughs. Conventional stereo vision systems typically have very poor depth ranges, especially wide field-of-view systems, because in such systems the ability to estimate angles accurately degrades as each pixel is mapped to a larger range of angles. As will be appreciated, a depth-range resolution of a stereo vision system may be proportional to the system's field-of-view. For a wide-baseline stereo vision system it may be advantageous to use wide field-of-view cameras because the system's depth-range resolution may be inversely proportional to a baseline length of the system's stereo cameras. Therefore, embodiments of the present technology may enable long-range, surround-view three-dimensional ("3D") sensing of objects by enabling long stereo-vision baselines (e.g., 1 m or greater) in comparison with only about 5-cm to 10-cm baselines in conventional stereo imaging systems.

FIG. 6 shows two cameras 600, 606 of a stereo vision system mounted on a traffic light pole 602, according to some embodiments of the present technology. The two cameras 600, 606 may be separated by a long baseline limited by a length of a boom 602a of the traffic light pole 602. Some traffic light poles may support stereo-vision baseline lengths of approximately 5 m, which may allow for extremely long-range depth estimation (e.g., in excess of 300 m), which may enable measurement of a queue length of vehicles in a traffic queue for intelligent switching of traffic lights 604. As will be appreciated, booms of traffic light poles may flex (e.g., with high winds, movement of objects dangling from the booms, road vibrations from passage of large trucks nearby, etc.). Such flexing may be experienced by the cameras 600, 606, and such flexing may be magnified by long poles 608 holding the cameras 600, 606. Thus, a long baseline length may cause the two cameras 600, 606 to misalign quickly in a typical operating environment of the traffic light pole 602.

Figure 7:
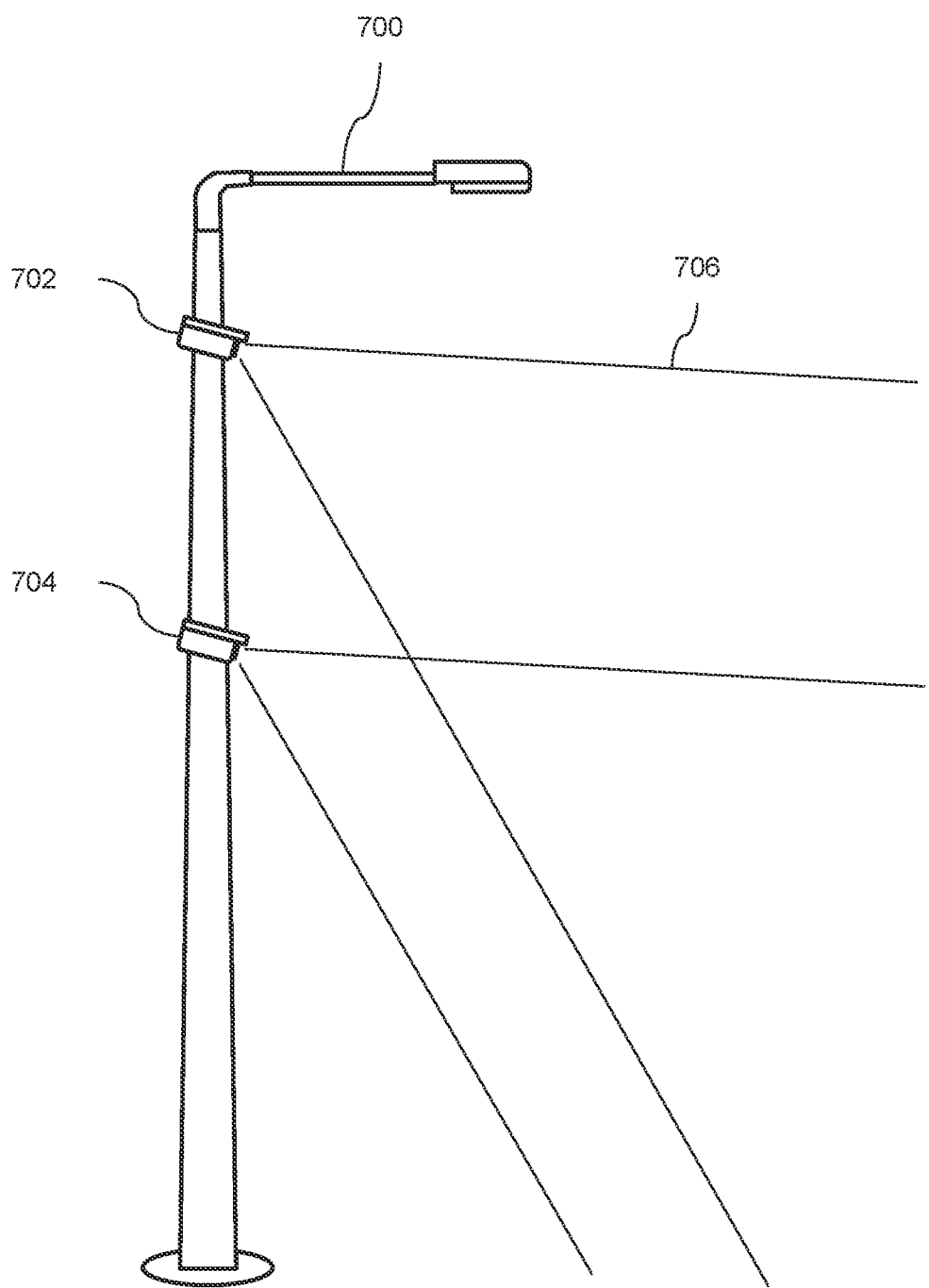
FIG. 7 shows a schematic view of cameras of a stereo vision system mounted on a lamp post, according to some embodiments of the present technology.

FIG. 7 shows two cameras 702, 704 of a stereo vision system mounted on a lamp post 700, according to some embodiments of the present technology. The two cameras 702, 704 may be mounted vertically and may be pointed slightly downward to view a region of interest (e.g., a pedestrian crosswalk). For example, an upper edge 706 of the field of view of the camera 702 may be deviated from a horizontal line by less than about 30 degrees (e.g., 20 degrees, 10 degrees, 5 degrees). A baseline distance between the two cameras 702, 704 may be several meters or more (e.g., 3 m, 3.5 m, 4 m, 4.5 m, etc.). A similar vertical configuration of cameras may be mounted on sign poles, telephone/utility poles, and the like.

Figure 8:
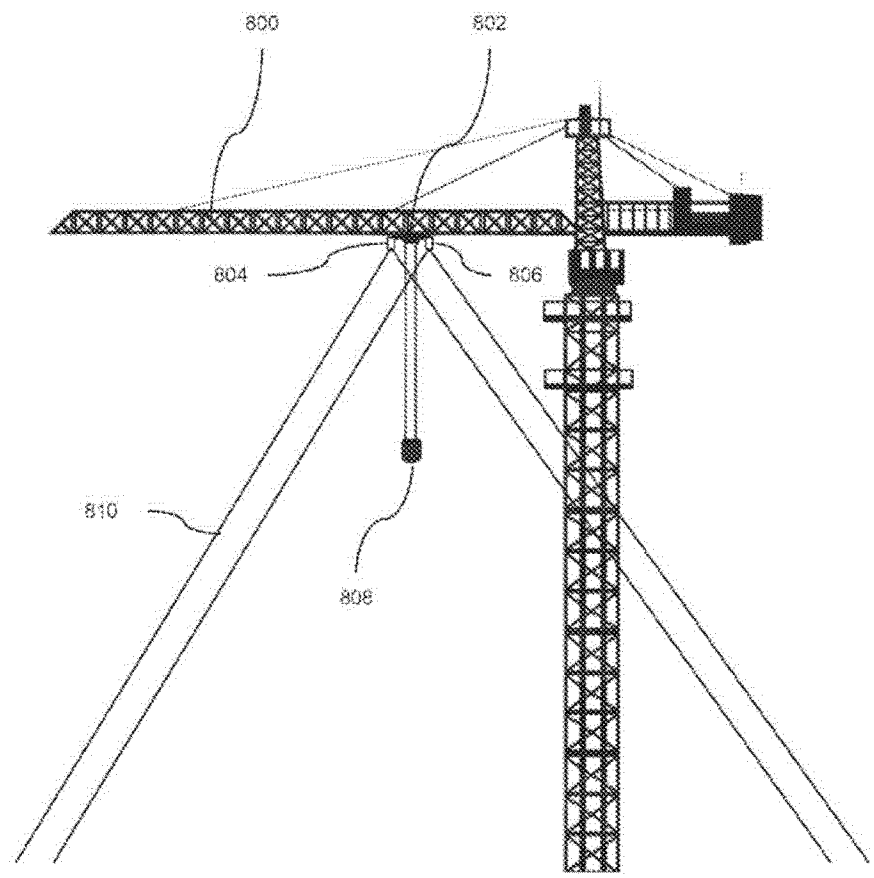
FIG. 8 shows a schematic view of cameras of a stereo vision system mounted on a construction crane, according to some embodiments of the present technology.

FIG. 8 shows cameras 804, 806 of a stereo vision system mounted on a construction crane 800, according to some embodiments of the present technology. The cameras 804, 806 may be mounted on a trolley 802 and arranged to have a downward field of view to, e.g., monitor a payload 808 and a surrounding construction environment nearby and underneath the payload 808. A typical field of view 810 may be about 90 degrees to about 120 degrees and may extend in the direction parallel or nearly parallel to a boom of the crane 800. A distance between the cameras 804, 806 may be about 2 m to 5 m, depending on the desired minimum depth range and depth-range resolution. A boom length of approximately 50 m and a crane height of approximately 200 m may make a wide-baseline, long-range stereo vision system an attractive solution for monitoring an environment of construction cranes, especially when construction shocks and vibrations may make it difficult to maintain a constant a relative position between the cameras 804, 806.

Figure 9:
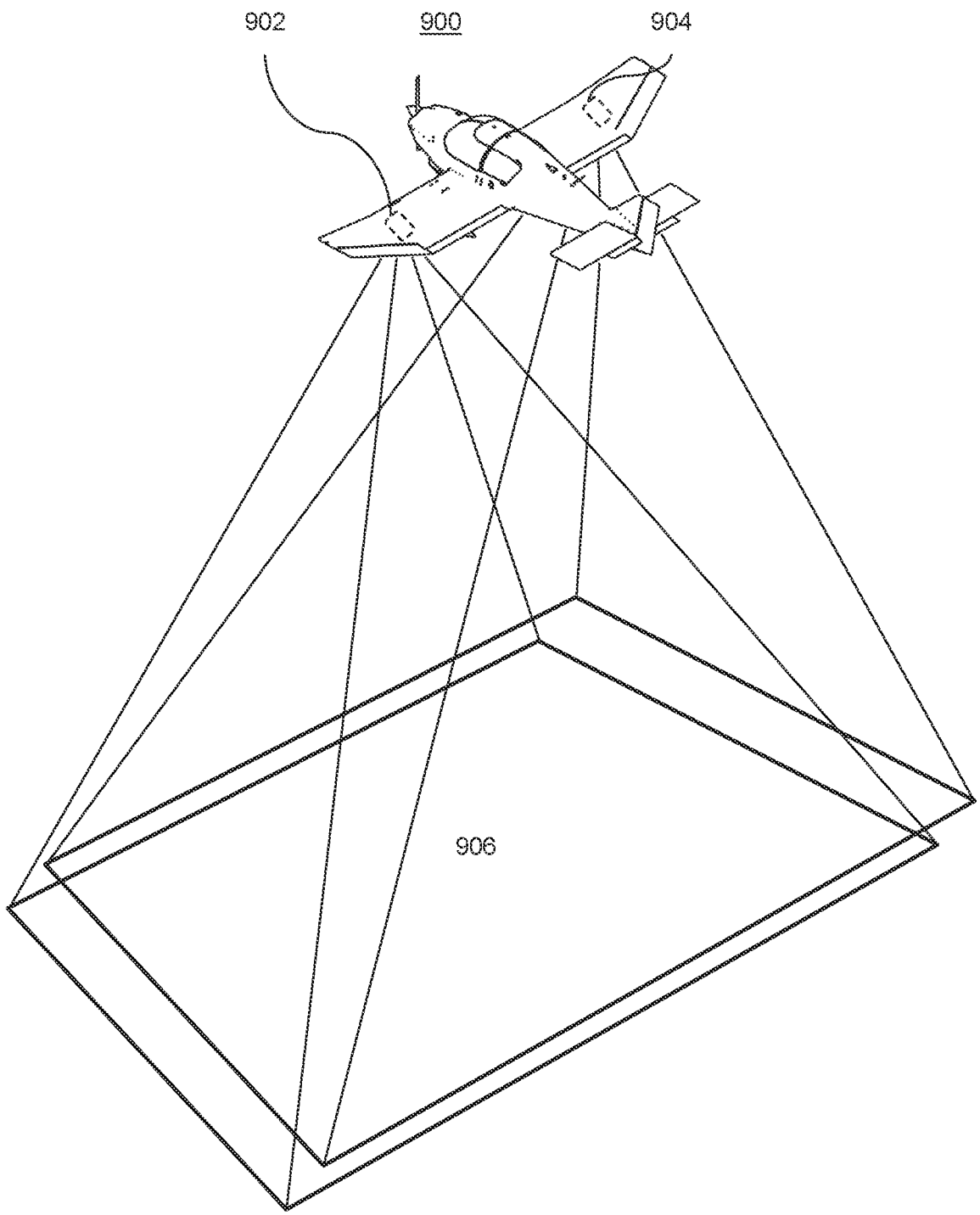
FIG. 9 shows a schematic view of cameras of a stereo vision system mounted on a fixed-wing aircraft, according to some embodiments of the present technology.

FIG. 9 shows two cameras 902, 904 of a stereo vision system mounted on a fixed-wing aircraft 900, according to some embodiments of the present technology. The aircraft 900 may be, e.g., a crop duster, an unmanned aerial vehicle (UAV), a quad- or hexa-copter, an airplane, and the like. In some embodiments, the cameras 902, 904 may be mounted on an underside of a wing of the aircraft 900 and pointed downward to view a ground region 906. In some embodiments, the two cameras 902, 904 may be pointed in a forward direction or in a backward direction. Because the wings may flex or move during operation of the aircraft 900, the cameras 902, 904 may oscillate in position back and forth with respect to each other and stereopsis may not be possible using regular stereo vision techniques.

Figure 10A:
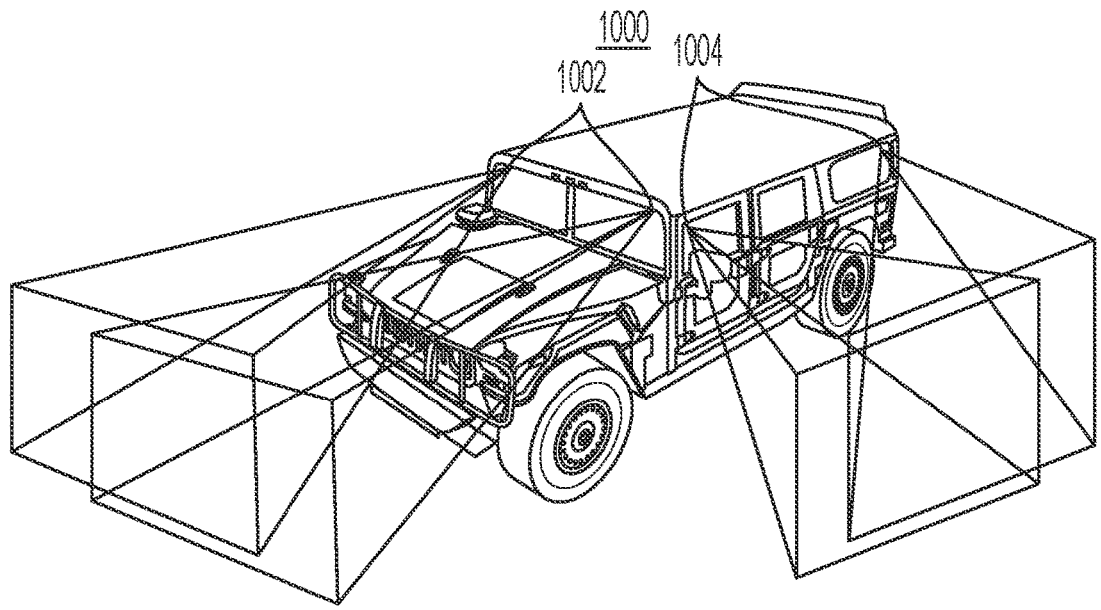
FIGS. 10A and 10B show a front perspective view and a rear perspective view, respectively, of camera arrangements of a stereo vision system mounted on an off-road or all-terrain vehicle, according to some embodiments of the present technology.
Figure 10B:
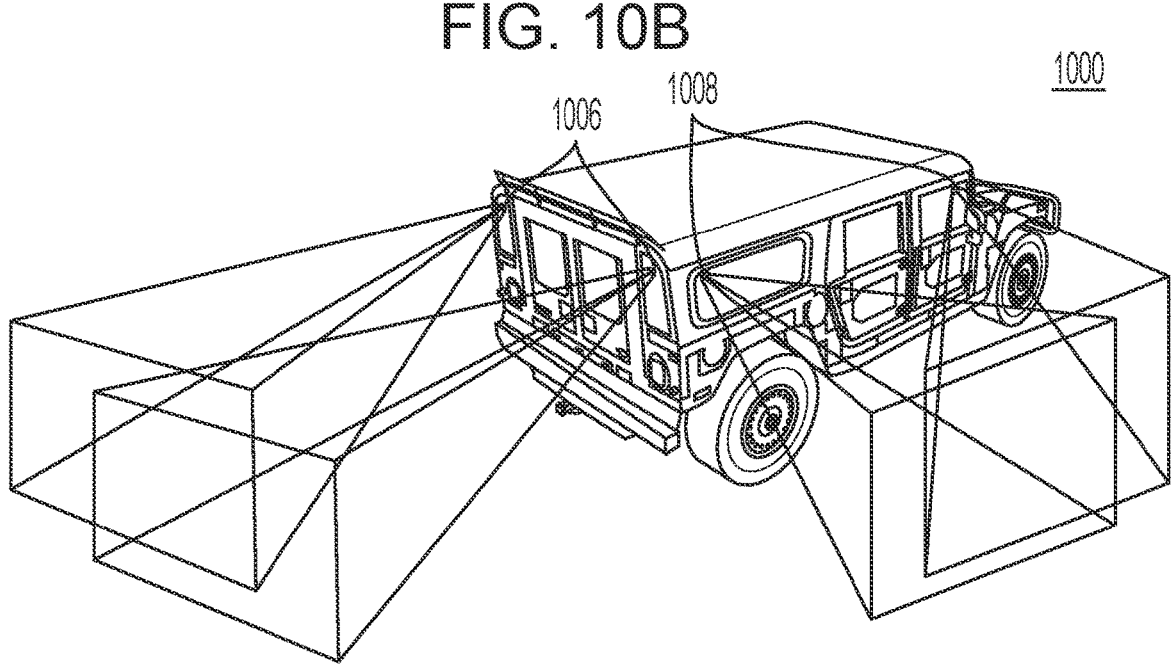

FIGS. 10A and 10B show a front perspective view and a rear perspective view, respectively, of camera arrangements of a stereo vision system mounted on an off-road vehicle 1000, according to some embodiments of the present technology. The stereo vision system may have a surround-view configuration comprised of four stereo-vision camera pairs: a front stereo-vision camera pair 1002, a left stereo-vision camera pair 1004, a back stereo-vision camera pair 1006, and a right stereo-vision camera pair 1008. The four stereo-vision camera pairs 1002, 1004, 106, 1008 may provide four horizontal fields of view of at least 90 degrees, one in each of the front, back, left, and right directions. As will be appreciated, off-road vehicles encounter extreme amounts of vibration and shock when driving on rugged terrain, which would cause conventional stereo-vision cameras to misalign quickly. Examples of off-road vehicles include, e.g., military vehicles, jeeps, all-terrain vehicles, dump trucks, mining vehicles, and any type of vehicle that may be driven on unpaved surfaces such as gravel, rocky terrain, cobblestones, excavation sites, etc. High-resolution 3D information about a surrounding environment of an off-road vehicle may be critical for navigating uneven surfaces that may be full of rocks, boulders, tree branches, etc., and therefore a reliable system for obtaining such information is of high importance.

Figure 11:
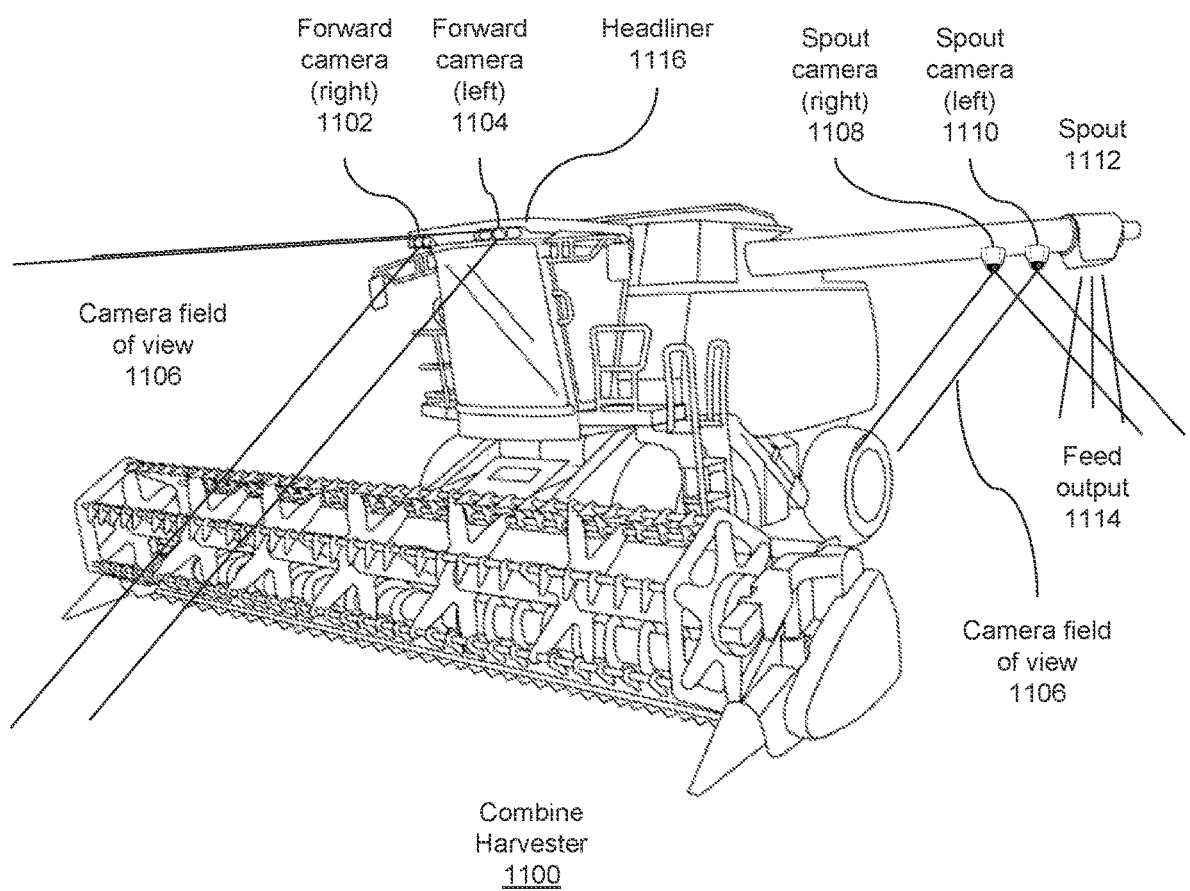
FIG. 11 shows a schematic view of cameras of two stereo vision systems mounted on a combine harvester, according to some embodiments of the present technology.

FIG. 11 shows two stereo vision systems mounted on a combine harvester 1100, according to some embodiments of the present technology. A forward-facing stereo vision system may include a forward camera 1102 and a forward camera 1104, which may be used, e.g., to obtain information for measuring an amount of crop ahead to be encountered the harvester 1100, to enable an informed control a throttle of the harvester 1110 and therefore maximize a feed rate. The forward cameras 1102, 1104 may, e.g., be mounted on a headliner 1116 of the harvester 1100. A spout-mounted stereo vision system may include a spout camera 1108 and a spout camera 1110, which may be used, e.g., to control a position of a spout 1112 and obtain information for measuring an amount of material in a collection container. Both the spout 1112 and the headliner 1116 of the harvester 1100 may experience extreme amounts of vibration and shock when the harvester 1100 moves over farmland, plants, and vegetation. Furthermore, as will be appreciated, the headliner 1116 and the spout 1112 may not be structures that are "optically rigid" such that relative movement of the front cameras 1102, 1104 and relative movement of the spout cameras 1108, 1110 may be avoided. That is, it may not be possible to maintain a constant alignment of the pairs of cameras over an agricultural season much less an entire lifetime of the harvester 1100. Camera-alignment issues relevant to the harvester 1100 may also be issues in other farm equipment (e.g., tractors, hay balers, earth-mover vehicles, and the like).

FIGS. 12A, 12B, and 12C show a left elevational view, a front elevational view, and a plan view of cameras 1202, 1204 of a forward-looking stereo vision system mounted on an automated forklift 1200, according to some embodiments of the present technology. In some embodiments, the cameras 1202, 1204 may provide a wide field of view of 135 degrees, for example, and may enable collision avoidance and object localization, which are desirable features when moving large objects that may obstruct an operator's view. Wide baselines of over 1 m in width are possible on typical forklift platforms. Forklift systems typically require a depth range of about 30 m, which is well beyond the capabilities of conventional stereo-vision solutions. Forklifts also may be subject to extremely high shocks during operation, which is highly desirable if not essential for any stereo vision system used with forklifts to have shock-resistant cameras as and as well as shock-resistant electronics (e.g., sensors) that can maintain their calibration. Shock resistance is desirable not only for forklifts but also for automated mobile vehicles used in, e.g., warehouses and factories (e.g., smart automatic guided vehicles).

As can be appreciated from the discussions above regarding FIG. 3A through FIG. 12, stereo vision systems that may be mounted on a non-rigid platform and that may be calibrated automatically to adjust slow alignment perturbations and/or fast alignment perturbations may be desirable for many different situations.

Figure 13:
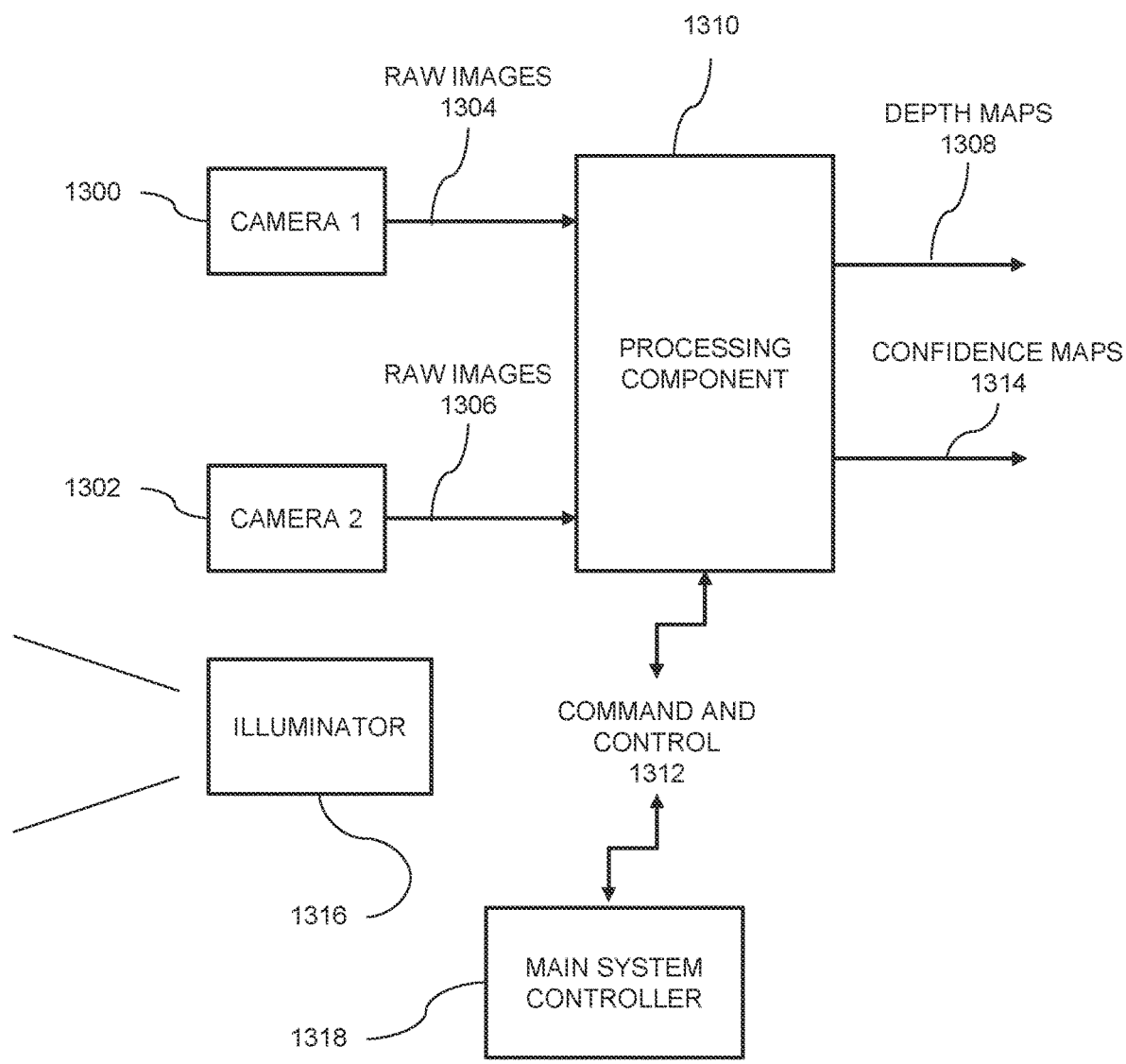
FIG. 13 shows a block diagram of a stereo vision system, according to some embodiments of the present technology.

FIG. 13 shows a block diagram of a stereo vision system, according to some embodiments of the present technology. A processing component 1310 may be included as part of each of an electronic control unit (e.g., the electronic control units 212, 214, 216). A first camera 1300 (also referred to as "Camera 1") and a second camera 1302 (also referred to as "Camera 2") of the stereo vision system may transmit signals or data of raw images 1304 and 1306 to the processing component 1310. In some embodiments, the cameras 1300, 1302 may be any of: monochrome CMOS cameras, color CMOS cameras, near-infrared cameras, short-wave infrared cameras, mid-wave infrared cameras, longwave infrared cameras, and may provide the raw images 1304 and 1306 to the processing component 1310 in real time or nearly real time. In some embodiments, the cameras 1300, 1302 may have memory and/or may be associated with a data storage device, and the cameras 1300, 1302 may to provide a sequence of images (e.g., a sequence of the raw images 1304 and 1306) replayed from the memory and/or the data storage device to the processing component 1310. In some embodiments, the images may be two dimensional (e.g., height and width). In some embodiments, the images may be three dimensional (e.g., height and width and color). The processing component 1310 may be configured to be commanded by a main system controller 1316 through a command and control line 1312. As will be appreciated, the command and control line 1312 may be a wired communication mechanism (e.g., a data bus, a communication line) or may be a wireless communication mechanism using communication techniques known in the art. In some embodiments, the main system controller 1318 may be comprised of a computer configured to orchestrate high-level functions (e.g., automatic emergency braking for automobiles), and to communicate with various sub-systems (e.g., a braking system, a sensor system, and the like). In some embodiments, common communication protocols may be used for communication via the command and control line 1312 (e.g., Ethernet, CAN (Controller Area Network), I2C (Inter-Integrated Circuit), etc.). In some embodiments, the processing component 1310 may report on a calibration status (e.g., system health status, information quality status, etc.) to the main system controller 1318 through the command and control line 1312. In some embodiments, the command and control line 1312 may be used to configure autocalibration and stereo correspondence settings of the processing component 1310. The command and control line 1312 may also be used to start, stop, and record both input and output data streams within the processing component 1310. A depth maps 1308 and a corresponding confidence map 1314 may be output from the processing component 1310 for each pair of the raw images 1304 and 1306. In some embodiments, the depth map 1308 may be a two-dimensional matrix with the same width and height as the raw image 1304, but whose value indicates a range (e.g., a distance) to a target (e.g., an object in the field of view). The depth map 1308 may be reported or output as an RGB image, where each 24-bit color value may be encoded to be a range to the target. For example, if values of the depth map 1308 has units of mm (millimeters), distances from 0 to 16,777.215 m (meters) may be represented with 24 bits. In some embodiments, the confidence map 1314 may be a two-dimensional matrix with the same height and width as the raw image 1304, and each element of the confidence map 1314 may represent a confidence value or confidence level for a depth estimate of each pixel of the raw image 1304. In some embodiments, a confidence value may be an 8-bit unsigned value from 0 to 255, where relatively higher values may indicate a higher level of confidence in a corresponding depth estimate. In some embodiments, using an 8-bit representation for the confidence map 1314 may enable the confidence map 1314 to be displayed conveniently as a grayscale image, and also may permit data for the confidence map 1314 to be transmitted as a monochrome video data stream. Information provided by the confidence map 1314 may be important for sensor fusion processing pipelines, which function to combine estimates from various sensors (e.g., radar, lidar, sonar, etc.) to provide high-reliability estimates of a surrounding environment.

An illuminator 1316 may be used to project light for nighttime operation, according to some embodiments of the present technology. The illuminator 1316 may be comprised of one or more illumination elements (e.g., lamps, LEDs, etc.). In some embodiments, the stereo vision system may be provided on a car, and the illuminator 1316 may be comprised of the car's headlights, which may emit visible or infrared radiation. In some embodiments, the illuminator 1316 may be comprised of externally mounted lamps configured to emit visible or infrared radiation. In some embodiments, the illuminator 1316 may be configured to emit visible or infrared radiation in synchronization with an exposure interval of a first camera sensor and an exposure interval of a second camera sensor. With a modulated waveform, a peak optical power may be higher for the same average optical power, and therefore the number of photons registered by the camera sensors may increase without blinding oncoming drivers or pedestrians, who may be sensitive to the average optical power. In some embodiments, the illuminator 1316 may be comprised of a vertical cavity surface emitting laser (VCSEL) array, which may be configured to project a pseudo-random dot pattern. Use of a randomized dot pattern may add texture to a scene being illuminated, which may improve the ability of a stereo correspondence engine 1420 to generate accurate depth maps.

In some embodiments of the present technology, the stereo vision system of FIG. 13 may be modified to be a three-camera system. A first camera and a second camera may form a stereo vision system for short-range sensing, and the first camera and a third camera may form a stereo vision system for long-range sensing. A baseline distance between the first and second cameras may be shorter than a baseline distance between the first and third cameras. The stereo vision system comprised of the first and second cameras may have a range with a lower minimum distance but may have a higher range resolution compared to the stereo vision system comprised of the first and third cameras.

In some embodiments of the present technology, the stereo vision system of FIG. 13 may be modified to be a four-camera system comprised of two stereo vision systems: a short-range system with a first camera and a second camera, and a long-range system with a third camera and a fourth camera. In comparison with the three-camera system, the additional (fourth) camera may provide an additional degree of operational freedom and may allow the short-range system to have a different (e.g., wider) field of view than the long-range system. In some embodiments, the first and second cameras may have a shorter baseline and a wider field of view than the third and fourth cameras.

In some embodiments of the present technology, the stereo vision system of FIG. 13 may be modified to include a time-of-flight camera, which may be configured to measure objects that are closer to the cameras 1300, 1302 than a minimum distance of the stereo vision system.

Figure 14:
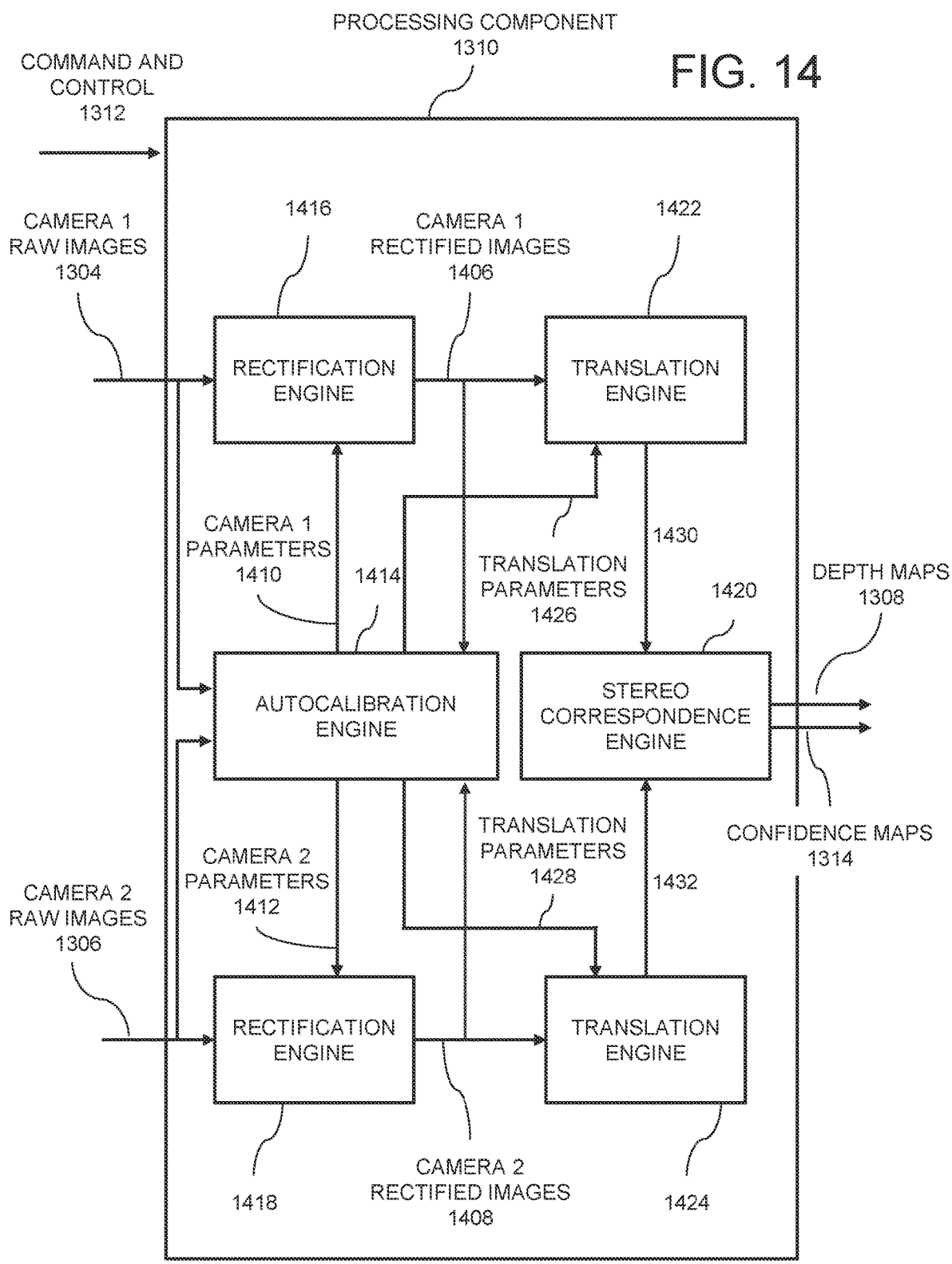
FIG. 14 shows a block diagram of a processing component of the system of FIG. 13, according to some embodiments of the present technology.
Figure 15A:
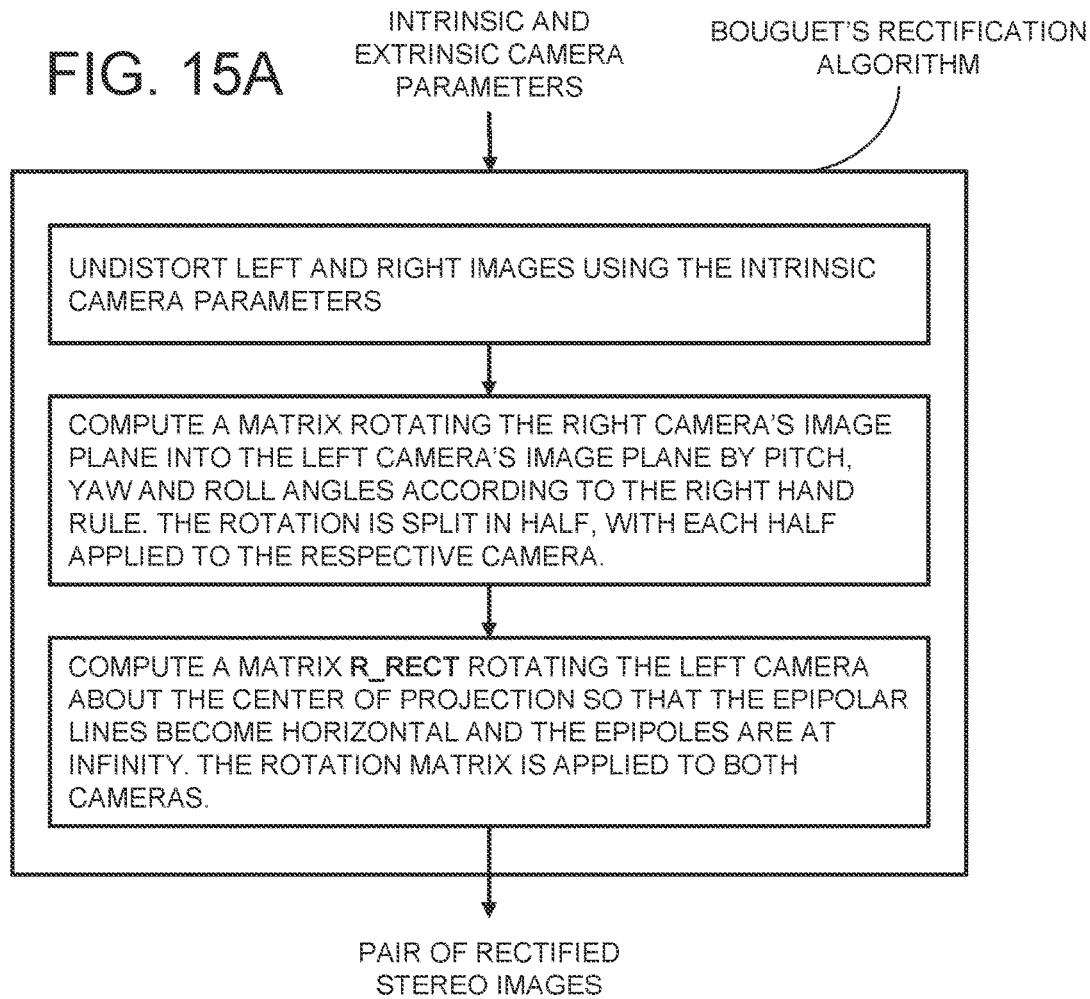
FIG. 15A shows a flow diagram of a rectification algorithm utilized in some embodiments of the present technology.
Figure 15B:
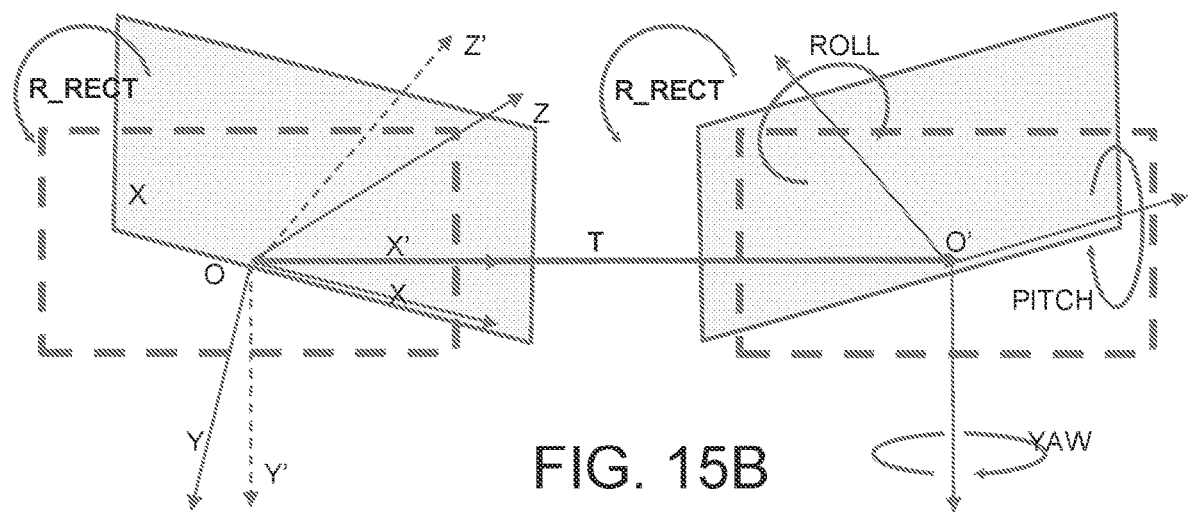
FIG. 15B shows geometric details of a rectification procedure performed by the algorithm, according to some embodiments of the present technology.

FIG. 14 shows a block diagram of the processing component 1310, according to some embodiments of the present technology. As discussed above, the processing component 1310 may convert the raw images 1304 and 1306 into depth maps 1308 and confidence maps 1314. Raw images 1304 from the first camera may be rectified by a rectification engine 1416. Raw images 1306 from the second camera may be rectified by a rectification engine 1418. As will be appreciated, in computer-vision technology, rectification is a transformation process used to warp images so that images from Camera 1 and Camera 2 are aligned row-wise. That is, features in a row of pixels in a rectified image 1406 produced from the raw image 1304 from Camera 1 are aligned to a same row of pixels as matching features in a rectified image 1408 from the raw image 1306 of Camera 2. Such row alignment of pixels may allow the stereo correspondence engine 1420 to operate faster, because it enables a search for corresponding features to be a one-dimensional search along rows rather than a two-dimensional search along rows and columns. In some embodiments, the rectification engines 1416 and 1418 may utilize camera parameters 1410 and 1412, respectively, to determine a mapping or warping operation. FIG. 15A shows a flow diagram of a rectification algorithm that may be utilized by the rectification engines 1416, 1418, in some embodiments of the present technology. FIG. 15B shows a coordinate system and geometric details of a rectification procedure performed by the algorithm, according to some embodiments of the present technology.

According to some embodiments of the present technology, the camera parameters 1410, 1412 may be comprised of six (6) extrinsic camera parameters, which may describe a relative position and orientation of the two cameras 1300, 1302, and eighteen (18) intrinsic camera parameters, which may characterize a transformation from a camera coordinate system to a pixel coordinate system of each camera 1300, 1302. The six extrinsic parameters may be comprised of: a relative roll, a relative pitch, a relative yaw, a relative translation x, a relative translation y, and a relative translation z. The eighteen intrinsic camera parameters for both cameras 1300, 1302 may be comprised of, for each camera 1300, 1302: focal length (Fx, Fy); principal point (Cx, Cy); radial lens distortion coefficients K1, K2, and K3; and tangential lens distortion coefficients P1 and P2. These camera parameters are well known and are described by OpenCV (Open Source Computer Vision Library), which is an open-source library that includes hundreds of computer-vision algorithms. When a wide field-of-view lens and/or a fisheye lens is used, one or more additional higher-order lens distortion parameters may need to be used. In some embodiments, the camera parameters 1410, 1412 may not be constant but may change as a function of time, to track actual changes in the cameras 1300, 1302. In some embodiments, the camera parameters 1410, 1412 may be updated for every frame.

According to some embodiments of the present technology, an autocalibration engine 1414 may be configured to implement a method that maintains stereo camera calibration of the cameras 1300, 1302. It some embodiments, the autocalibration engine 1414 may utilize as inputs the raw images 1304, 1306 of a current frame and the rectified images 1406, 1408 of a previous frame. The autocalibration engine 1414 may output the camera parameters 1410 for the first camera 1300 (Camera 1) and the camera parameters 1412 for the second camera 1302 (Camera 2), and may output translation parameters 1426 for the first camera 1300 and translation parameters 1428 for the second camera 1302.

According to some embodiments of the present technology, translation engines 1422, 1424 may perform a transformation operation to shift the rectified images 1406, 1408 to compensate for very fast perturbations and to stabilize the rectified images 1406, 1408 with respect to each other. The translation operation may be performed by pixel row and/or pixel column, which may be accomplished quickly using an affine transformation procedure. The translation parameters 1426, 1428 may be row-based and column-based translation offsets. In some embodiments, to reduce computation time, one of the translation engines 1422, 1424 may be dropped (e.g., unused or idle or absent), while the other receives the translation offsets (e.g., as a sum). Images 1430, 1432 output by the translation engines 1422, 1424 may be rectified and stabilized images 1430, 1432, which may be fed into the stereo correspondence engine 1420. The stereo correspondence engine 1420 may determine a disparity between matching pixels in the images 1430, 1432 (e.g., the images 1430, 1432 may be left and right images), may compute a disparity map, may compute and output the depth map 1308 from the disparity map, and may compute and output the confidence map 1314.

Figure 16:
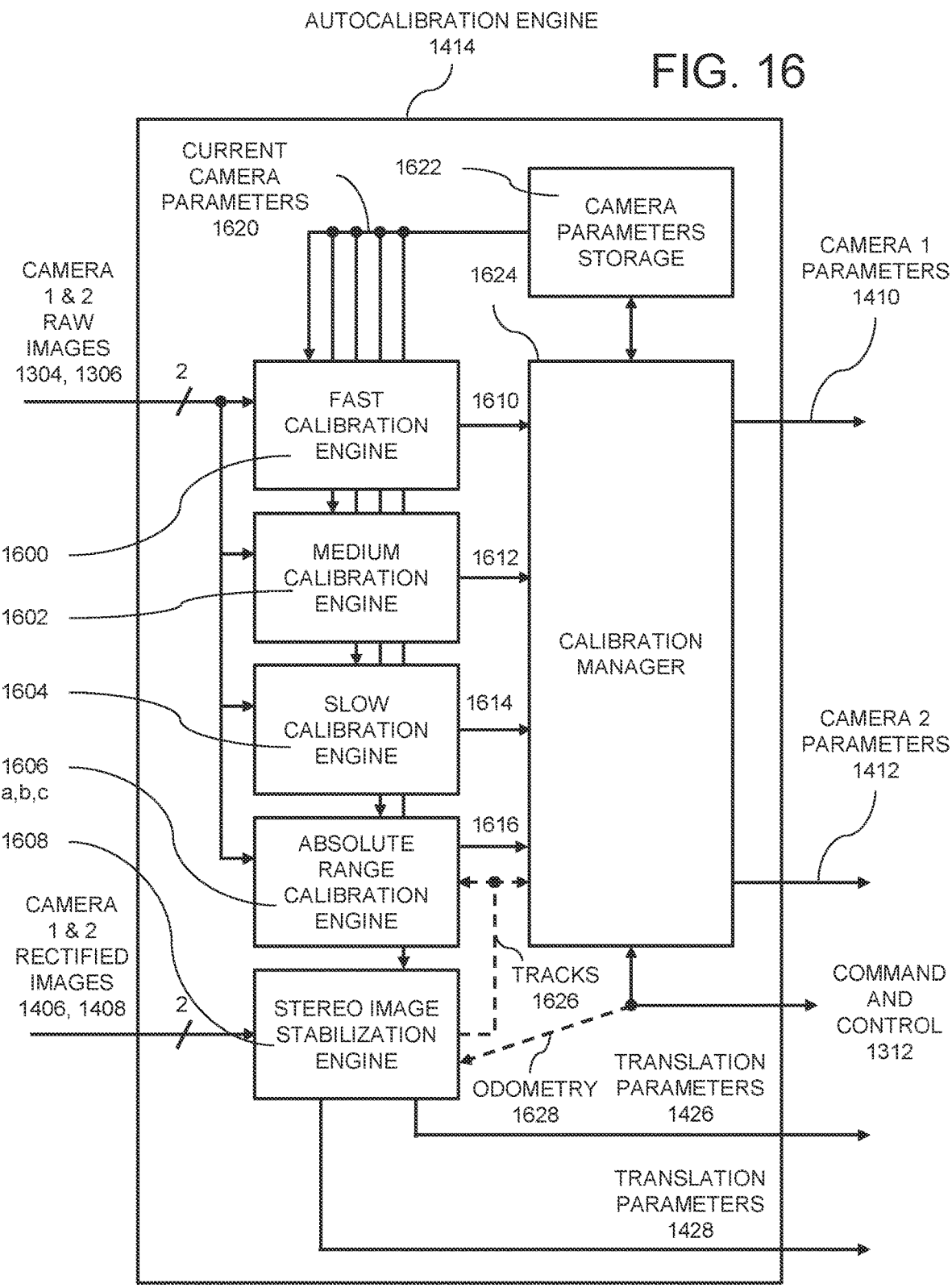
FIG. 16 shows a block diagram of an autocalibration engine of the processing component of FIG. 14, according to some embodiments of the present technology.

FIG. 16 shows a block diagram of the autocalibration engine 1414, according to some embodiments of the present technology. The autocalibration engine 1414 may be comprised of five calibration engines: a fast calibration engine 1600, a medium calibration engine 1602, a slow calibration engine 1604, an absolute range calibration engine 1606, and a stereo image stabilization engine 1608. In some embodiments, the fast 1600, medium 1602, and slow 1604 calibration engines may compensate for camera parameter perturbations that may occur over slow to fast timescales, and the methods used by these calibration engines 1600, 1602, 1604 may be based on optimizing a cost function. In some embodiments, the absolute range calibration engine 1606 may calibrate an absolute range to objects by adjusting an extrinsic camera parameter: relative yaw. In some embodiments, calibration of the absolute range calibration may be one of the most important and hardest parameters to calibrate well because epipolar geometry constraints may be insensitive to changes in yaw. In some embodiments, the stereo image stabilization engine 1608 may be used to track and compensate for frame-to-frame variations in pitch and yaw. A time-series history of camera parameters may be stored in a storage device 1622. Current camera parameters 1620 may be used as a starting point for the calibration engines 1600, 1602, 1604, 1606, 1608. In some embodiments, outputs 1610, 1612, 1614, 1616, 1626 of the calibration engines 1600, 1602, 1604, 1606, 1608 may be combined by a calibration manager 1624, which uses this information to decide a best estimate of the camera parameters 1410, 1412 for the first camera and second cameras 1300, 1302. The command and control line 1312 may be used to initialize values for the camera parameters, which may come from a manual factory calibration, manufacturing specifications, or a random guess. As discussed below, the absolute range calibration engine 1606 have different embodiments. In some embodiments, any one or any combination of a fast calibration procedure performed by the fast calibration engine 1600, a medium calibration procedure performed by the medium calibration engine 1602, and a slow calibration procedure performed by the slow calibration engine 1604 may include an intrinsic-parameter calibration procedure for calibrating one or more intrinsic camera parameter(s). For example, for each camera, any one or any combination of: a focal length, a principal point, at least one radial lens distortion coefficient, and at least one tangential lens distortion coefficient may be calibrated by the intrinsic-parameter calibration procedure. In some embodiments, the intrinsic-parameter calibration procedure may be performed by the fast calibration engine 1600 and/or the medium calibration engine 1602 if there is a priori knowledge about the first camera and second cameras 1300, 1302, for example, if it is known that a lens mount itself is flexible, which may be a rare case. In some embodiments, the intrinsic camera parameters may not need to be calibrated on the fast timescale and/or the medium timescale for a number of reasons: (1) small changes in the piercing point horizontal location (Cx) and focal length (Fx and Fy) may be corrected to first order by changes to yaw, (2) small changes in the piercing point vertical location (Cy) may be corrected to first order by changes to pitch, and (3) the lens distortion coefficients may not typically change since the lens shape may be generally immutable.

Figure 17A:
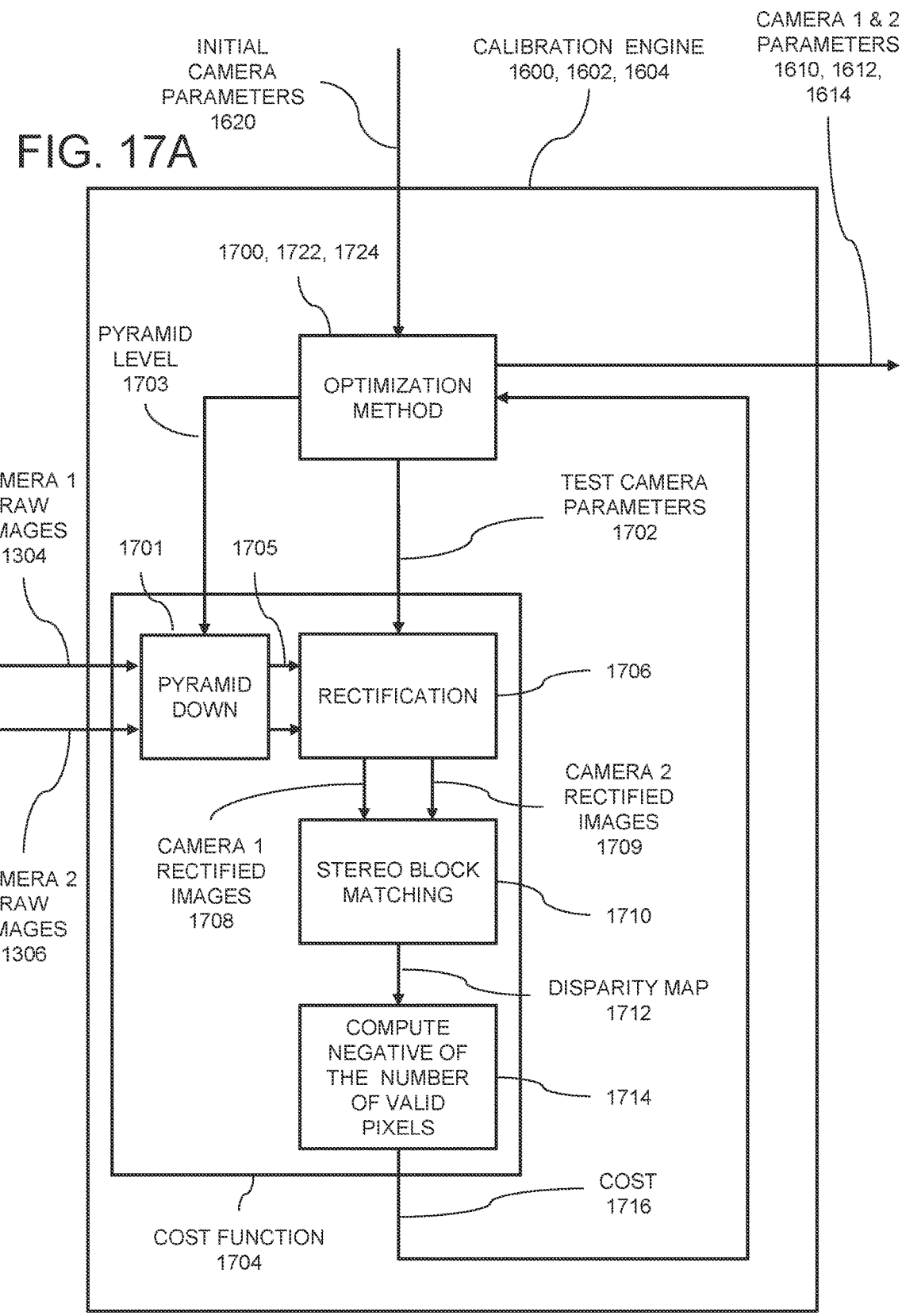
FIG. 17A shows a block diagram of a calibration engine of the autocalibration engine of FIG. 16, according to some embodiments of the present technology.

FIG. 17A shows a block diagram of the fast 1600, medium 1602, and slow 1604 calibration engines, according to some embodiments of the present technology. The calibration engines 1600, 1602, 1604 may have the same block-diagram structure but may utilize different optimization methods 1700, 1722, 1724, respectively. In some embodiments, a basic concept of the methods 1700, 1722, 1724 is that, for each of the methods 1700, 1722, 1724, optimal or correct camera parameters may be associated with a minimized cost function 1704 appropriate for the corresponding method. For example, for a nominal case of twenty four (24) camera parameters (six extrinsic parameters and eighteen intrinsic parameters), a brute-force search of parameters may require evaluating a cost function $100^{24}$ times, assuming 100 values per parameter, which take an unreasonably long time to compute using conventional computers (it would take longer than the age of the universe using conventional computers). As will be appreciated, to be practical for a real-world setting, an optimization operation should be completed in real time and implemented on a time scale that matches a time scale of a source or cause of a perturbation, or faster. Therefore, in some embodiments, it is highly desirable for the camera parameters to be searched efficiently by separating the search into different time scales.

According to some embodiments of the present technology, one or more of the optimization methods 1700, 1722, 1724 may repeatedly evaluate the cost function 1704 for a subset of camera parameters over a bounded search range. In some embodiments, to speed up evaluation of the cost function 1704, one or more of the optimization methods 1700, 1722, 1724 may dynamically tune a pyramid level 1703 of the raw images 1304, 1306 from the first and second cameras 1300, 1302. The term "pyramid" is a common computer-vision term that is widely understood to refers to downsampling of images to smaller images. Because an amount of time to compute the cost function (i.e., determine a minimum cost function) may be proportional to a size of an image being processed, by subsampling to half resolution (or pyramid level 1), the time to compute the cost function may be reduced by a factor of four (4). For coarse parameter searches, high pyramid levels may be used to speed up searching. For fine parameter searches, low pyramid levels may be used for enhanced accuracy. In some embodiments, the respective outputs 1610, 1612, 1614 of the optimization methods 1700, 1722, 1724 may be the camera parameters that minimize the cost function 1704 of the corresponding optimization method. As will be appreciated, minimizing a cost function may also be considered maximizing a figure of merit, as they may be considered equivalent approaches.

According to some embodiments of the present technology, an indicator of calibration health may be reported to the main system controller 1316 through the command and control line 1312. In some embodiments, the calibration health may be taken to be a negative of the (minimized) cost function (or the maximized figure of merit) corresponding to optimized camera parameters.

According to some embodiments of the present technology, the cost function 1704 may be comprised of a pyramid down block 1701 configured to reduces a size of the raw images 1304, 1306, a rectification block 1706 configured to warp and row-align reduced images according to test camera parameters 1702, a stereo block matching block 1710, and a block 1714 configured to compute a negative of a number of valid pixels. In some embodiments, the stereo block matching block 1710 may use a stereo block matching algorithm from OpenCV with following parameters that may include: a pixel-window size of 9×9, a normalized response prefilter, a prefilter cap of 63, a prefilter size of 11, a speckle window size of 100, a speckle range of 64, a texture threshold of 10, a uniqueness ratio of 10, and a disparity search range of 0 to 255. Such a block matching algorithm may be chosen for its fast execution across many different types of processors. A texture threshold and a uniqueness ratio may be set relatively high (e.g., a value of 10-50) to minimize a number of wrong distance estimates and to replace the corresponding pixels with invalid pixels. In some embodiments, each of the optimization methods 1700, 1722, 1724 may find optimal camera parameters that minimize the number of invalid pixels after stereo block matching is performed.

Figure 17B:
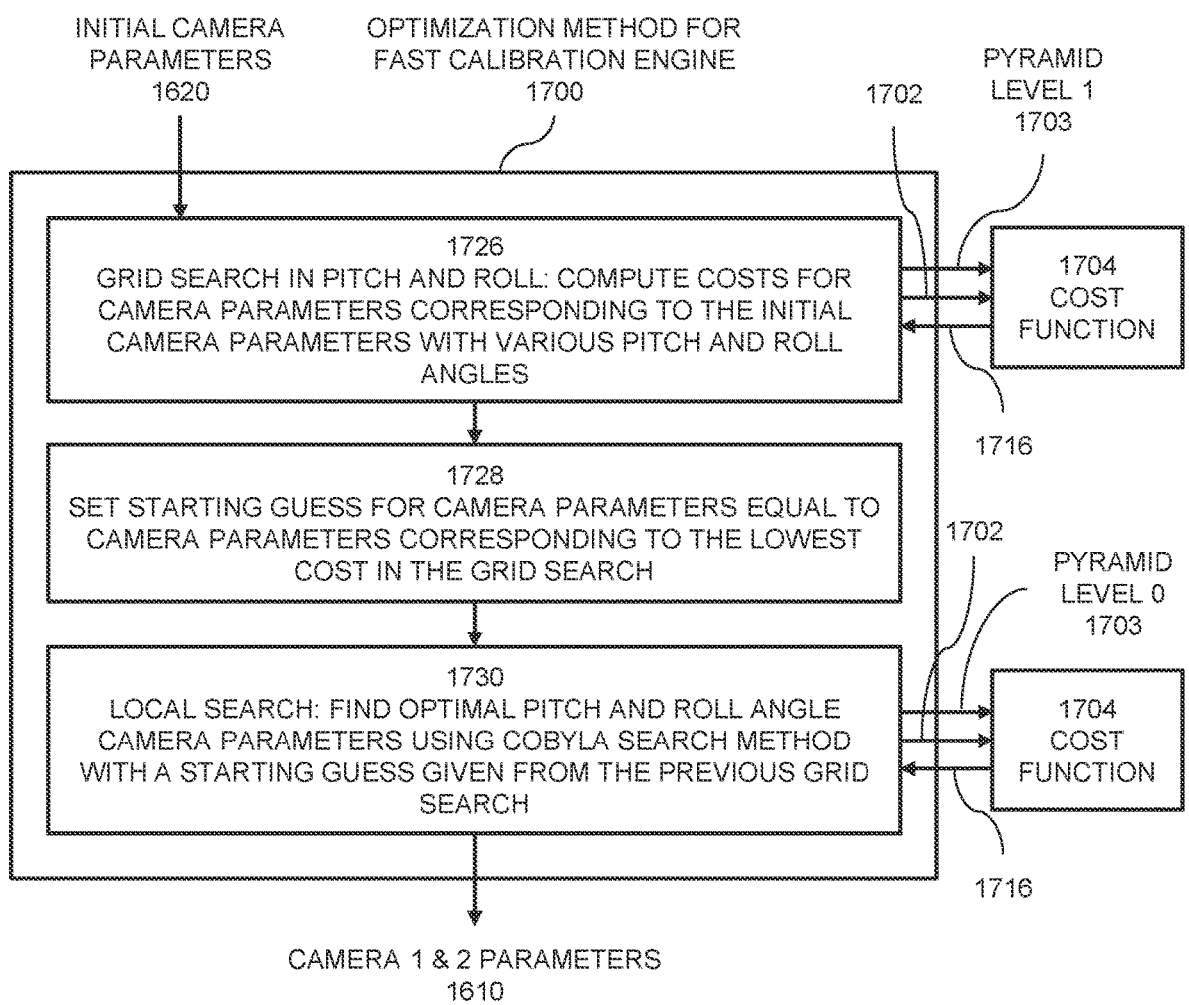
FIG. 17B shows a flow diagram of a fast optimization method, according to some embodiments of the present technology.

FIG. 17B shows a flow diagram of the fast optimization method 1700 of the fast calibration engine 1600, according to some embodiments of the present technology. The fast optimization method 1700 may tune pitch and roll extrinsic camera parameters, because these parameters may be responsible for most of short-timescale distortions. The fast optimization method 1700 may be used for the most frequent updates among the optimization methods 1700, 1722, 1724. The fast optimization method 1700 may be considered fast because it searches a relatively small number of camera parameters (two) over a small range.

At step 1726 of the fast optimization method 1700, a quick search is performed for an initial guess of the camera parameters 1620 by checking costs in a chosen grid points. In some embodiments, the grid points may typically have nine values in pitch from −0.4 degrees to 0.4 degrees and three values in roll from −0.2 degrees to 0.2 degrees about the initial guess of the camera parameters 1620, for a total of 27 grid points. For evaluating the cost function 1704, a pyramid level of 1 may be used to speed up the evaluation.

At step 1728 of fast optimization method 1700, a pitch and a roll corresponding to a lowest cost (a minimum of the cost function 1704) may be selected among the grid points.

At step 1730 of fast optimization method 1700, a COBYLA (Constrained Optimization BY Linear Approximations) algorithm for derivative-free optimization with nonlinear inequality constraints may be applied with the pitch and the roll found in step 1728, other camera parameters of the initial guess of the camera parameters 1620, and bounds of 0.1 degrees in both the pitch and the roll. The cost function 1704 used in step 1730 may have a pyramid level of 0. The camera parameters 1620 may be updated with the pitch and the roll corresponding to a lowest cost found by COBYLA, and updated camera parameters 1610 are returned for the fast optimization method 1700.

According to some embodiments of the present technology, the COBYLA algorithm may construct successive linear approximations of an objective function and constraints with a simplex of points and may optimize these approximations in a trust region at each step. In some embodiments, because there are only two search dimensions, the relative pitch and roll of the pair of stereo cameras, over a small search range of 0.1 degrees for pitch and 0.1 degrees for roll, optimization can be computed quickly (e.g., 100 ms on an Intel Core i7 CPU processor) and can compensate every other frame at 20 FPS, if needed. In some embodiments, a search range can be increased or decreased based on expected excursions for a given platform. For example, for suction cup mounts on a car, 0.1 degrees is large enough, whereas for loosely mounted cameras on a mountain bike ridden on a trail, 0.2 degrees might be needed.

It should be noted that in some embodiments, the COBYLA search method could also be replaced by other search methods, such as the Nelder-Mead simplex search method, Broyden-Fletcher-Goldfar-Shanno (BFGS) method, Powell's method, Sequential Least Squares Programming (SLSQP) method, or Monte Carlo methods.

Figures 1, 17D:
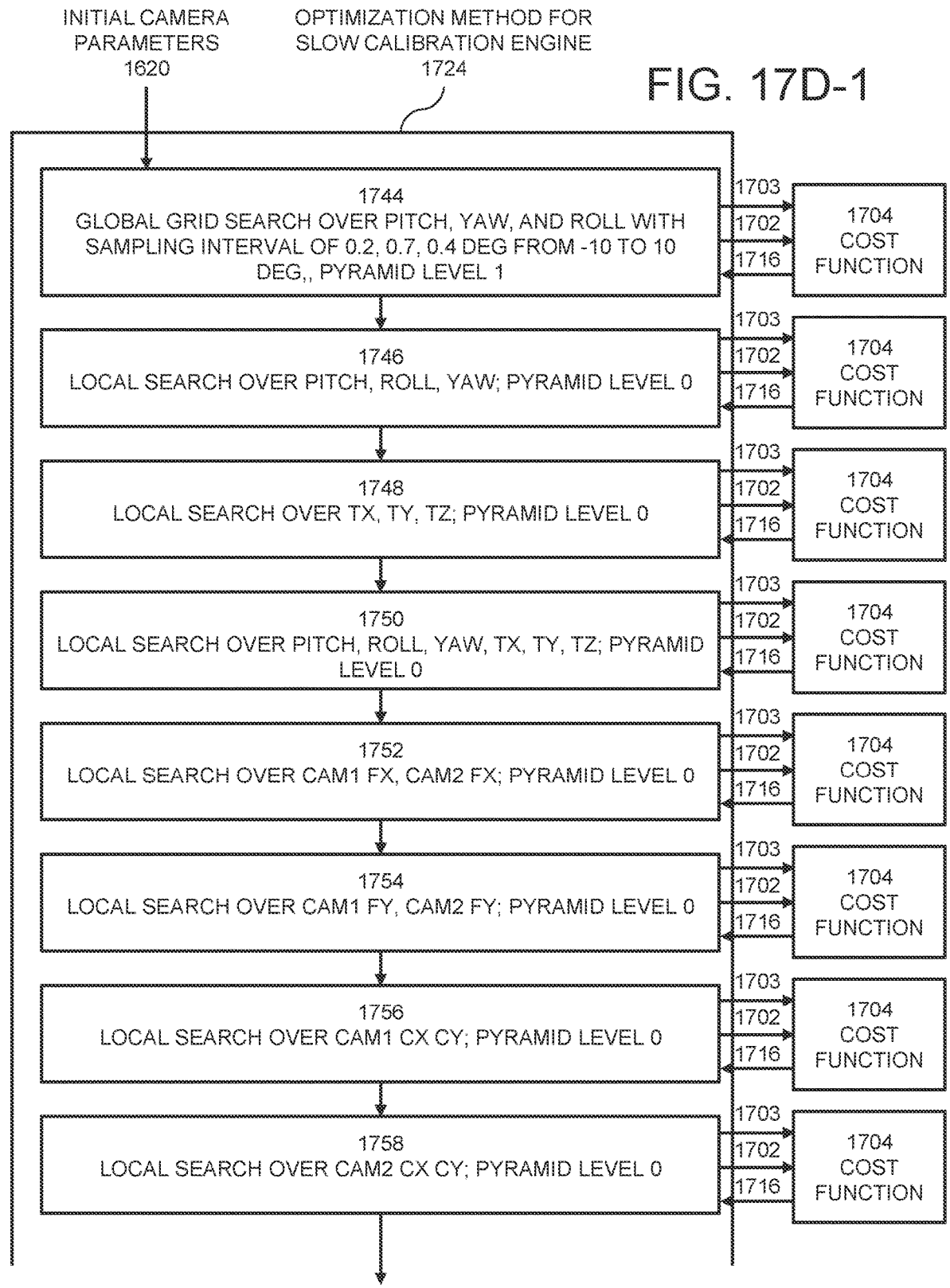
Figures 3, 17D:
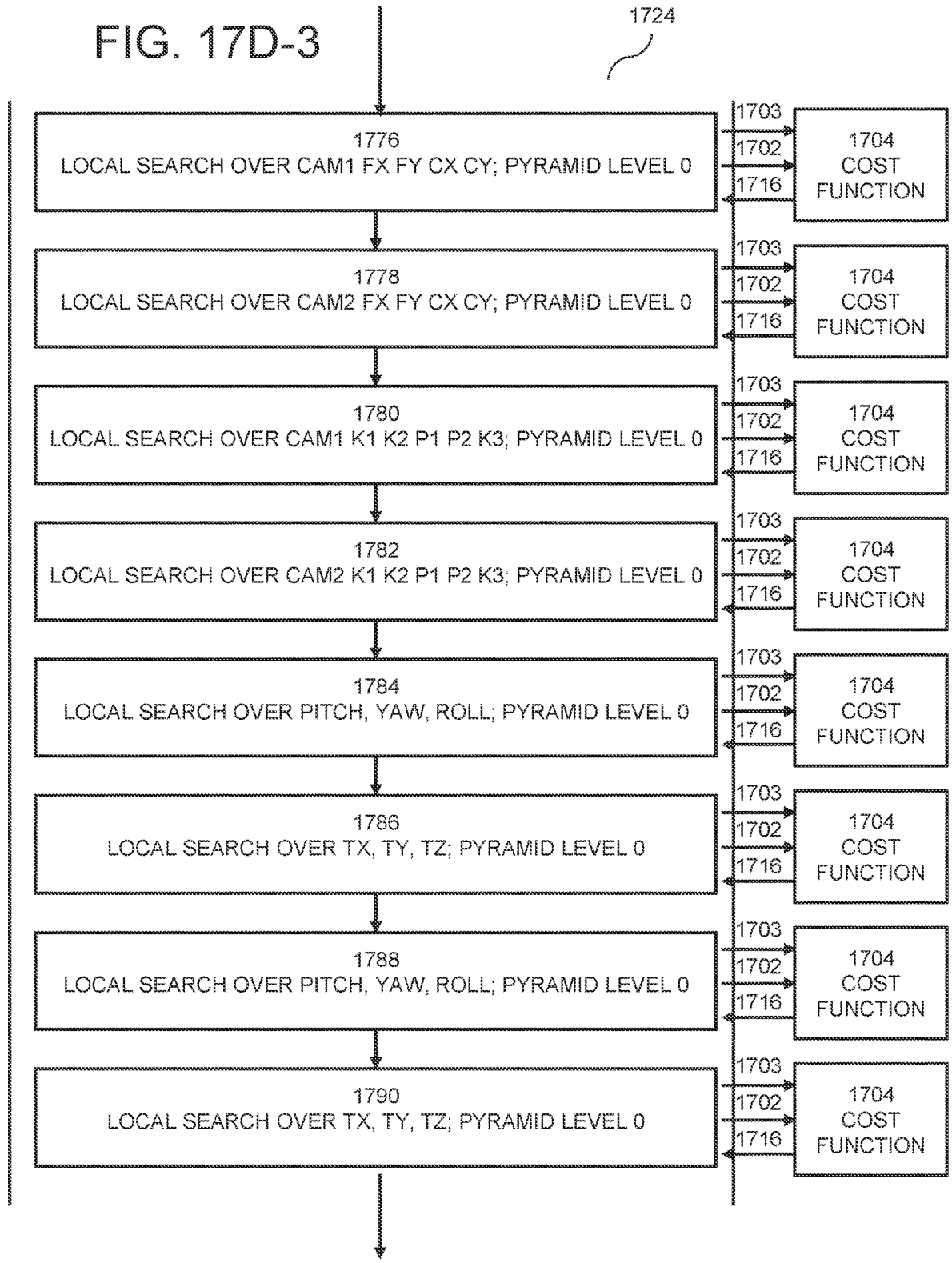
Figures 4, 17D:
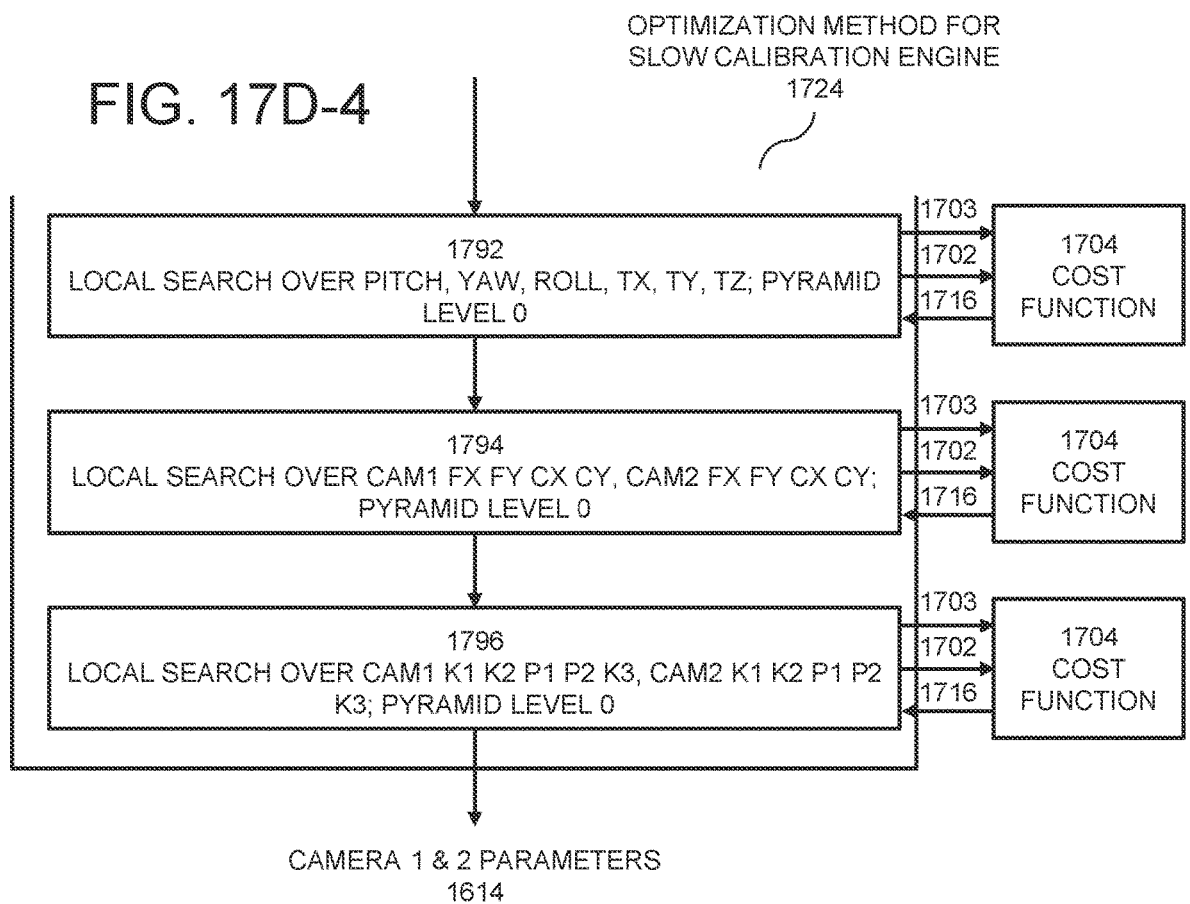

FIG. 17C-1 shows a flow diagram of the medium optimization method 1722 of the medium calibration engine 1602, according to some embodiments of the present technology. The medium optimization method 1722 may update more parameters than the fast optimization method 1700 but update slower than the fast optimization method 1700. In some embodiments, a main objective of the medium optimization method 1722 is to find a translation vector and then to optimize pitch and roll. FIG. 17C-2 shows a flow diagram of an angle-search process of the medium optimization method of FIG. 17C-1, according to some embodiments of the present technology.

At step 1732 of the medium optimization method 1722 a grid search is performed over translation vector angles, which are represented by two angles: ay and az. The angle ay may be an angle between the translation vector and the x-axis measured on the xz plane. The angle az may be an angle between the translation vector and the x-axis measured on the yz plane. For example, the search may test all of the grid of values (ay, az) from −7 degrees to 7 degrees in 1-degree increments around an initial translation vector of the camera parameters 1620. For each translation vector, step 1732 uses an angle-search process 1736 (see FIG. 17C-2) to look for a best tuple of pitch and roll angles that yield a lowest cost. In some embodiments of the present technology, the angle-search process 1736 may break the search process into coarse 1738, medium 1740, and fine 1742 angle searches.

The coarse angle search 1738 may apply nine (9) COBYLA searches, centered at (pitch, yaw, and roll) of (0,0,0), (−1,−1,−1), (−1,−1,1), (−1,1,−1), (1,−1,−1), (1,1,−1), (1,−1,1), (−1,1,1), and (1,1,1) degrees from the initial pitch, yaw, and roll specified in the camera parameters 1620. The COBYLA search may use pyramid level 3 with the cost function 1704 for a fast evaluation, and the search bounds on all angles may be [−1,1] degrees. The pitch, yaw, and roll corresponding to the lowest cost may be used as the starting point for the medium angle search 1740.

The medium angle search 1740 may apply a COBYLA search starting from the pitch, yaw and roll returned from the coarse angle search 1738. This COBYLA search may have angular bounds of [−0.2, 0.2] degrees for pitch, yaw, and roll, and may use pyramid level 3 for the cost function 1704. The pitch, yaw, and roll corresponding to the lowest cost may be used as the starting point for the fine angle search 1742.

The fine angle search 1742 may apply a COBYLA search starting from the pitch, yaw, and roll returned from the medium angle search 1740. This COBYLA search may have angular bounds of [−0.1, 0.1] degrees for pitch, yaw, and roll, and may use pyramid level 0 for the cost function 1704. The pitch, yaw, and roll corresponding to the lowest cost may be returned to step 1732.

The best estimate for ay, az, pitch, yaw, and roll from step 1732 may be used as a starting point for a fine translation vector and angle search 1734, which may apply a COBYLA optimization for (ay, az) followed by a COBYLA optimization for (pitch, yaw, roll). Both COBYLA searches may use pyramid level 0 for the cost function 1704 to maximize sensitivity to the optimization parameters. The two COBYLA searches may be repeated until little improvement is seen in the cost function. The initial camera parameters 1620 may be updated with the optimal values for ay, az, pitch, yaw, and roll, and then the updated camera parameters 1612 may be returned from the medium optimization method 1722.

FIGS. 17D-1 through 17D-4 (collectively "FIG. 17D") show flow diagrams of a slow optimization method 1724, according to some embodiments of the present technology. In some embodiments, the slow optimization method 1724 of FIG. 17D may be performed by the slow calibration engine 1604 once at factory calibration and then when deemed necessary by the main system controller 1316 (e.g., after an accelerometer or other sensor reports a large shock event). The slow optimization method 1724 may optimizes the extrinsic camera parameters and the intrinsic camera parameters. The step 1744, a global grid search may be performed over the pitch, yaw, and roll angles with a sampling interval (e.g., 0.2 degrees, 0.4 degrees, 0.7 degrees, etc.) over [−10, 10] degrees. The remaining steps 1746 through 1796 FIG. 17D may apply local search methods, such as COBYLA, to a previously best estimate of the camera parameters 1602. As noted above, the intrinsic camera parameters may be the focal lengths (FX, FY), the piercing points (CX, CY), and the lens distortion coefficients (K1, K2, K3, P1, P2). The extrinsic camera parameters may be the pitch, the yaw, the roll, and the translation vector (TX, TY, TZ). In some embodiments, optimization of the pitch, the yaw, and the roll may be followed by optimization of the translation vector from step 1746 to step 1748, from step 1768 to step 1770, from step 1772 to step 1774, from step 1784 to step 1786, and from step 1788 to step 1790, because complementary parameters (e.g., pitch and TX; roll and TY; yaw and TZ) may warp the images (e.g., the raw images 1304, 1306) similarly.

Figure 18:
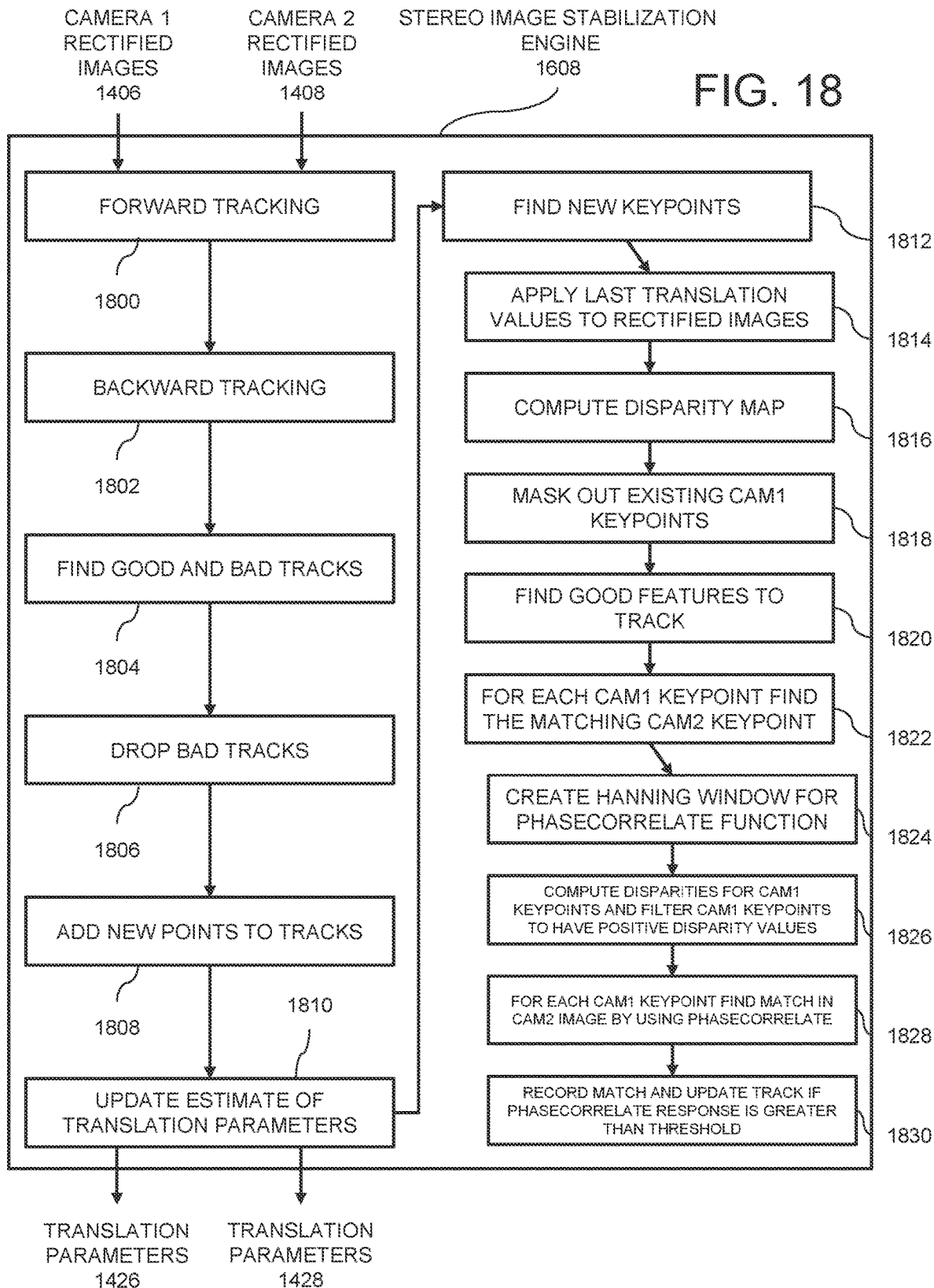
FIG. 18 shows a flow diagram of a procedure of a stereo image stabilization engine of the autocalibration engine of FIG. 16, according to some embodiments of the present technology.

FIG. 18 shows a flow diagram for the stereo image stabilization engine 1608 of the autocalibration engine 1414, according to some embodiments of the present technology. The stereo image stabilization engine 1608 may determine an amount to horizontally and vertically shift images obtained from Camera 1 and Camera 2 so that a relative displacement between these cameras is minimized. The stereo image stabilization engine 1608 may compensate for fastest perturbations (e.g., engine noise and road noise) and may update every frame. Unlike conventional monocular image stabilization, which may stabilize an image with respect to the Earth, the stereo image stabilization engine 1608 may stabilize two images with respect to each other. In some embodiments, the stereo image stabilization engine 1608 receives as input the rectified images 1406 produced from the raw images 1304 from Camera 1 and the rectified images 1408 produced from the raw images 1306 of Camera 2. The stereo image stabilization engine 1608 may output translation parameters 1426 for Camera 1 and translation parameters 1428 for Camera 2. At 1800 a forward tracking process may compute an optical flow for a sparse feature set using an iterative Lucas-Kanade method with pyramids for the rectified images 1406, 1408, which may be left and right rectified images, from a previous frame to a current frame. At 1802 a backward tracking process may compute an optical flow in a reverse direction, from points in the current frame to the previous frame. At 1804 a process may determine good tracks from back tracks (e.g. a good track is when the backward tracking process at 1802 reprojects a point within 1 pixel of a previous point of the track). At 1806 a process may drop the bad tracks. At 1808 a process may add remaining good points to the tracks. At 1810 a process may update an estimate of the translation parameters. In some embodiments, the translation parameters 1426 for Camera 1 and the translation parameters 1428 for Camera 2 may be amounts to shift rows and columns of images from Camera 1 and Camera 2 relative to a previous frame. In some embodiments, the translation parameters may be equal to an average relative translation between images from Camera 1 and Camera 2 from frame-to-frame with outliers removed from the average.

After several frames, one or more tracks may be dropped because keypoints may move off screen (e.g., out of the field of view) or may be obstructed. At 1812 a process may find new keypoints to create new tracks. For example, every n frames, where n may typically be 5, the stereo image stabilization engine 1608 may search for new keypoints in the rectified images 1406, 1408. A keypoint detector (not shown) may look for good points to track using, for example, the Shi-Tomasi corner detector. At 1814 a process may translate the rectified images 1406, 1408 using the translation parameters 1426, 1428 to remove any relative motion between Camera 1 and Camera 2. At 1816 a process may compute a disparity map from the rectified images 1406, 1408 using a block matching algorithm. At 1818 a process may ignore currently tracked keypoints for the rectified image 1406 of Camera 1, and at 1820 a process may find good features to track in the rectified image 1406 of Camera 1. At 1822, for each keypoint found for the rectified image 1406 of Camera 1, a process may find a matching keypoint in the rectified image 1408 of Camera 2 using processes at 1824, 1826, 1828, 1830. At 1824 a process may be performed for creating a Hanning window for a phasecorrelation function. In OpenCV, phasecorrelation refers to a method to check the similarity of two images with equal size. Phasecorrelation is a fast implementation of template matching. At 1826 a process may be performed to find matching keypoints between Camera 1 and Camera 2. Since images 1406 and 1408 are rectified, matching keypoints lie along the same row. Adding the disparity values 1816 to the Camera 1 keypoint column values yield the expected location for the Camera 2 keypoint column values. At 1828 a process may be performed to verify the matches of 1826 by computing the phasecorrelation function for the matched keypoints. The phase correlation function is computed over image patches (typically 40×40 pixels) centered on the pairs of matching keypoints between Camera 1 and Camera 2. The phasecorrelation function returns the corrected coordinate shift and the response (typically, a value between 0 and 1 that indicates the similarity of the two image patches). At 1830 a process is performed to record the matching keypoints, correct the keypoint coordinates according to the corrected coordinate shift from 1828, and update the track information if the phasecorrelation response is greater than a threshold value (typically, a threshold value of 0.3).

In some embodiments of the present technology, the absolute range calibration engine 1606 may have three different implementations (referred to as 1606a, 1606b, and 1606c) any or all of which may be incorporated in the autocalibration engine 1414. The three implementations 1606a, 1606b, and 1606c may use different absolute distance references: the implementation 1606a may use a non-negative disparity constraint (see FIGS. 19A, 19B), the implementation 1606b may use a known object such as a stop sign (see FIGS. 20A, 20B), and the implementation 1606c may use vehicle odometry (see FIGS. 21A, 21B). In some embodiments, a relative yaw between the cameras 1300, 1302 may have a large influence on calibration of an absolute range of the stereo vision system. The absolute range calibration engine 1606 may be used to calibrate the yaw.

FIG. 19A shows a flow diagram of the implementation 1606a, in which the absolute range calibration engine 1606 has a non-negative disparity constraint, according to some embodiments of the present technology. The implementation 1606a may find the yaw where principal rays of the first and second cameras 1300, 1302 do not cross. When the principal rays cross in front of the cameras, a corresponding disparity value may be negative at ranges farther than the crossing point. By tuning the yaw until the rays do not cross, the cameras 1300, 1302 may become parallel, a number of negative values in the disparity map 1712 may decreases (sometimes drastically) to a minimum value, and a correct absolute range may be found.

FIG. 19B is a chart 1900 showing how a number of pixels with a negative disparity value in a disparity map (e.g., the disparity map computed from raw images 1304, 1306 after rectification using the initial camera parameters 1620 but with various values of yaw) can vary as a function of yaw, according to some embodiments of the present technology. For yaw values less than approximately 1.8 degrees in the chart 1900, the number of negative disparity values greatly increases, indicating that the principal rays of the cameras 1300, 1302 may start to cross at a long range and then at increasingly closer range. For yaw values less than 1.65 degrees, the number of negative disparity values decreases. This may be because a block matcher used in this analysis may only search disparity values down to −32 pixels. Any pixel with disparity values of −33 pixels or lower may not be counted. For yaw values greater than 1.85 degrees, the number of pixels with negative values is small but not zero. This may be because mismatching pixels sometimes may have negative disparity values. A desired yaw is in a transition region where the chart 1900 transitions from a region where the number of pixels is small and generally constant (yaw >1.85 degrees in the chart 1900) and includes a region where the number of pixels is rapidly increasing (e.g., a region indicated by an upward pointing arrow 1912). The chart 1900 also shows a region in which disparity values of pixels may be more negative than a minimum disparity limit (e.g., a region indicated by a downward pointing arrow 1914). Returning to the flow diagram of the implementation 1606a shown in FIG. 19A, at 1920 a coarse search is performed from −0.5 degrees (see 1902) to 1.0 degrees (see 1906) around an initial guess 1904 for the yaw for which the disparity map is computed, and the number of negative disparity values is tallied. The search may be performed in 0.1-degree steps. A result of the coarse search may be an array of sixteen (16) values. The chart 1900 is an example of a plot of sixteen datapoints for a coarse curve. A derivative of the coarse curve with respect to yaw may be computed. The derivative of the coarse curve may be sensitive to changes and therefore may be useful for finding transitions in the coarse curve. At 1922 a quality of the coarse search is checked by making sure that the transition region (e.g., the region from 1.65 deg to 1.8 deg in the chart 1900) is greater than five times a tail noise 1908. The tail noise 1908 may be defined to be a standard deviation of the last 5 points of the derivative of the coarse curve. In other words, the transition region should have a significant change in the number of negative disparity values compared to a region where the number of negative disparities should be zero. Next, at 1924 a fine search range is determined by searching around the yaw corresponding to the most negative slope (e.g., a yaw of ~1.7 degrees in the chart 1900). Starting from the largest coarse yaw value and searching toward lower coarse yaw values, an upper bound is determined to be a value where the derivative of the coarse curve is greater than −3 times the tail noise. Starting from the yaw corresponding to the most negative slope and increasing to the largest yaw, the lower bound is determined to be a value where the derivative of the coarse curve is less than −3 times the tail noise. Next, at 1926 a fine search grid is created from the lower to upper bounds, and a fine search is performed. This grid may typically have twenty-one (21) points. At 1928 a yaw value corresponding to a minimum number of negative disparity pixels is determined. In some embodiments, a transition point in the curve may be estimated in this manner.

Figure 20A:
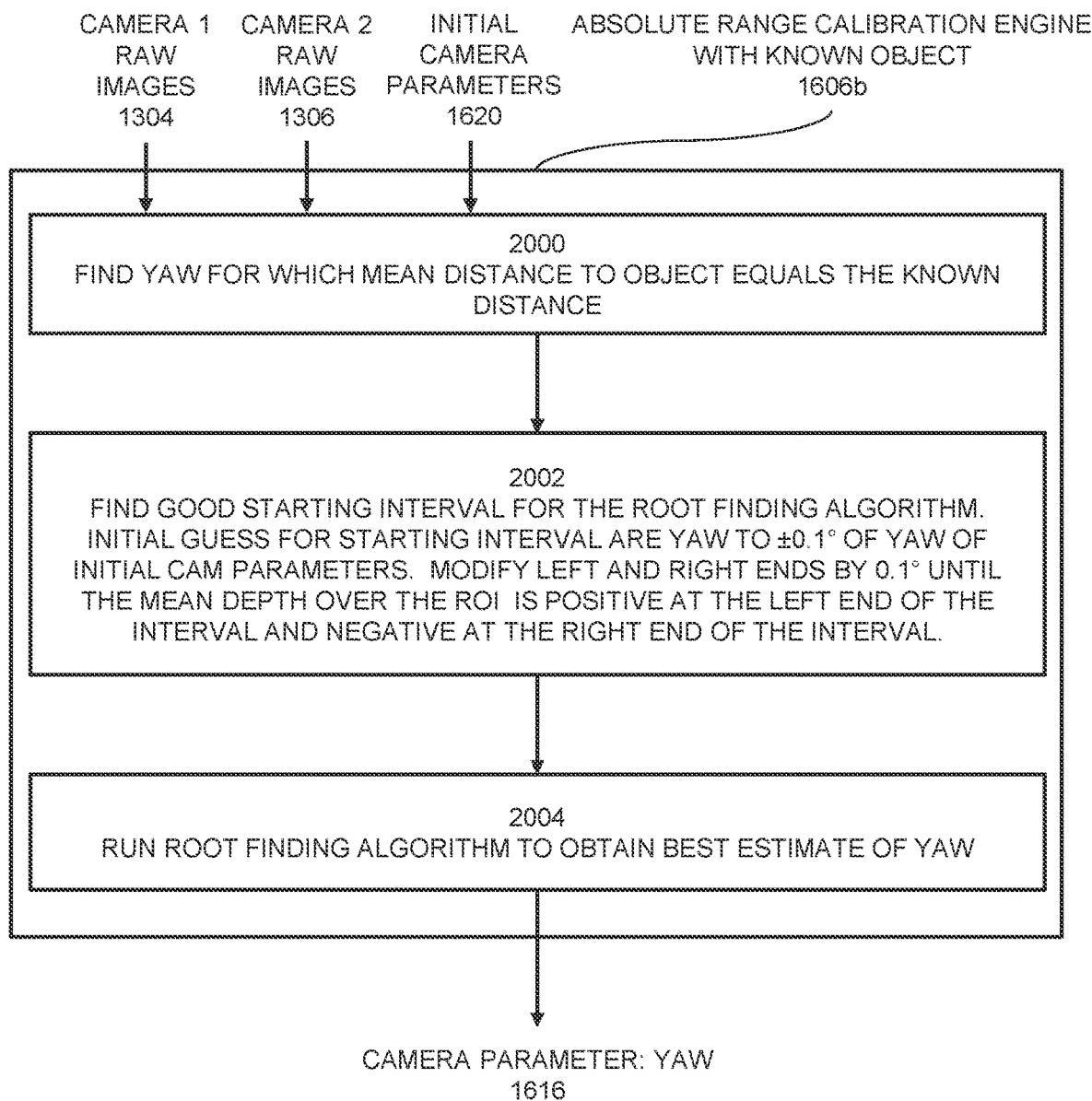
FIG. 20A shows a flow diagram of a procedure of an absolute range calibration engine of the autocalibration engine of FIG. 16, in which the procedure is for an object with known dimensions, according to some embodiments of the present technology.
Figure 20B:
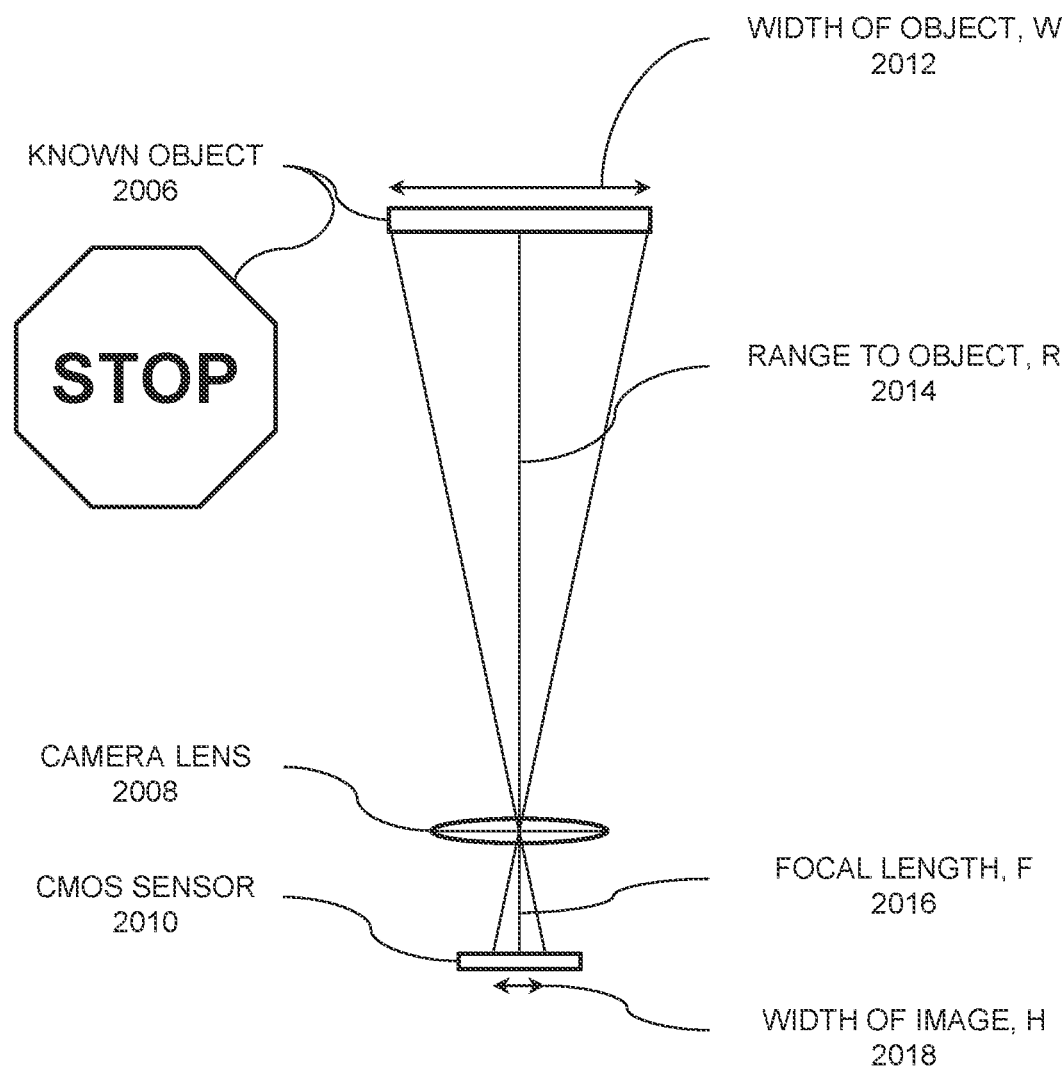
FIG. 20B shows an example of imaging of an object with known dimensions, according to some embodiments of the present technology.
Figure 24:
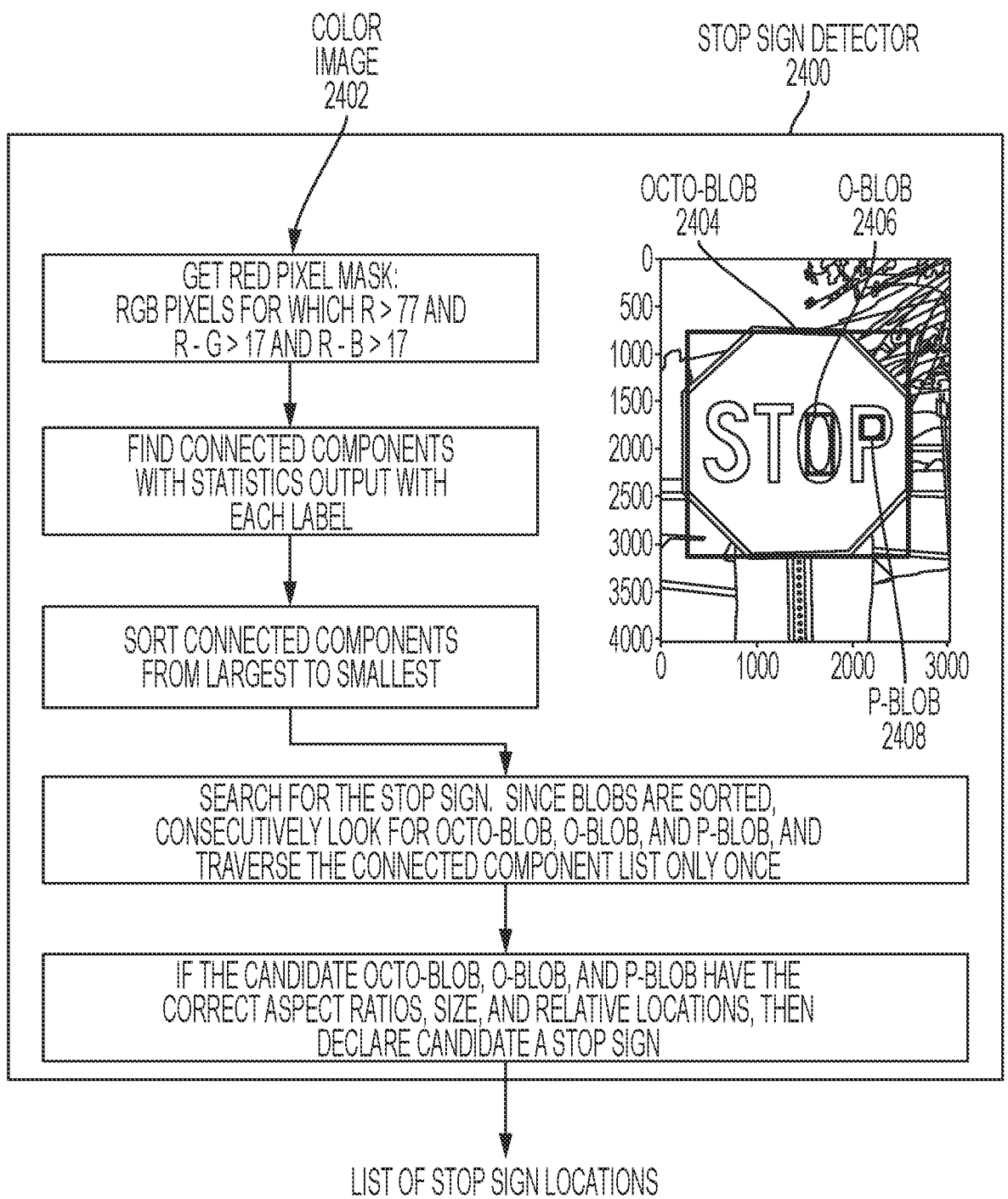
FIG. 24 shows a flow diagram of a procedure of a stop sign detector, according to some embodiments of the present technology.

FIG. 20A shows a flow diagram of the implementation 1606b, in which the absolute range calibration engine 1606 uses an object with known dimensions, according to some embodiments of the present technology. FIG. 20B illustrates an example of imaging optics for imaging an object 2006 with known dimensions, according to some embodiments of the present technology. In some embodiments, because the dimensions of the object 2006 are known and because focal lengths of camera lenses of the cameras 1300, 1302 are known, the range or distance to the object (target) 2006 may be determined by an equation 2020. More specifically, according to an equation 2020, a ratio of a width W of the object (see 2012) to a range R to the object (see 2014) is equal to a ratio of a focal length F of a camera lens 2008 (see 2016) to a width H of an image (see 2018) sensed by a camera sensor 2010 (e.g., a CMOS sensor). In some embodiments, a known object can be recognized in an automated fashion using known detection technology (e.g., a traffic sign recognition system, license plate detector, an object detector, etc.). In some embodiments, a known object may be specified manually by a manual input of a bounding box and a distance to the known object. An example of an object detector for detecting stop signs is shown in FIG. 24.

Returning to the flow diagram of the implementation 1606b shown in FIG. 20A, at 2000 the absolute range calibration engine 1600 finds the yaw for which the mean distance to the object equals the known distance. In some embodiments of the present technology, the mean distance may be computed over a region of interest of the object. At 2002 a good starting interval for a root finding algorithm is found by first initializing an interval to ±0.1 degrees of the yaw of the initial camera parameters 1620, and then modifying left and right ends by 0.1 degrees until a mean depth over the region of interest is positive at the left end of the interval and negative at the right end of the interval. At 2004 the root finding algorithm is run. In some embodiments, the root finding algorithm may be Brent's method, in which with the search interval found at 2002 is used to determine a best estimate of yaw. Subsequently, the initial camera parameters 1620 are returned with an updated yaw value 1616.

Figure 21A:
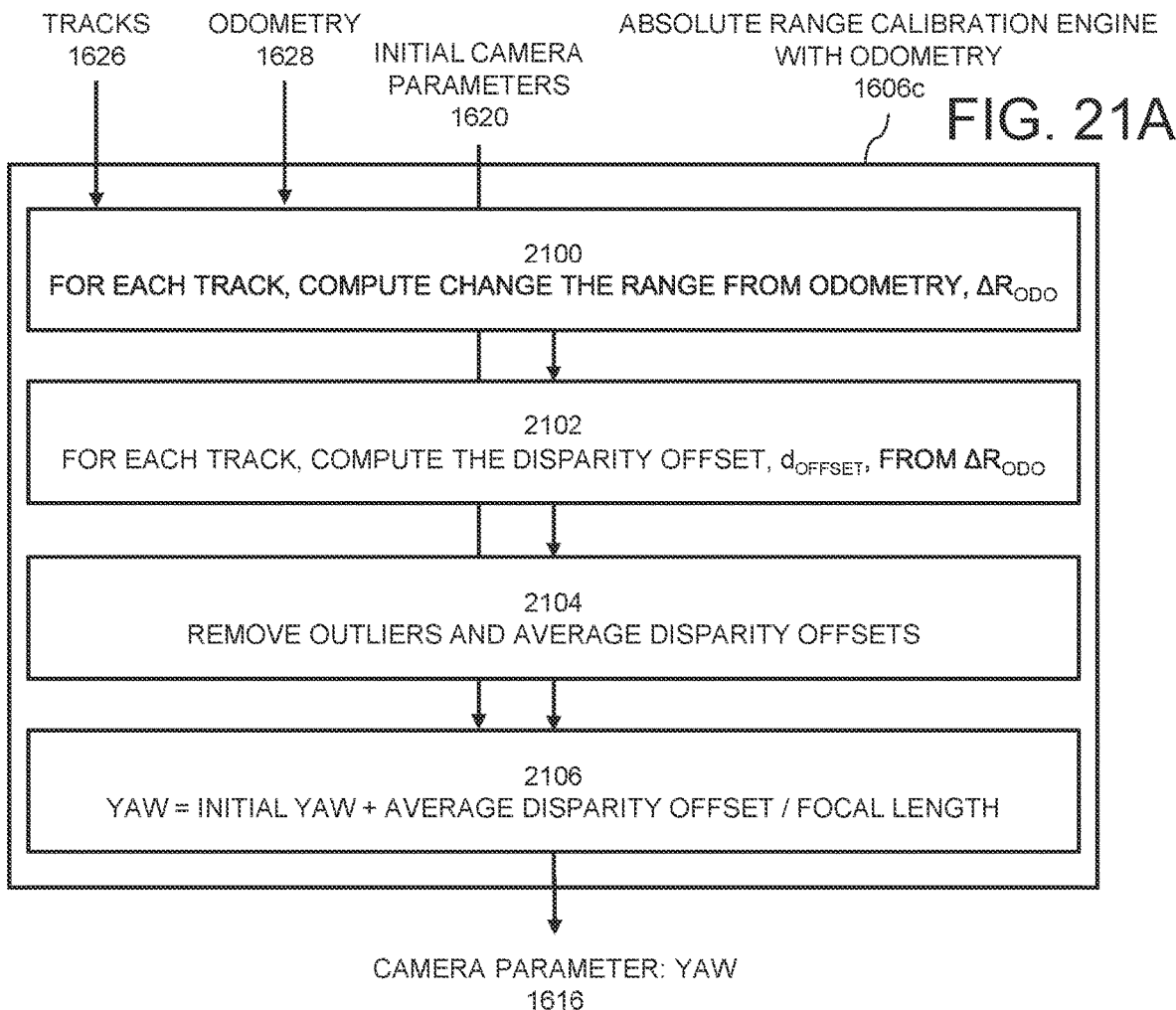
FIG. 21A shows a flow diagram of a procedure of an absolute range calibration engine of the autocalibration engine of FIG. 16, in which the procedure utilizes vehicle odometry, according to some embodiments of the present technology.
Figure 21B:
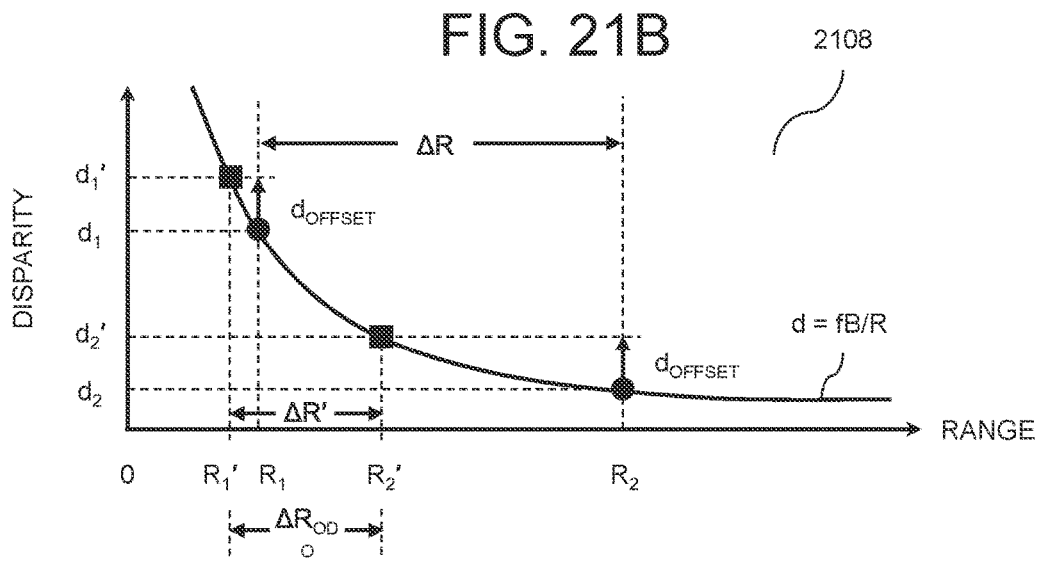
FIG. 21B is a chart showing how disparity can vary as a function of range, according to some embodiments of the present technology.

FIG. 21A shows a flow diagram of the implementation 1606c, in which the absolute range calibration engine 1606 utilizes vehicle odometry 1628, according to some embodiments of the present technology. FIG. 21B is a chart 2108 showing how disparity can vary as a function of range, according to some embodiments of the present technology. Odometry (e.g., speed, distance, heading, etc.) may be information already available from in-car ("on-board") sensors, and may be used to help calculate the yaw of the stereo vision system. In some embodiments, odometry may be available from on-board radar and/or lidar systems. In the implementation 1606c, at 2100, for each track 1626 from the stereo image stabilization engine 1608, a change in range, $\Delta R_{ODO}$, is computer from odometry data from a time t1 to time a t2. A corresponding change in range, $\Delta R$, is measured by the stereo vision system and might not match $\Delta R_{ODO}$ because of miscalibration. At 2102 a disparity offset, $d_{offset}$, is computed using a function expressed by: d=fB/R, where f is the focal length of the lens and B is the baseline width between the first and second cameras 1300, 1302, so that a corrected range $\Delta R'$ equals $\Delta R_{ODO}$. Tracks of stationary objects may give the same or similar values for $d_{offset}$ but moving objects may not. At 2104 outlier values for $d_{offset}$ are removed and remaining values are averaged. At 2104 yaw is calibrated to be equal to the initial yaw plus the average disparity offset divided by the focal length of the cameras. Subsequently, the initial camera parameters 1620 are returned with an updated yaw value 1616.

FIG. 22 shows a flow diagram of a procedure performed by the calibration manager 1624, according to some embodiments of the present technology. At 2200 camera parameters are initialized the command and control interface 1312 configures the calibration engines 1600, 1602, 1604, 1606, 1608. The initial camera parameters may be extrinsic and intrinsic camera parameters obtained from blueprints, CAD drawings, manufacturer's datasheets, etc., or may be obtained from manual calibration procedures. At 2202 the calibration manager 1624 waits for outputs from the calibration engines 1600, 1602, 1604, 1606, 1608. Once an output of an estimate of a camera parameter is received, at 2204 the estimate is used in a tracking filter (e.g., a Kalman filter) that uses a series of measurements over time and produces a new estimate of the camera parameter, which may be more accurate than an estimate on a single measurement alone. This may be done for each of a plurality of camera parameters. At 2206, new estimates for the camera parameters may be saved in the storage device 1622 and the updated camera parameters 1410, 1412 for Camera 1 and Camera 2 may be output from the calibration manager 1624.

Figure 23:
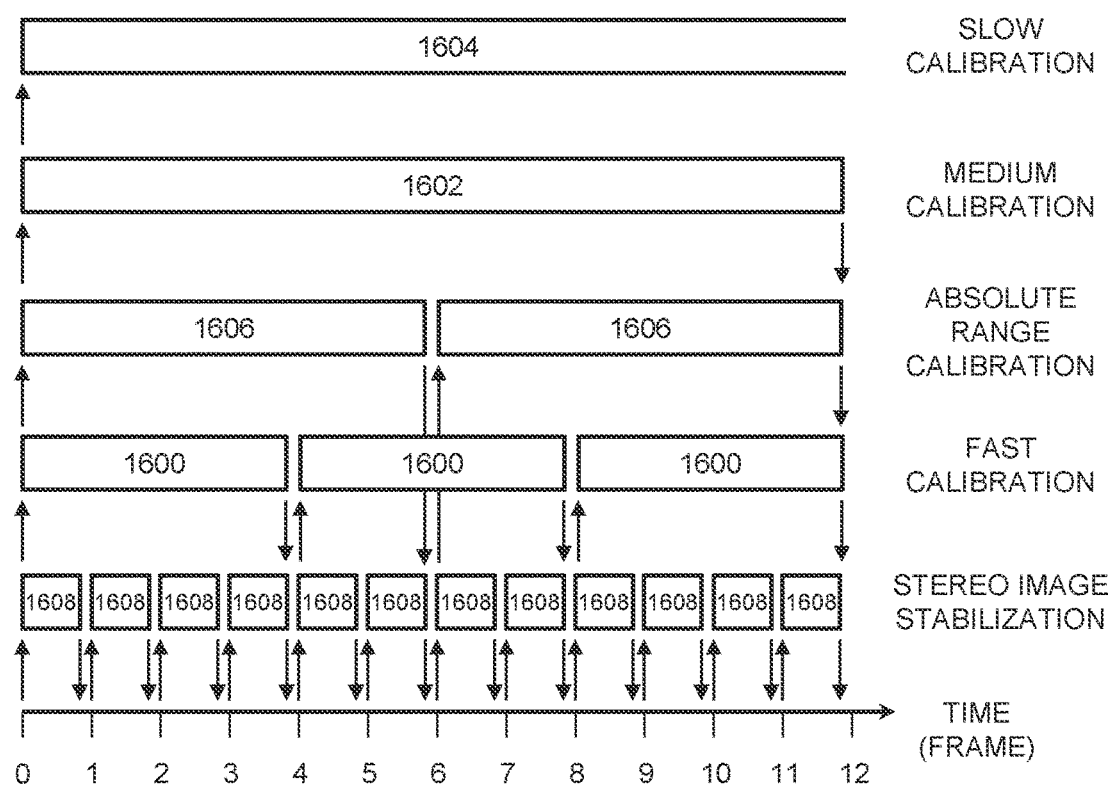
FIG. 23 shows a time series input diagram of the calibration manager of FIG. 22, according to some embodiments of the present technology.

FIG. 23 shows a time series input diagram of the calibration manager 1624, according to some embodiments of the present technology. The time axis is shown for different frame numbers, which may correspond to different frame rates (e.g., 10, 30, or 60 FPS). Upward arrows indicate the initialization or start of a calibration method 1600, 1602, 1604, 1606, 1608 by the calibration manager 1624, and the downward arrows indicate the completion of the calibration method, where optimal parameters are returned to the calibration manager 1624. The execution times for calibration methods in FIG. 23 is an example of one embodiment.

FIG. 24 shows a flow diagram of a procedure that may be performed by a stop sign detector 2400 that may be used for absolute range calibration, according to some embodiments of the present technology. Input to the detector 2400 may be a color image 2402. For example, the detector 2400 may look for an arrangement of red connected components in the letters "STOP." These components may include a red region inside an oval (e.g., the letter "O" 2406), a red region inside a particular shape (e.g., the letter "P" 2408), and a red octagonal region 2404. The relative locations and sizes of the connected components may give a unique signature, which may be detected quickly with few computational resources.

Figure 25:
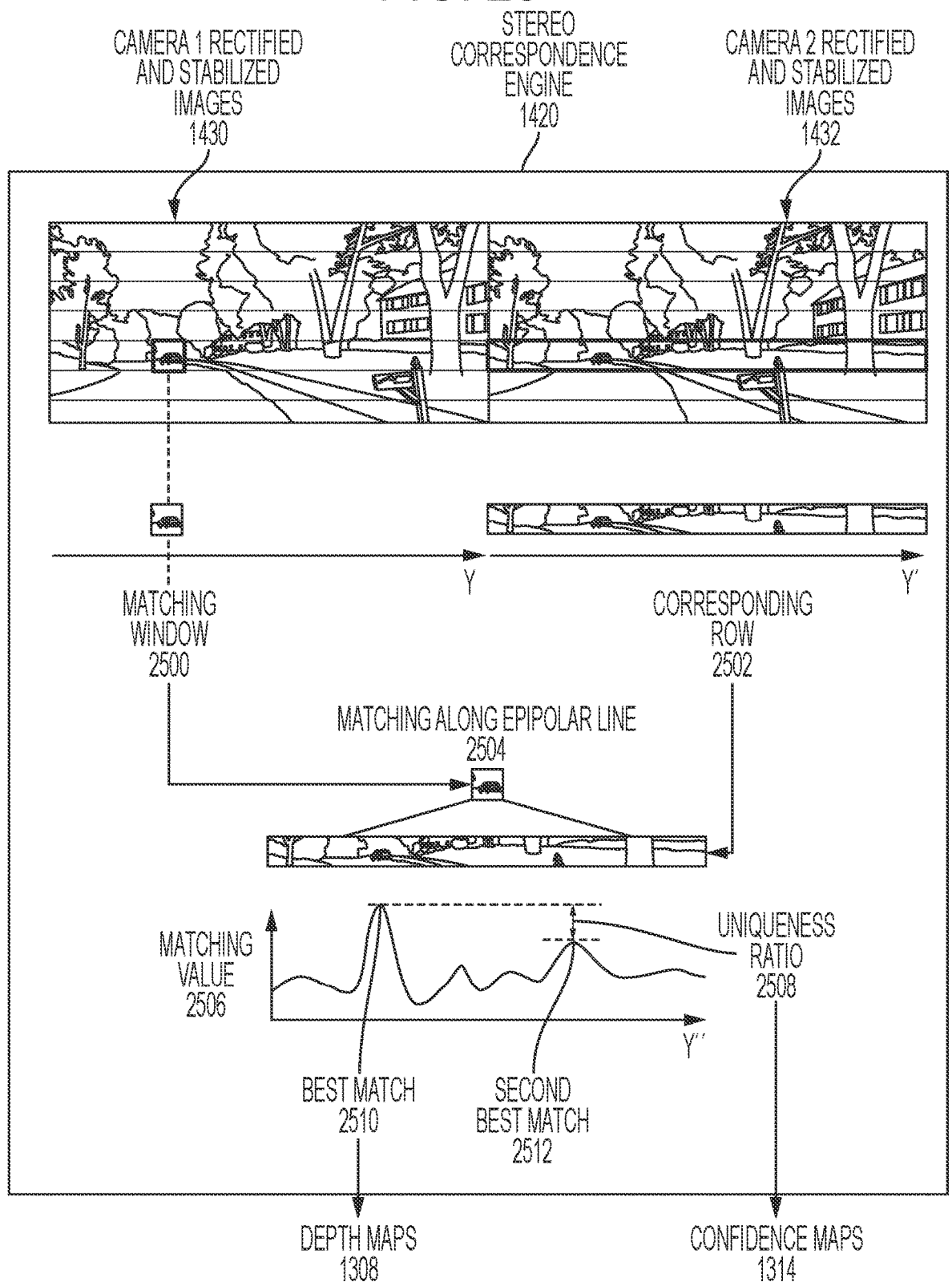
FIG. 25 shows a diagram illustrating a procedure of a stereo correspondence engine of the processing component of FIG. 14, according to some embodiments of the present technology.

FIG. 25 shows a flow diagram of a procedure performed by the stereo correspondence engine 1420, according to some embodiments of the present technology. Input to the stereo correspondence engine 1420 may be the rectified and stabilized images 1430, 1432 from Camera 1 and Camera 2. The stereo correspondence engine 1420 may output depth maps 1308 and confidence maps 1314. In some embodiments, a matching window 2500 in the rectified and stabilized image 1430 may be compared to a corresponding row 2502 in the rectified and stabilized image 1432. For each pixel, a resulting matching value 2506 may be a negative value of a sum of absolute differences between the matching window and each offset along the corresponding row 2502. The matching value for each offset may be computed, where a best match 2510 may correspond to a highest matching value and where a second-best match 2512 may correspond to a second-highest matching value. A uniqueness ratio for a given pixel may be a ratio determined as the best match 2510 divided by the second-best match 2512. A higher confidence corresponds to a higher uniqueness ratio. The depth map 1308 may be derived from the best match 2510. The confidence map may be derived from the ratio of best match 2510 to second-best match 2512.

According to some embodiments of the present technology, the processing component 1310 may implemented in hardware (e.g., a computer processor programmed to perform the procedures and methods described above). According to some embodiments of the present technology, the processing component 1310 may be implemented in software (e.g., computer-executable code), which may be stored on a non-transitory computer-readable storage medium or on a plurality of non-transitory computer-readable storage media, and which may be accessed and executed by a computer processor. According to some embodiments of the present technology, the processing component 1310 may be implemented in a combination of hardware and software. In some embodiments, aspects of the processing component 1310 may be implemented as one or more software modules. For example, one of more the engines of the processing component 1310 may be implemented as software module(s) stored on a non-transitory computer-readable storage medium.

A stereo imaging system according to the technology described herein may be embodied in different configurations. Example configurations include combinations of configurations (1) through (27), as follows:

(1) A stereo vision system, comprising: a first camera sensor configured to sense first reflected energy of a first image and to generate first sensor signals based on the first reflected energy; a second camera sensor configured to sense second reflected energy of a second image and generate second sensor signals based on the second reflected energy; at least one processor configured to receive the first sensor signals from the first camera sensor and the second sensor signals from the second camera sensor, and to produce three-dimensional (3D) data from the first and second sensor signals, wherein the at least one processor is configured to: generate rectified stereo images from the first and second sensor signals utilizing stereo calibration parameters, perform a stereo matching on the rectified images, and perform an automatic system calibration using data from a plurality of stereo images obtained by the first and second camera sensors, wherein the automatic system calibration is based on minimizing a cost function.

(2) The stereo vision system of configuration (1), wherein the automatic system calibration is comprised of a fast calibration procedure configured to generate first stereo calibration parameters to perform one or both of:

to compensate for high-frequency perturbations based on tracking image points corresponding to features in the first and second images, and to calibrate, for each camera, any one or any combination of: a focal length, a principal point, at least one radial lens distortion coefficient, and at least one tangential lens distortion coefficient.

(3) The stereo vision system of any of configurations (1) to (2), wherein the automatic system calibration is comprised of a medium calibration procedure configured to generate second stereo calibration parameters to perform one or both of:

to compensate for medium-frequency perturbations based on optimizing a number of valid pixels for dense stereo block matching as a function of a relative camera pitch and a relative camera roll, and to calibrate, for each camera, any one or any combination of: a focal length, a principal point, at least one radial lens distortion coefficient, and at least one tangential lens distortion coefficient.

(4) The stereo vision system of any of configurations (1) to (3), wherein the automatic system calibration is comprised of a slow calibration procedure configured to generate third stereo calibration parameters to perform one or both of:

to compensate for low-frequency perturbations based on optimizing a number of valid pixels for dense stereo block matching as a function of any one or any combination of: a relative camera pitch, a relative camera roll, a relative camera yaw, a relative camera position, and to calibrate, for each camera, any one or any combination of: a focal length, a principal point, at least one radial lens distortion coefficient, and at least one tangential lens distortion coefficient.

(5) The stereo vision system of any of configurations (1) to (4), wherein the automatic system calibration is comprised of an absolute range calibration procedure configured to generate a stereo calibration parameter for a relative camera yaw based on a non-negative disparity constraint.

(6) The stereo vision system of any of configurations (1) to (5), wherein the automatic system calibration is comprised of an absolute range calibration procedure configured to generate a stereo calibration parameter for a relative camera yaw based on dimensions of an object in a scene of a plurality of stereo images and a focal length of the first and second camera sensors.

(7) The stereo vision system of configuration (6), wherein the object is a traffic sign.

(8) The stereo vision system of configuration (6), wherein the object is a license plate.

(9) The stereo vision system of any of configurations (1) to (8), wherein the automatic system calibration is comprised of an absolute range calibration procedure configured to generate a stereo calibration parameter for a relative camera yaw based on vehicle odometry.

(10) The stereo vision system of any of configurations (1) to (9), wherein the automatic system calibration is comprised of a calibration management procedure configured to manage an operation schedule of the slow calibration procedure, the medium calibration procedure, the fast calibration procedure, and an absolute range calibration procedure.

(11) The stereo vision system of any of configurations (1) to (10), wherein the automatic system calibration is comprised of a calibration health indicator that indicates an accuracy of the automatic system calibration.

(12) The stereo vision system of any of configurations (1) to (11), wherein the stereo matching is comprised of a depth estimate confidence score for each pixel of the plurality of stereo images.

(13) The stereo vision system of any of configurations (1) to (12), wherein the first and second camera sensors are mounted on any of: a vehicle, a car, a truck, a traffic light, a lamp post, left-side and right-side view mirrors of a vehicle, respectively, a roof line of a vehicle, an upper-left-side and an upper-right-side of a windshield, respectively, and left and right head lamps, respectively.

(14) The stereo vision system of any of configurations (1) to (13), wherein the cost function is based on a number of valid pixels in a disparity map.

(15) The stereo vision system of any of configurations (1) to (14), wherein the cost function is optimized based on intrinsic camera parameters.

(16) The stereo vision system of an of configurations (1) to (15), wherein the cost function is optimized based on extrinsic camera parameters.

(17) The stereo vision system of any of configurations (1) to (16), wherein the at least one processor is configured to provide a calibration health indicator.

(18) The stereo vision system of any of configurations (1) to (17), further comprising: a close-range sensor system configured to provide 3D data for objects in a range that is closer than a minimum depth-range of the first and second camera sensors, wherein the at least one processor is configured to combine the 3D data produced from the first and second sensor signals with the 3D data provided by the close-range sensor system.

(19) The stereo vision system of configuration (18), wherein the close-range sensor system is comprised of a pair of camera sensors having a wider field-of-view and a shorter baseline distance than the first and second camera sensors.

(20) The stereo vision system of configuration (18), wherein the close-range sensor system is comprised of a third camera sensor that forms a trinocular stereo system with the first and second camera sensors, such that the first and second camera sensors have a shorter baseline length than the first and third camera sensors.

(21) The stereo vision system of configuration (18), wherein the close-range sensor system is comprised of a time-of-flight camera.

(22) The stereo vision system of any of configurations (1) to (21), further comprising an active illumination device configured to emit visible or infrared radiation towards a field of view of the first and second camera sensors.

(23) The stereo vision system of configuration (22), wherein the active illumination device is configured to: alternate between emitting radiation and not emitting radiation, and emit radiation in synchronization with an exposure interval of the first camera sensor and an exposure interval of the second camera sensor.

(24) The stereo vision system of configuration (22), wherein the active illumination component is comprised of any one or any combination of: a vertical cavity surface emitting laser array, a radiation lamp that emits in a visible spectrum range, and a radiation lamp that emits in a near-infrared spectrum range.

(25). The stereo vision system of any of configurations (1) to (24), wherein the at least one processor is configured to: compute structure-from-motion data from the first sensor signal and from the second sensor signal, and estimate, using the structure-from-motion data, 3D positions of objects that are closer than a minimum depth-range of the first and second camera sensors.

Methods for detection of an object according to the technology described herein may be include various processes. Example methods include combinations of processes (26) and (27), as follows:

(26) A computer-implemented method performed by one or more processors for detection of an object in an image, the method comprising: identifying connected component regions on the object by color; determining an aspect ratio of each of the connected component regions; determining a distance between the connected component regions; and identifying the object to be a known object based on the aspect ratios and the distance between the connected component regions, wherein by a presence, a location, and a size of the known object is determined from the image.

(27) The method of process (26), wherein: the identifying of the connected component regions identifies the color to be red, and the identifying of the object identifies the object to be a stop sign.

Methods to calibrate a stereo vision system according to the technology described herein may be include various processes. Example methods include combinations of processes (28) through (33), as follows:

(28) A computer-implemented calibration method performed by one or more processors to calibrate a stereo vision system that includes a first camera sensor configured to sense first reflected energy of a first image and to generate first sensor signals based on the first reflected energy and a second camera sensor configured to sense second reflected energy of a second image and generate second sensor signals based on the second reflected energy, the method comprising: generating stereo images from the first and second sensor signals; rectifying the stereo images using stereo calibration parameters, to produce rectified stereo images; performing a stereo matching on the rectified stereo images; and performing an automatic system calibration using a result of the stereo matching, wherein the automatic system calibration is based on minimizing a cost function.

(29) The method of process (28), wherein the automatic system calibration is comprised of any one or any combination of: a fast calibration procedure configured to generate first stereo calibration parameters to compensate for high-frequency perturbations based on tracking image points corresponding to features in the first and second images; a medium calibration procedure configured to generate second stereo calibration parameters to compensate for medium-frequency perturbations based on optimizing a number of valid pixels for dense stereo block matching as a function of a relative camera pitch and a relative camera roll, and a slow calibration procedure configured to generate third stereo calibration parameters to compensate for low-frequency perturbations based on optimizing a number of valid pixels for dense stereo block matching as a function of a relative camera pitch, a relative camera roll, a relative camera yaw, and a relative camera position.

(30) The method of process (28) or process (29), wherein the automatic system calibration is comprised of an absolute range calibration procedure configured to generate a stereo calibration parameter for a relative camera yaw based on a non-negative disparity constraint.

(31) The method of any one of processes (28) to (30), wherein the automatic system calibration is comprised of an absolute range calibration procedure configured to generate a stereo calibration parameter for a relative camera yaw based on dimensions of an object in a scene of a plurality of stereo images and a focal length of the first and second camera sensors.

(32) The method of any one of processes (28) to (31), wherein the automatic system calibration is comprised of an absolute range calibration procedure configured to generate a stereo calibration parameter for a relative camera yaw based on vehicle odometry.

(33) The method of any one of processes (28) to (32), wherein the automatic system calibration is comprised of a calibration management procedure configured to manage an operation schedule of the slow calibration procedure, the medium calibration procedure, the fast calibration procedure, and an absolute range calibration procedure.

A non-transitory computer readable medium storing computer-executable code to calibrate a stereo vision system according to the technology described herein may be embodied in different configurations. Example configurations include combinations of configurations (34) through (39), as follows:

(34) A non-transitory computer readable medium storing computer-executable code that, when executed by one or more processors, causes the one or more processors to calibrate a stereo vision system that includes a first camera sensor configured to sense first reflected energy of a first image and to generate first sensor signals based on the first reflected energy and a second camera sensor configured to sense second reflected energy of a second image and generate second sensor signals based on the second reflected energy, wherein the method is comprised of: generating stereo images from the first and second sensor signals; rectifying the stereo images using stereo calibration parameters, to produce rectified stereo images; performing a stereo matching on the rectified stereo images; and performing an automatic system calibration using a result of the stereo matching, wherein the automatic system calibration is based on minimizing a cost function.

(35) The non-transitory computer readable medium of configuration (34), wherein the automatic system calibration is comprised of any one or any combination of: a fast calibration procedure configured to generate first stereo calibration parameters to compensate for high-frequency perturbations based on tracking image points corresponding to features in the first and second images; a medium calibration procedure configured to generate second stereo calibration parameters to compensate for medium-frequency perturbations based on optimizing a number of valid pixels for dense stereo block matching as a function of a relative camera pitch and a relative camera roll, and a slow calibration procedure configured to generate third stereo calibration parameters to compensate for low-frequency perturbations based on optimizing a number of valid pixels for dense stereo block matching as a function of a relative camera pitch, a relative camera roll, a relative camera yaw, and a relative camera position.

(36) The non-transitory computer readable medium of configuration (34) or configuration (35), wherein the automatic system calibration is comprised of an absolute range calibration procedure configured to generate a stereo calibration parameter for a relative camera yaw based on a non-negative disparity constraint.

(37) The non-transitory computer readable medium of any one of configurations (34) to (36), wherein the automatic system calibration is comprised of an absolute range calibration procedure configured to generate a stereo calibration parameter for a relative camera yaw based on dimensions of an object in a scene of a plurality of stereo images and a focal length of the first and second camera sensors.

(38) The non-transitory computer readable medium of any one of configurations (34) to (37), wherein the automatic system calibration is comprised of an absolute range calibration procedure configured to generate a stereo calibration parameter for a relative camera yaw based on vehicle odometry.

(39) The non-transitory computer readable medium of any one of configurations (34) to (38), wherein the automatic system calibration is comprised of a calibration management procedure configured to manage an operation schedule of the slow calibration procedure, the medium calibration procedure, the fast calibration procedure, and an absolute range calibration procedure.

It should be understood that the embodiments and examples described herein have been chosen and described in order to illustrate the principles, methods, and processes of the inventive technology and its practical applications to thereby enable one of ordinary skill in the art to utilize the inventive technology in various embodiments and with various modifications as are suited for particular uses contemplated. Even though specific embodiments of the inventive technology have been described, they are not to be taken as exhaustive. Other embodiments and variations that will be apparent to those skilled in the art but that are not specifically described herein are within the scope of the present technology.

Unless stated otherwise, the terms "approximately" and "about" are used to mean within ±20% of a target value in some embodiments, within ±10% of a target value in some embodiments, within ±5% of a target value in some embodiments, and yet within ±2% of a target value in some embodiments. The terms "approximately" and "about" can include the target value. The term "essentially" is used to mean within ±3% of a target value.

The technology described herein may be embodied as a method, of which at least some acts have been described. The acts performed as part of the method may be ordered in any suitable way. Accordingly, embodiments may be implemented in which acts are performed in an order different than described, which may include performing some acts simultaneously, even though described as sequential acts in illustrative embodiments. Additionally, a method may include more acts than those described, in some embodiments, and fewer acts than those described in other embodiments.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The indefinite articles "a" and "an," as used herein in the specification and in the claims, unless clearly indicated to the contrary, should be understood to mean "at least one."

Any use of the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Any use of the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," if used in the claims, shall have its ordinary meaning as used in the field of patent law.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

Also, some of the embodiments described above may be implemented as one or more method(s), of which some examples have been provided. The acts performed as part of the method(s) may be ordered in any suitable way. Accordingly, embodiments may be constructed in which acts are performed in an order different than illustrated or described herein, which may include performing some acts simultaneously, even though shown as sequential acts in illustrative embodiments.

Further, although advantages of the present invention may be indicated, it should be appreciated that not every embodiment of the invention will include every described advantage. Some embodiments may not implement any features described as advantageous herein. Accordingly, the foregoing description and attached drawings are by way of example only.

REFERENCES CITED

U.S. Pat. No. 6,392,688B1;
U.S. Pat. No. 8,797,387B2;
U.S. Pat. No. 10,097,812B2;
JP2008-509619A; and
Timo Hinzmann, Tim Taubner, and Roland Siegwart, "Flexible Stereo: Constrained, Non-rigid, Wide-baseline Stereo Vision for Fixed-Wing Aerial Platforms," IEEE International Conference on Robotics and Automation (ICRA), Brisbane AU (2018).

What is claimed is:

1. A stereo vision system, comprising:
a first camera sensor configured to obtain a plurality of frames of a first image by sensing first reflected energy of the first image and to generate first sensor signals based on the first reflected energy;
a second camera sensor configured to obtain a plurality of frames of a second image by sensing second reflected energy of the second image and to generate second sensor signals based on the second reflected energy;
at least one processor configured to receive the first sensor signals from the first camera sensor and the second sensor signals from the second camera sensor, and to produce three-dimensional (3D) data from the first and second sensor signals, wherein the at least one processor is configured to:
generate stereo images from the frames of the first image and the frames of the second image,
rectify the stereo images using stereo calibration parameters,
perform a stereo matching on the rectified images, and
perform an automatic system calibration using data from the stereo-matched images, wherein the automatic system calibration is based on minimizing a cost function, and wherein the automatic system calibration is comprised of:
a fast calibration procedure performed at fast intervals to compensate for high-frequency perturbations,
a medium calibration procedure performed at medium intervals to compensate for medium-frequency perturbations, each medium interval being longer than each fast interval, and a slow calibration procedure performed at slow intervals to compensate for low-frequency perturbations, each slow interval being longer than each medium interval, wherein the automatic system calibration is comprised of a stereo image stabilization performed at intervals of one frame each.

2. The stereo vision system of claim 1, wherein the first sensor signals and the second sensor signals are provided to the at least one processor in real time or nearly real time when the frames of the first and second images are being obtained by the first and second camera sensors.

3. The stereo vision system of claim 1, wherein the fast calibration procedure is configured to generate first stereo calibration parameters to compensate for high-frequency perturbations by tracking image points corresponding to features in the first and second images.

4. A stereo vision system, comprising:
a first camera sensor configured to obtain a plurality of frames of a first image by sensing first reflected energy of the first image and to generate first sensor signals based on the first reflected energy;
a second camera sensor configured to obtain a plurality of frames of a second image by sensing second reflected energy of the second image and to generate second sensor signals based on the second reflected energy;
at least one processor configured to receive the first sensor signals from the first camera sensor and the second sensor signals from the second camera sensor, and to produce three-dimensional (3D) data from the first and second sensor signals, wherein the at least one processor is configured to:
generate stereo images from the frames of the first image and the frames of the second image,
rectify the stereo images using stereo calibration parameters,
perform a stereo matching on the rectified images, and
perform an automatic system calibration using data from the stereo-matched images, wherein the automatic system calibration is based on minimizing a cost function, and wherein the automatic system calibration is comprised of:
a fast calibration procedure performed at fast intervals to compensate for high-frequency perturbations,
a medium calibration procedure performed at medium intervals to compensate for medium-frequency perturbations, each medium interval being longer than each fast interval, and
a slow calibration procedure performed at slow intervals to compensate for low-frequency perturbations, each slow interval being longer than each medium interval,
wherein the medium calibration procedure is configured to generate second stereo calibration parameters to compensate for medium-frequency perturbations by optimizing a number of valid pixels for dense stereo block matching as a function of a relative camera pitch and a relative camera roll.

5. A stereo vision system, comprising:
a first camera sensor configured to obtain a plurality of frames of a first image by sensing first reflected energy of the first image and to generate first sensor signals based on the first reflected energy;
a second camera sensor configured to obtain a plurality of frames of a second image by sensing second reflected energy of the second image and to generate second sensor signals based on the second reflected energy;
at least one processor configured to receive the first sensor signals from the first camera sensor and the second sensor signals from the second camera sensor, and to produce three-dimensional (3D) data from the first and second sensor signals, wherein the at least one processor is configured to:
generate stereo images from the frames of the first image and the frames of the second image,
rectify the stereo images using stereo calibration parameters,
perform a stereo matching on the rectified images, and
perform an automatic system calibration using data from the stereo-matched images, wherein the automatic system calibration is based on minimizing a cost function, and wherein the automatic system calibration is comprised of:
a fast calibration procedure performed at fast intervals to compensate for high-frequency perturbations,
a medium calibration procedure performed at medium intervals to compensate for medium-frequency perturbations, each medium interval being longer than each fast interval, and
a slow calibration procedure performed at slow intervals to compensate for low-frequency perturbations, each slow interval being longer than each medium interval,
wherein the slow calibration procedure is configured to generate third stereo calibration parameters to compensate for low-frequency perturbations by optimizing a number of valid pixels for dense stereo block matching as a function of a relative camera pitch, a relative camera roll, a relative camera yaw, and a relative camera position.

6. A stereo vision system, comprising:
a first camera sensor configured to obtain a plurality of frames of a first image by sensing first reflected energy of the first image and to generate first sensor signals based on the first reflected energy;
a second camera sensor configured to obtain a plurality of frames of a second image by sensing second reflected energy of the second image and to generate second sensor signals based on the second reflected energy;
at least one processor configured to receive the first sensor signals from the first camera sensor and the second sensor signals from the second camera sensor, and to produce three-dimensional (3D) data from the first and second sensor signals, wherein the at least one processor is configured to:
generate stereo images from the frames of the first image and the frames of the second image,
rectify the stereo images using stereo calibration parameters,
perform a stereo matching on the rectified images, and
perform an automatic system calibration using data from the stereo-matched images, wherein the automatic system calibration is based on minimizing a cost function, and wherein the automatic system calibration is comprised of:
a fast calibration procedure performed at fast intervals to compensate for high-frequency perturbations,
a medium calibration procedure performed at medium intervals to compensate for medium-frequency perturbations, each medium interval being longer than each fast interval, and a slow calibration procedure performed at slow intervals to compensate for low-frequency perturbations, each slow interval being longer than each medium interval, wherein the automatic system calibration is comprised of an absolute range calibration procedure performed at intervals longer than each fast interval and shorter than each medium interval.

7. The stereo vision system of claim 6, wherein the absolute range calibration procedure is configured to generate a stereo calibration parameter for a relative camera yaw based on a non-negative disparity constraint.

8. The stereo vision system of claim 7, wherein the absolute range calibration procedure configured to generate the stereo calibration parameter based on dimensions of an object in a scene of a plurality of stereo images and a focal length of the first and second camera sensors.

9. A computer-implemented calibration method performed by one or more processors to calibrate a stereo vision system that includes a first camera sensor configured to obtain a plurality of frames of a first image by sensing first reflected energy of a first image and to generate first sensor signals based on the first reflected energy and a second camera sensor configured to obtain a plurality of frames of a second image by sensing second reflected energy of a second image and to generate second sensor signals based on the second reflected energy, the method comprising:

generating, by the one or more processors, stereo images from the frames of the first image and the frames of the second image;

rectifying, by the one or more processors, the stereo images using stereo calibration parameters, to produce rectified stereo images;

performing, by the one or more processors, a stereo matching on the rectified stereo images, to produce stereo-matched images; and performing, by the one or more processors, an automatic system calibration using data from the stereo-matched images, wherein the automatic system calibration is based on minimizing a cost function, and wherein the automatic system calibration is comprised of:

a fast calibration procedure performed at fast intervals to compensate for high-frequency perturbations;

a medium calibration procedure performed at medium intervals to compensate for medium-frequency perturbations, each medium interval being longer than each fast interval, and a slow calibration procedure performed at slow intervals to compensate for low-frequency perturbations, each slow interval being longer than each medium interval, wherein the automatic system calibration is comprised of a stereo image stabilization performed at intervals of one frame each.

10. The method of claim 9, further comprising:

receiving, by the one or more processors, the first sensor signals and the second sensor signals in real time or nearly real time when the frames of the first and second images are being obtained by the first and second camera sensors.

11. The method of claim 9, wherein the fast calibration procedure is comprised of tracking image points corresponding to features in the first and second images to generate first stereo calibration parameters to compensate for high-frequency perturbations.

12. A computer-implemented calibration method performed by one or more processors to calibrate a stereo vision system that includes a first camera sensor configured to obtain a plurality of frames of a first image by sensing first reflected energy of a first image and to generate first sensor signals based on the first reflected energy and a second camera sensor configured to obtain a plurality of frames of a second image by sensing second reflected energy of a second image and to generate second sensor signals based on the second reflected energy, the method comprising:

generating, by the one or more processors, stereo images from the frames of the first image and the frames of the second image;

rectifying, by the one or more processors, the stereo images using stereo calibration parameters, to produce rectified stereo images;

performing, by the one or more processors, a stereo matching on the rectified stereo images, to produce stereo-matched images; and performing, by the one or more processors, an automatic system calibration using data from the stereo-matched images, wherein the automatic system calibration is based on minimizing a cost function, and wherein the automatic system calibration is comprised of:

a fast calibration procedure performed at fast intervals to compensate for high-frequency perturbations;

a medium calibration procedure performed at medium intervals to compensate for medium-frequency perturbations, each medium interval being longer than each fast interval, and a slow calibration procedure performed at slow intervals to compensate for low-frequency perturbations, each slow interval being longer than each medium interval, wherein the medium calibration procedure is comprised of optimizing a number of valid pixels for dense stereo block matching as a function of a relative camera pitch and a relative camera roll to generate second stereo calibration parameters to compensate for medium-frequency perturbations.

13. A computer-implemented calibration method performed by one or more processors to calibrate a stereo vision system that includes a first camera sensor configured to obtain a plurality of frames of a first image by sensing first reflected energy of a first image and to generate first sensor signals based on the first reflected energy and a second camera sensor configured to obtain a plurality of frames of a second image by sensing second reflected energy of a second image and to generate second sensor signals based on the second reflected energy, the method comprising:

generating, by the one or more processors, stereo images from the frames of the first image and the frames of the second image;

rectifying, by the one or more processors, the stereo images using stereo calibration parameters, to produce rectified stereo images;

performing, by the one or more processors, a stereo matching on the rectified stereo images, to produce stereo-matched images; and performing, by the one or more processors, an automatic system calibration using data from the stereo-matched images, wherein the automatic system calibration is based on minimizing a cost function, and wherein the automatic system calibration is comprised of:

a fast calibration procedure performed at fast intervals to compensate for high-frequency perturbations;

a medium calibration procedure performed at medium intervals to compensate for medium-frequency perturbations, each medium interval being longer than each fast interval, and a slow calibration procedure performed at slow intervals to compensate for low-frequency perturbations, each slow interval being longer than each medium interval, wherein the slow calibration procedure is comprised of optimizing a number of valid pixels for dense stereo block matching as a function of a relative camera pitch, a relative camera roll, a relative camera yaw, and a relative camera position to generate third stereo calibration parameters to compensate for low-frequency perturbations.

14. A computer-implemented calibration method performed by one or more processors to calibrate a stereo vision system that includes a first camera sensor configured to obtain a plurality of frames of a first image by sensing first reflected energy of a first image and to generate first sensor signals based on the first reflected energy and a second camera sensor configured to obtain a plurality of frames of a second image by sensing second reflected energy of a second image and to generate second sensor signals based on the second reflected energy, the method comprising:

generating, by the one or more processors, stereo images from the frames of the first image and the frames of the second image;

rectifying, by the one or more processors, the stereo images using stereo calibration parameters, to produce rectified stereo images;

performing, by the one or more processors, a stereo matching on the rectified stereo images, to produce stereo-matched images; and performing, by the one or more processors, an automatic system calibration using data from the stereo-matched images, wherein the automatic system calibration is based on minimizing a cost function, and wherein the automatic system calibration is comprised of:

a fast calibration procedure performed at fast intervals to compensate for high-frequency perturbations;

a medium calibration procedure performed at medium intervals to compensate for medium-frequency perturbations, each medium interval being longer than each fast interval, and a slow calibration procedure performed at slow intervals to compensate for low-frequency perturbations, each slow interval being longer than each medium interval, wherein the automatic system calibration is comprised of an absolute range calibration procedure performed at intervals longer than each fast interval and shorter than each medium interval.

15. The method of claim 14, wherein the absolute range calibration procedure uses a non-negative disparity constraint to generate a stereo calibration parameter for a relative camera yaw.

16. The method of claim 15, wherein the absolute range calibration procedure uses dimensions of an object in a plurality of the stereo images and a focal length of the first and second camera sensors to generate the stereo calibration parameter.

17. A non-transitory computer readable medium storing computer-executable code that, when executed by one or more processors, causes the one or more processors to perform a method of calibrating a stereo vision system that includes a first camera sensor configured to obtain a plurality of frames of a first image by sensing first reflected energy of a first image and to generate first sensor signals based on the first reflected energy and a second camera sensor configured to obtain a plurality of frames of a second image by sensing second reflected energy of a second image and to generate second sensor signals based on the second reflected energy, wherein the method is comprised of:

generating stereo images from the frames of the first image and the frames of the second image;

rectifying the stereo images using stereo calibration parameters, to produce rectified stereo images;

performing a stereo matching on the rectified stereo images, to produce stereo-matched images; and performing an automatic system calibration using data from the stereo-matched images, wherein the automatic system calibration is based on minimizing a cost function, and wherein the automatic system calibration is comprised of:

a fast calibration procedure performed at fast intervals to compensate for high-frequency perturbations, a medium calibration procedure performed at medium intervals to compensate for medium-frequency perturbations, each medium interval being longer than each fast interval, a slow calibration procedure performed at slow intervals to compensate for low-frequency perturbations, each slow interval being longer than each medium interval, and a stereo image stabilization performed at intervals of one frame each, wherein the automatic system calibration is comprised of a stereo image stabilization performed at intervals of one frame each.

18. A non-transitory computer readable medium, storing computer-executable code that, when executed by one or more processors, causes the one or more processors to perform a method of calibrating a stereo vision system that includes a first camera sensor configured to obtain a plurality of frames of a first image by sensing first reflected energy of a first image and to generate first sensor signals based on the first reflected energy and a second camera sensor configured to obtain a plurality of frames of a second image by sensing second reflected energy of a second image and to generate second sensor signals based on the second reflected energy, wherein the method is comprised of:

generating stereo images from the frames of the first image and the frames of the second image;

rectifying the stereo images using stereo calibration parameters, to produce rectified stereo images;

performing a stereo matching on the rectified stereo images, to produce stereo-matched images; and performing an automatic system calibration using data from the stereo-matched images, wherein the automatic system calibration is based on minimizing a cost function, and wherein the automatic system calibration is comprised of:

a fast calibration procedure performed at fast intervals to compensate for high-frequency perturbations, a medium calibration procedure performed at medium intervals to compensate for medium-frequency perturbations, each medium interval being longer than each fast interval, a slow calibration procedure performed at slow intervals to compensate for low-frequency perturbations, each slow interval being longer than each medium interval, and a stereo image stabilization performed at intervals of one frame each, wherein:
the automatic system calibration is comprised of an absolute range calibration procedure performed at intervals longer than each fast interval and shorter than each medium interval, and
the absolute range calibration procedure is configured to generate a stereo calibration parameter for a relative camera yaw based on dimensions of an object in a plurality of the stereo images and a focal length of the first and second camera sensors.

19. A non-transitory computer readable medium storing computer-executable code that, when executed by one or more processors, causes the one or more processors to perform a method of calibrating a stereo vision system that includes a first camera sensor configured to obtain a plurality of frames of a first image by sensing first reflected energy of a first image and to generate first sensor signals based on the first reflected energy and a second camera sensor configured to obtain a plurality of frames of a second image by sensing second reflected energy of a second image and to generate second sensor signals based on the second reflected energy, wherein the method is comprised of:

generating stereo images from the frames of the first image and the frames of the second image;
rectifying the stereo images using stereo calibration parameters, to produce rectified stereo images;
performing a stereo matching on the rectified stereo images, to produce stereo-matched images; and
performing an automatic system calibration using data from the stereo-matched images, wherein the automatic system calibration is based on minimizing a cost function, and wherein the automatic system calibration is comprised of:
a fast calibration procedure performed at fast intervals to compensate for high-frequency perturbations,
a medium calibration procedure performed at medium intervals to compensate for medium-frequency perturbations, each medium interval being longer than each fast interval,
a slow calibration procedure performed at slow intervals to compensate for low-frequency perturbations, each slow interval being longer than each medium interval, and
a stereo image stabilization performed at intervals of one frame each,
wherein the medium calibration procedure is comprised of optimizing a number of valid pixels for dense stereo block matching as a function of a relative camera pitch and a relative camera roll to generate second stereo calibration parameters to compensate for medium-frequency perturbations.

20. A non-transitory computer readable medium storing computer-executable code that, when executed by one or more processors, causes the one or more processors to perform a method of calibrating a stereo vision system that includes a first camera sensor configured to obtain a plurality of frames of a first image by sensing first reflected energy of a first image and to generate first sensor signals based on the first reflected energy and a second camera sensor configured to obtain a plurality of frames of a second image by sensing second reflected energy of a second image and to generate second sensor signals based on the second reflected energy, wherein the method is comprised of:

generating stereo images from the frames of the first image and the frames of the second image;
rectifying the stereo images using stereo calibration parameters, to produce rectified stereo images;
performing a stereo matching on the rectified stereo images, to produce stereo-matched images; and
performing an automatic system calibration using data from the stereo-matched images, wherein the automatic system calibration is based on minimizing a cost function, and wherein the automatic system calibration is comprised of:
a fast calibration procedure performed at fast intervals to compensate for high-frequency perturbations,
a medium calibration procedure performed at medium intervals to compensate for medium-frequency perturbations, each medium interval being longer than each fast interval,
a slow calibration procedure performed at slow intervals to compensate for low-frequency perturbations, each slow interval being longer than each medium interval, and
a stereo image stabilization performed at intervals of one frame each,
wherein the slow calibration procedure is comprised of optimizing a number of valid pixels for dense stereo block matching as a function of a relative camera pitch, a relative camera roll, a relative camera yaw, and a relative camera position to generate third stereo calibration parameters to compensate for low-frequency perturbations.

* * * * *

UNITED STATES PATENT AND TRADEMARK OFFICE
CERTIFICATE OF CORRECTION

| | | |
|---|---|---|
| PATENT NO. | : 11,282,234 B2 | |
| APPLICATION NO. | : 17/365623 | |
| DATED | : March 22, 2022 | |
| INVENTOR(S) | : Leaf Alden Jiang et al. | |

It is certified that error appears in the above-identified patent and that said Letters Patent is hereby corrected as shown below:

In the Drawings

Replace drawing sheet 8 of 32 with attached drawing sheet 8 of 32

Signed and Sealed this
Twelfth Day of July, 2022

Katherine Kelly Vidal
*Director of the United States Patent and Trademark Office*